Jan. 18, 1966  E. B. HAMMOND, JR  3,230,348
MISSILE GUIDANCE SYSTEM
Filed Sept. 1, 1951  21 Sheets-Sheet 1

INVENTOR
EDMUND B. HAMMOND, JR.
BY
ATTORNEY

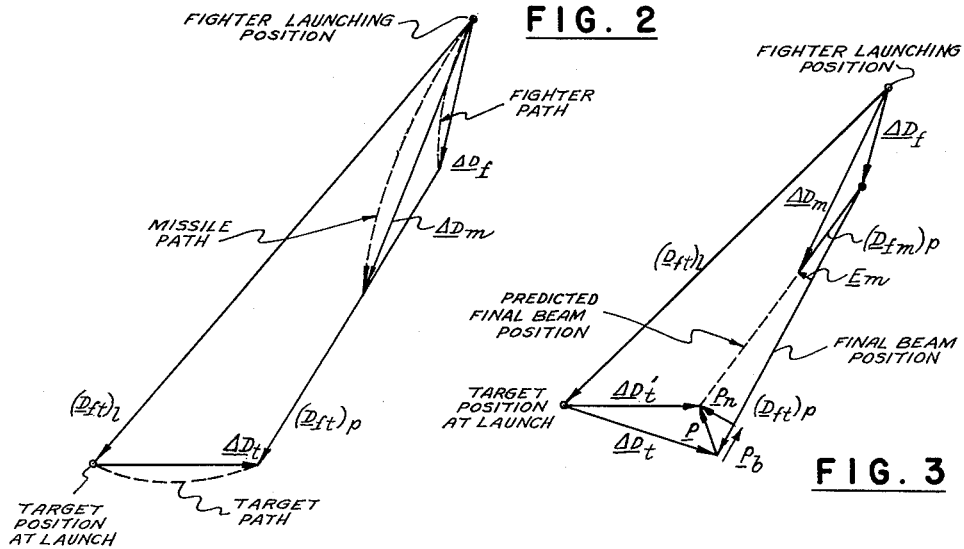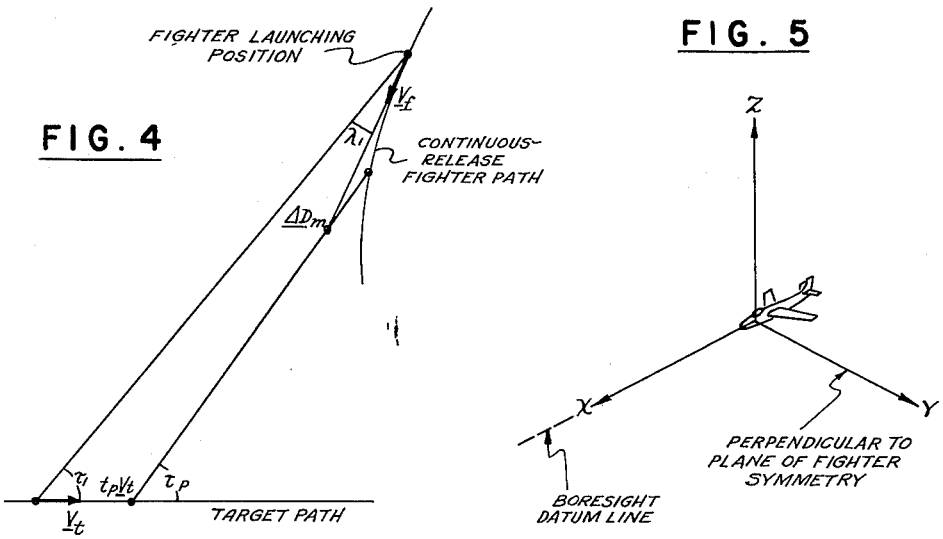

$$M = \sqrt{\frac{1+\left[\frac{Rd\omega}{1-K}\right]^2}{1+\left[\frac{KRd\omega}{1-K}\right]^2}}$$

K = SMOOTHING PARAMETER
Rd = DYNAMIC SENSITIVITY
ω = ANGULAR PERTURBATION FREQUENCY

INVENTOR
EDMUND B. HAMMOND, JR
BY
ATTORNEY

INVENTOR
EDMUND B. HAMMOND, JR.
BY
ATTORNEY

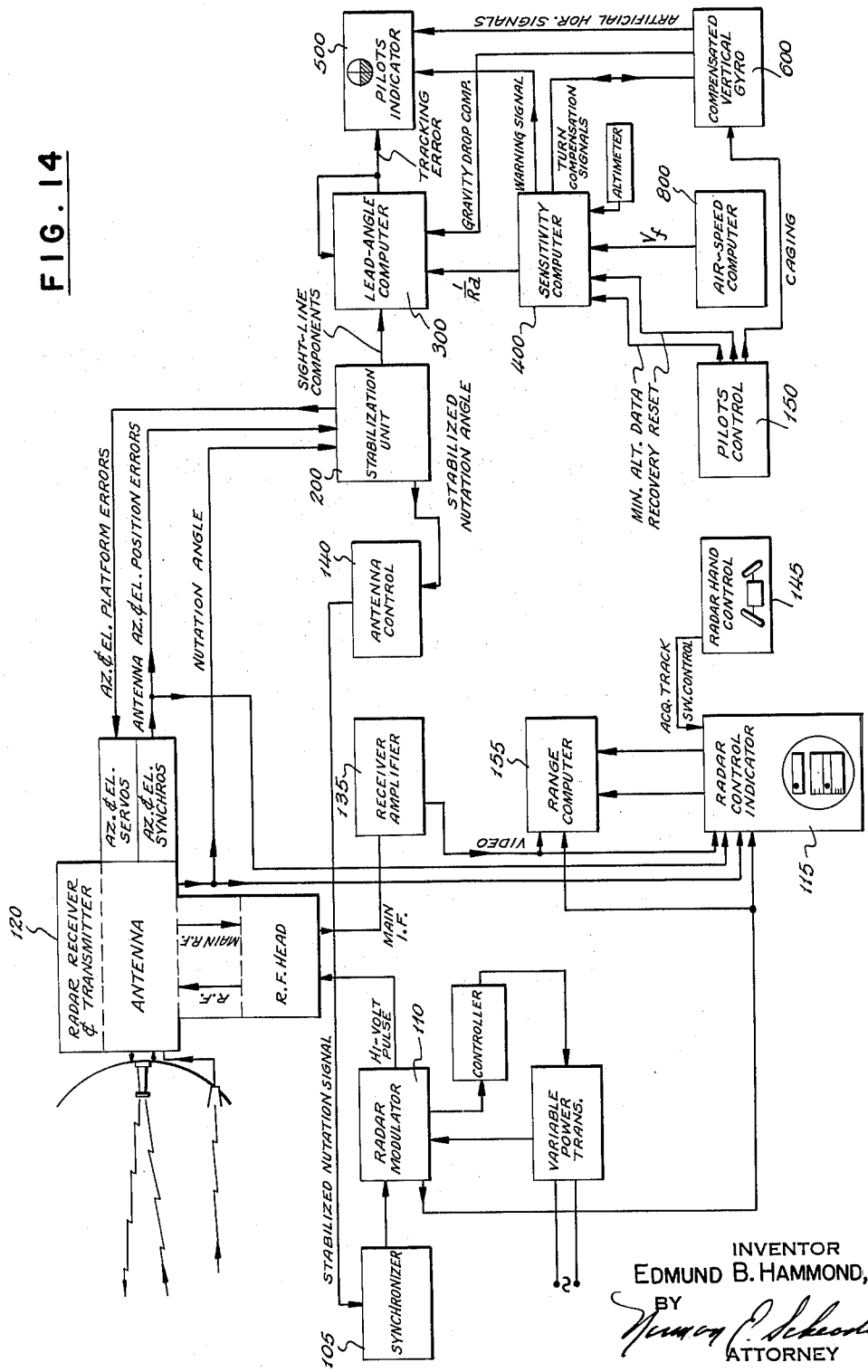

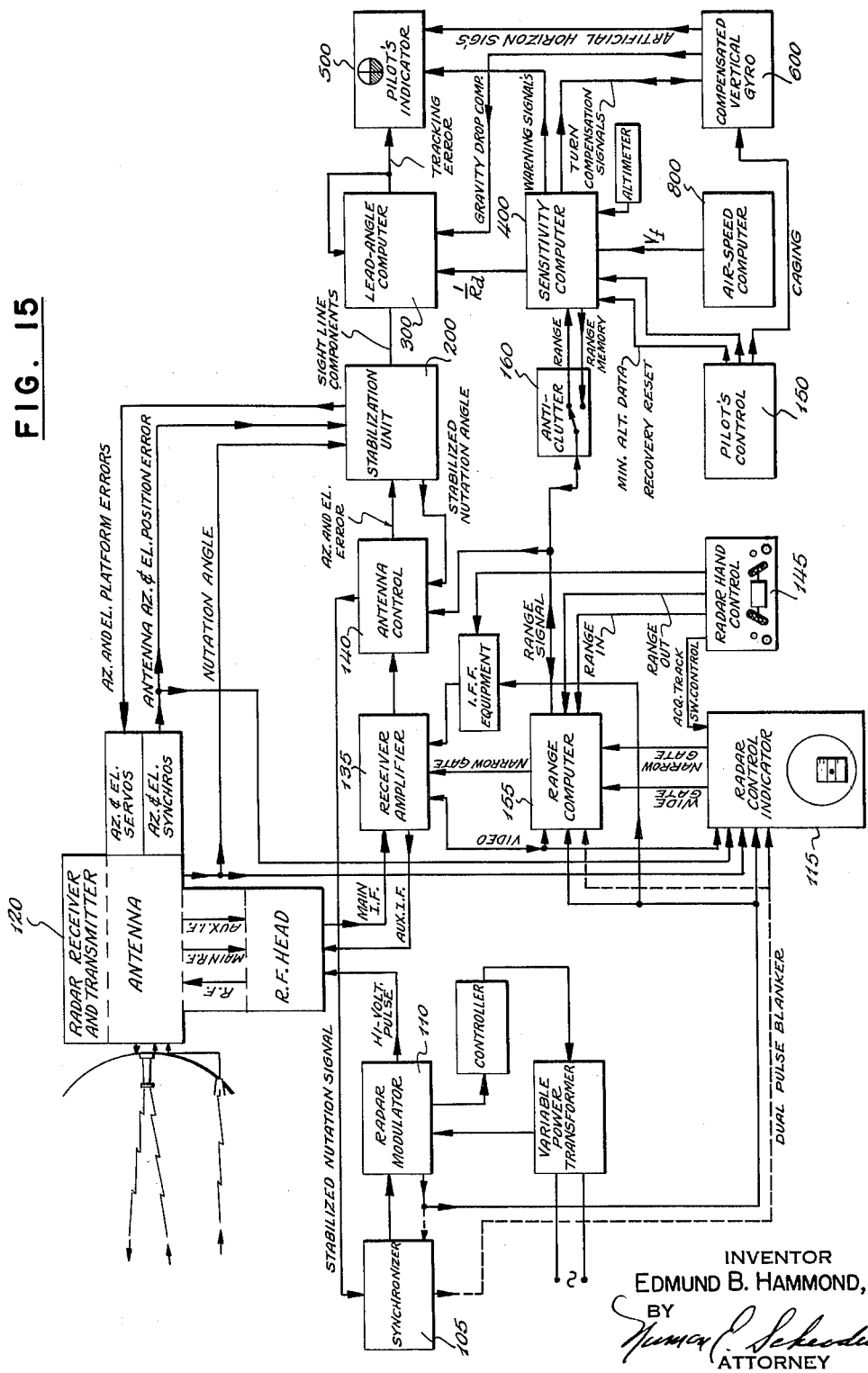

Jan. 18, 1966  E. B. HAMMOND, JR  3,230,348
MISSILE GUIDANCE SYSTEM
Filed Sept. 1, 1951  21 Sheets-Sheet 9
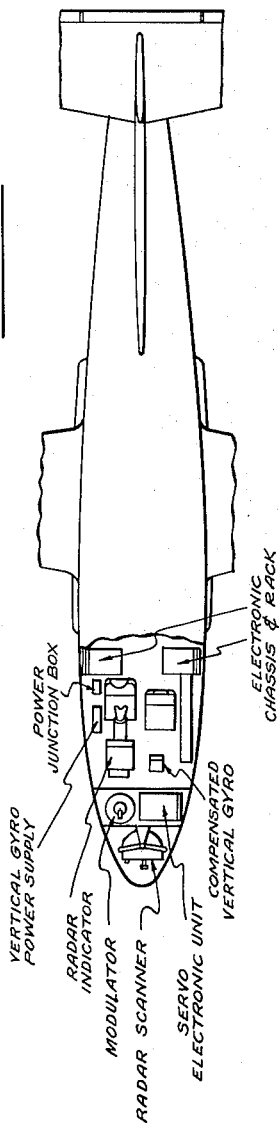
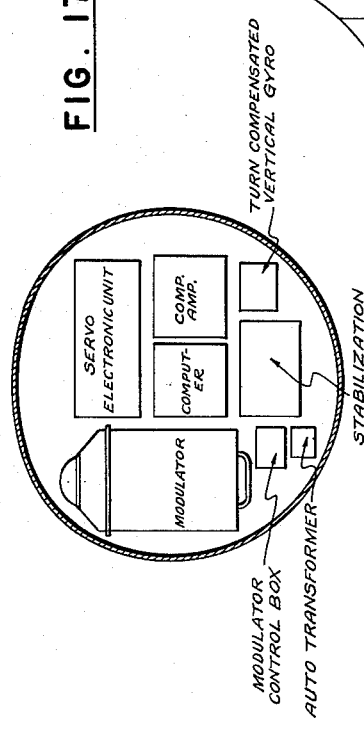
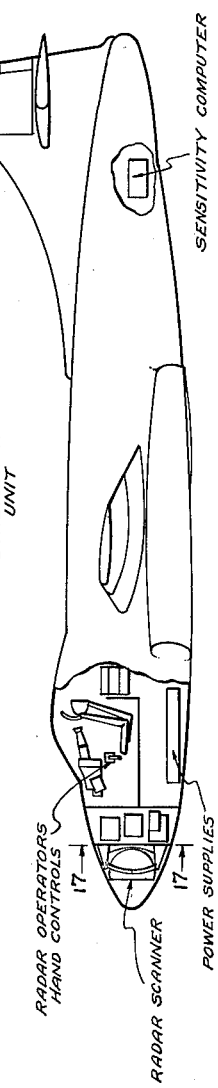
INVENTOR
EDMUND B. HAMMOND, JR.
BY
ATTORNEY Jan. 18, 1966   E. B. HAMMOND, JR   3,230,348
MISSILE GUIDANCE SYSTEM
Filed Sept. 1, 1951   21 Sheets-Sheet 12

INVENTOR
EDMUND B. HAMMOND, JR.
BY
ATTORNEY

Jan. 18, 1966     E. B. HAMMOND, JR     3,230,348

MISSILE GUIDANCE SYSTEM

Filed Sept. 1, 1951     21 Sheets-Sheet 15

INVENTOR
EDMUND B. HAMMOND, JR.
BY
ATTORNEY

Jan. 18, 1966   E. B. HAMMOND, JR   3,230,348
MISSILE GUIDANCE SYSTEM
Filed Sept. 1, 1951   21 Sheets-Sheet 18

INVENTOR
EDMUND B. HAMMOND, JR.
BY
ATTORNEY

INVENTOR
EDMUND B. HAMMOND, JR
BY
ATTORNEY

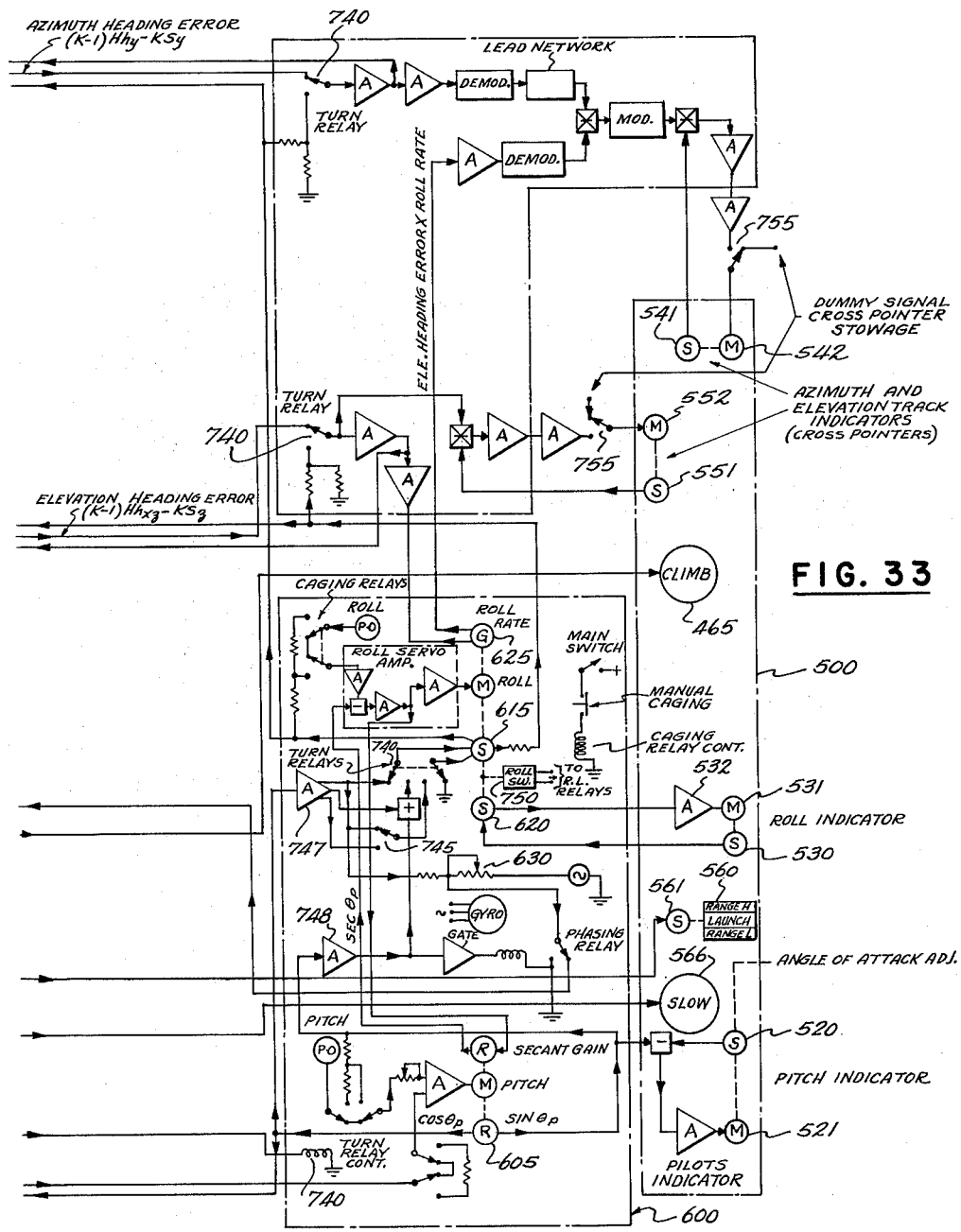
FIG. 33
| FIG. 30 | FIG. 31 | FIG. 32 | FIG. 33 |
FIG. 34
ALL RELAYS ARE SHOWN IN THEIR
NON-OPERATED POSITIONS
INVENTOR
EDMUND B. HAMMOND, JR.
BY
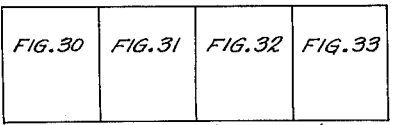
ATTORNEY

United States Patent Office 3,230,348
Patented Jan. 18, 1966

3,230,348
MISSILE GUIDANCE SYSTEM
Edmund B. Hammond, Jr., Merrick, N.Y., assignor to Sperry Rand Corporation, a corporation of Delaware
Filed Sept. 1, 1951, Ser. No. 244,761
22 Claims. (Cl. 235—61.5)

This invention relates to missile guidance systems, and particularly, to flight path computers for use with such systems.

The system of which this invention forms a part is designed primarily to control the guidance of an air-to-air missile currently designated as Sparrow XAAM–2, Pilotless Aircraft, although it will be apparent that the basic features of the invention may readily be applied to control the guidance of other types of missiles. By way of illustration, the Sparrow missile configuration (see FIG. 24) comprises an eight inch diameter body about ten feet long, with an ogive nose and cruciform wings and tail surfaces. Its components include a proximity fuse, a warhead, a control servo system, stored energy, a microwave receiver and a solid-fuel motor. Variable incidence wings of delta planform provide lateral control in the yaw and pitch planes, and delta tail surfaces provide aerodynamic stability. Roll control is incorporated by differential operation of two of the wings.

As presently contemplated, Sparrow missiles are to be carried by high-speed, carrier-based aircraft whose primary function is to defend the parent aircraft carrier, other ships, and shore installations against attacks by enemy aircraft. Normally, the fighter will be on patrol within twenty-five miles of the carrier when the enemy aircraft is first detected, although an interception could be started from the deck of the carrier if the detection range of the carrier's early warning radar set is large and the fighter rate of climb is high.

In either event, the missile-carrying fighter is to be vectored to within range of its acquisition radar by a long-range fighter director radar system. At this point the fighter will commence the attack, tracking the target and launching the missile in accordance with calculations made by a computer, and guiding the missile on the tracking beam to within its lethal range from the target.

In the present embodiment the missile guidance system is a single beam, beam-rider type, with intelligence transmitted through the conically scanned target-tracking beam. Dual pulses are transmitted, one in each of the four quadrants with different spacing between each of the pulse pairs for quadrant identification.

Kinematic studies indicate that one of the best ways, if not the best way, in which a missile can approach a target is to follow a constant bearing path. This type of approach is characterized by the fact that an imaginary line passing through the missile and the target maintains its initial direction throughout the time-of-flight of the missile. Its principal advantage lies in the fact that the required kinematic lateral missile acceleration is quite small. For a constant velocity missile, the required lateral acceleration never exceeds the target acceleration, although a slightly higher lateral acceleration is required for the Sparrow because of the forward deceleration caused by aerodynamic drag.

Since the missile is designed for use with a single beam, beam-rider type of guidance system, it is, therefore, required to follow sight line trajectories. It can be shown that the sight line trajectory is identical with the constant bearing trajectory provided that the fighter simultaneously executes a constant bearing approach toward the target. This leads to the conclusion that, in order to minimize the lateral kinematic missile acceleration required for following a sight line trajectory, the fighter should follow a constant bearing path toward the target during the time-of-flight of the missile.

It would be fairly easy to obtain this condition provided that the missile could be launched and captured by the radar beam while the fighter is following a constant bearing trajectory. However, this procedure is impractical because of the size of the missile, the difficulty of building flexible missile launchers, and the dispersion difficulties which would be encountered in launching missiles at large angles of attack. Therefore, it is considered necessary to launch the missile directly forward relative to the fighter. This means that the missile must be launched with the radar beam pointing almost directly forward; consequently the fighter must follow a course similar in nature to a pursuit course prior to launching the missile.

Although the missile must be launched in the manner just described, it is considered advantageous to have the fighter turning toward a constant bearing path during the time-of-flight of the missile. In order to obtain the maximum reduction in the kinematic lateral missile acceleration, this turn should be made as quickly as possible. Even though the fighter rate-of-turn is limited by the allowable lateral fighter acceleration value of 100 ft./sec./sec., this turn occasionally makes it possible to reduce the final lateral missile acceleration by several g's. This is particularly important in the case of the Sparrow, because it is a boost-glide type of missile and has less available wing lift near the end of its trajectory because of decreasing missile velocity.

This line of reasoning led to the adoption of a specific type of fighter maneuver during the missile launching and guidance periods. The maneuver comprises, essentially, following a "continuous release" path during the missile launching period, a transition from the "continuous release" path to a constant bearing path during and immediately after the missile propulsion period, and continuing the constant bearing path until the missile is detonated, unless a pilot warning signal is generated. The missile is launched subsequent to the start of the "continuous release" path, when the measured values of sight line angular rate, target range, target range rate, sight line deflection angle, etc. indicate that the missile will lie approximately at the center of the radar beam at the end of its propulsion period.

In order to assist the fighter pilot in the execution of this maneuver it is necessary to provide computing means to derive the required flight path components relative to the attitude of the launching aircraft and to indicate to the pilot through cross-pointer indicators as a result of such computations, his deviation from the desired flight path. Thus, by maintaining these indicators at zero, the pilot will follow the desired fighter path.

Accordingly, the principal objects of the present invention are:

To compute an optimum missile-launching or "continuous release" flight path for a fighter aircraft, To compute an optimum post-launching flight path,
To direct the fighter pilot to fly such flight paths,
To compute optimum missile launching data,
To compute warning data in the event of imminent collision,
To indicate such launching data and warning data to the fighter pilot.

Other objects of the invention will be apparent from the following description.

A preferred embodiment of the invention is shown in the appended drawings, in which:

FIG. 2 is a vector diagram of the prediction problem;

FIG. 3 is a vector diagram illustrating the effect of erroneous target prediction;

FIG. 4 is a vector diagram illustrating a typical continuous-release fighter flight path;

FIG. 5 is a diagram defining the fighter reference axes;

FIG. 14 is a schematic diagram illustrating data flow in the system during the track mode of operation;

FIG. 15 is a schematic diagram illustrating data flow in the system during the automatic track mode of operation;

FIGS. 16, 17 and 18 illustrate a typical arrangement of the several components of the invention in a fighter aircraft;

Figure 1:
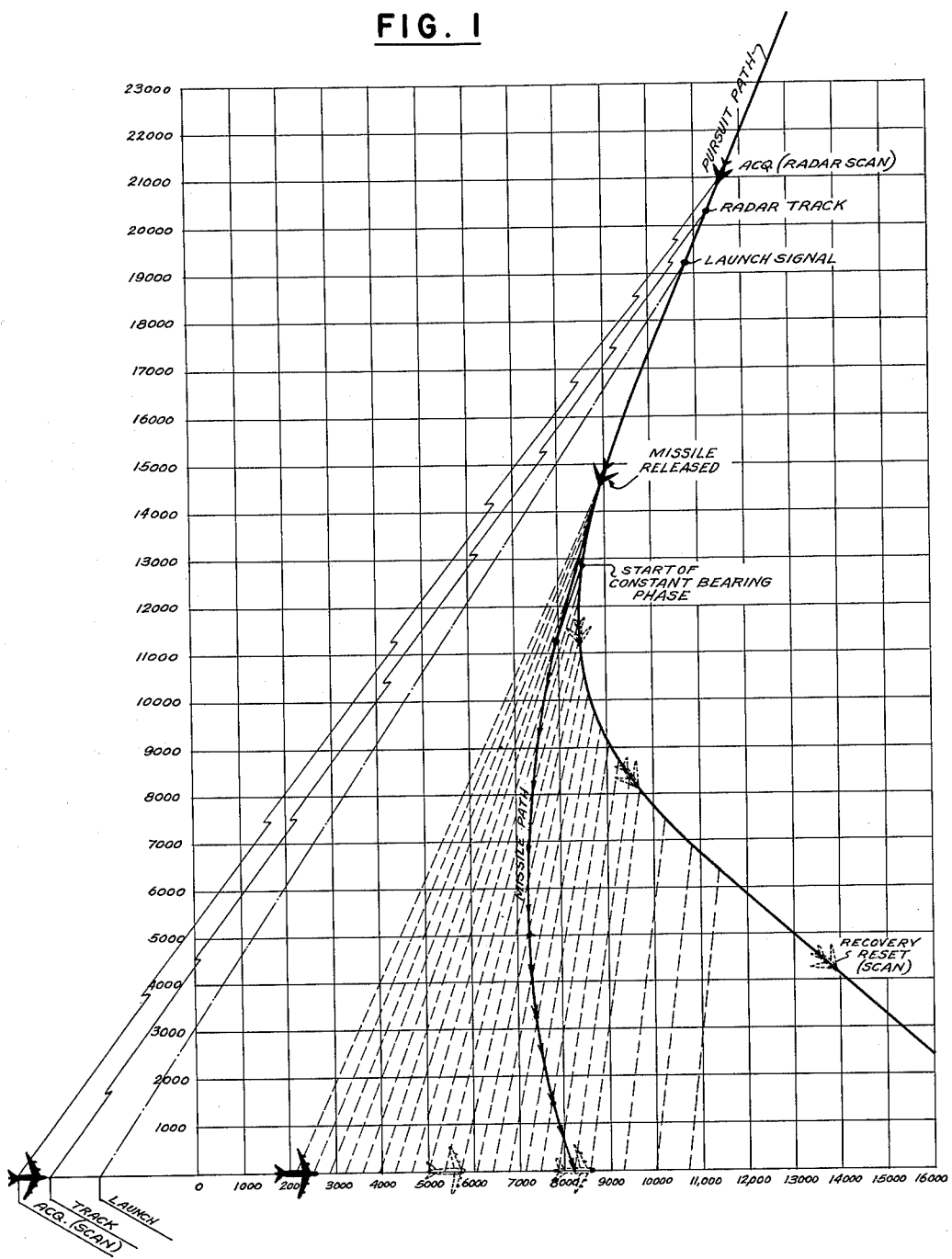
FIG. 1 is a diagram illustrating a typical continuous-relase fighter aircraft attack on a target.

FIGS. 30, 31, 32 and 33, taken together, comprise a detailed schematic diagram of the principal elements of the fighter control system;

FIG. 34 illustrates the manner in which FIGS. 30-33 are combined.

FIG. 35 is an exploded view of the timer mechanism of the lead angle computer.

FUNCTIONAL DESCRIPTION OF SYSTEM

The overall system of which this invention forms a part includes an airborne, X-band, automatic tracking radar system with provisions for launching and guiding the Model XAAM-N-2 Missile, Sparrow I, and a computer and indicator system for computing and indicating the optimum pre-launch and post-launch aircraft flight path. The system is also used to furnish information for navigation by triggering and locating transponder type beacons, and to furnish accurate aircraft attitude information to the pilot.

(a) General principles of operation
(FIGS. 1, 15, 16, 17, 18)

The system has four modes of operation: search, acquisition, automatic track, and beacon. In addition, a fifth mode of operation (track) is considered to exist during the transition from acquisition to automatic track. During this transient mode, the system locks on the target in range, elevation, and azimuth and thereby provides the starting point for the automatic track mode.

In the search and beacon modes, the system functions as a conventional radar set. The antenna scans automatically through an azimuth sector of ±60 degrees with its elevation angle adjustable from —30 to +5 degrees under operator control. During these modes, a conventional B-scan (range versus azimuth) indicator presentation is utilized. The range sweep is variable between 5 and 25 miles, and in addition, range sweeps of 50, 100, or 200 miles are available. For the lower ranges (5 to 50 miles), the nutator of the receiver-transmitter antenna is rotating at 3000 r.p.m. In effect, this action increases the scan volume by rotation of the beam while the antenna is scanning in azimuth. To compensate for the resulting loss in target definition (due to the increase in scan volume), a 50 c.p.s. sync reference voltage (obtained from the nutator) is applied to the deflection circuits of the indicator. This voltage causes the sweep trace to follow the nutator motion thereby increasing target definition.

In the acquisition mode, the antenna automatically scans a solid angle in space. With the normal acquisition scan, the antenna azimuth sweep is ±40 degrees and the maximum elevation sweep is ±15 degrees (both sweeps being measured from the longitudinal axis of the fighter to the centerline of the beam). The elevation sweep is divided into six azimuth sectors by five 6-degree elevation steps. Through operator control of acquisition sector switches, it is possible to select any combination of the six azimuth sweeps. For optimum frame time and scan volume, only four of the six azimuth sectors are utilized at any time. As in the search and beacon modes, the nutator operates during the low (5 to 50 mile) ranges. Target range and azimuth data are presented on a B-scan presentation, while simultaneously the azimuth and elevation of all targets within a selected range interval are shown on a C-scan (elevation versus azimuth) presentation. Range gate positioning buttons allow the operator to position the acquisition range gate (wide gate) about the target (which is within 15 miles of the fighter) on the B-scan, thereby causing it to appear on the C-scan presentation. An angular-acquisition circle is then superimposed on the target in the C-scan proper by motion of the radar operators handlebar control.

After the target is thus acquired the operator switches the system to the track mode. During this transient mode, the antenna is slaved to the line-of-sight gyro in the stabilization unit, which is precessed by signals from the radar operator's hand control to line up with the line of sight to the target. The range tracking gate (narrow gate) sweeps within the limits of the acquisition gate (wide gate) until it locks on the target. As soon as this occurs, automatic tracking in range, azimuth, and elevation commences terminating the track mode.

In the automatic track mode, range and angle-error data from the radar are utilized together with fighter true airspeed data measured by an airspeed computer to compute the time interval for launching the missile and to compute a "continuous release" flight path for the fighter. The launching interval is displayed to the pilot by signal flags indicating "RANGE HIGH," "LAUNCH," and "RANGE LOW," and the "continuous release" course is flown as the pilot centers a pair of cross pointers on a pilot's indicator unit.

When the firing trigger (on the control stick) is depressed, the pilot indicator flag changes from "LAUNCH" to "ON COURSE," and a timer in the computer starts. At predetermined time intervals, the selected number of missiles are automatically launched. Upon launching of a missile by the pilot, specially coded guidance pulses are transmitted by the radar in addition to the tracking pulses. The first tracking pulse in each quadrant of nutator rotation is followed by an accurately spaced second or guidance pulse. The pulse pairs transmitted in the four quadrants have different spacings, which serve to distinguish the quadrants. Guidance pulse timing with respect to nutator rotation is referred to fixed space coordinates by means of a roll-reference gyro, so that the quadrant dual pulses provide the missile with a fixed set of reference coordinates. The pulses received at the missile are all of equal intensity only if the missile is exactly in the center of the radar beam, but are amplitude modulated at the nutation rate for missile positions off the beam axis. Circuits within the missile measure the amount of modulation and by means of dual pulse sensing, its phase with respect to the fixed coordinates. This information allows the missile to guide itself into the center of the beam.

When the missile is oriented in the beam, the pilot turns the fighter toward a constant bearing collision course by continuing to center the cross-pointer presentation. This course reduces the angular rate of the guidance beam and consequently minimizes the lateral acceleration of the missile.

At certain target ranges, a unique method of double-beam reception and reduction of angular tracking jitter is included in the tracking loop. A device of this type is disclosed in copending application S.N. 143,214 to C. C. Stotz filed February 9, 1950. As shown in the copending application, an auxiliary wide beam width horn receiving antenna is connected to an auxiliary receiving channel. Transmission and propogation effects (such as fading) produce the same variations in both the main and auxiliary receiver signals. The auxiliary channel, however, contains only the square root of the modulation caused by beam nutation which appears in the main channel signal. Therefore, to cancel out signal variation due to fading, the anti-fade circuit divides the main channel signal by the auxiliary.

Altitude recovery circuits are provided in all modes of operation to prevent collision with the ground. If the conditions of altitude, speed, and dive angle are such that collision with the ground is imminent, the pilot indicator cross pointers are stowed at the side, a red signal lamp lights indicating "CLIMB," and the warning signal flag indicates "RECOVER." The pilot observes the artifical horizon presentation and puts the aircraft into a climb as quickly as possible. As the aircraft climbs, the pilot presses the "RECOVERY RESET" button to resume normal system operation.

During the automatic track mode when the fighter is closing in on the target, the pilot may receive a red light warning signal to "SLOW DOWN." This warning signal is activated by a microswitch on the low end of the computer range drive (approximately 3000 feet). When this occurs, the pilot either decreases fighter speed and continues on course or pulls out of the attack course.

The target clearance warning function is utilized during the automatic track mode of operation. If the fighter-target range is equal to or less than five times the range rate, collision with the target is imminent, and the turn relay is energized and held in for six seconds. The pilot continues to follow the cross pointers and automatically enters a turn to avoid collision with the target. At the end of the six seconds, the "RECOVER" signal appears, and the pilot presses the "RECOVERY RESET" button to resume normal system operation.

(b) *Radar tracking*

The radar set used herein is a pulse-modulated radar system. Detection of a target in such a system is accomplished by directing a beam of pulsed high frequency radio energy in a preset pattern over the space to be searched. When the beam strikes a reflecting object, energy is reradiated and a small portion is returned to and detected by the radar system. Since the beam is narrow, the position of the target is known, and since the energy is pulsed, the elapsed time between the transmission of the pulse and the receipt of its echo gives a measure of the range.

For radar tracking (automatic track mode), the projected beam is not fixed with respect to the axis of the reflecting antenna paraboloid, but is caused to trace a cone in space by the nutation or spin of the central antenna feed. As a result, the echo received from a target which lies on the axis of the reflector has the same amplitude for all positions of the beam as illustrated by target C of FIG. 19. If the target moves away, the echo signal strength varies approximately sinusoidally with the nutation of the beam as at point A. As the axis of the beam nears the target, the signal increases, and as it moves away, the signal decreases. The relative phase of the signal variation therefore indicates the direction of the target from the reflector axis, as illustrated by the phase relationship between targets B and A. The magnitude of the variation is related to the amount of displacement. Since the reflected signal can thus identify the target displacement from the reflector axis in magnitude and direction, it is used to control a servosystem which positions the antenna to track the target.

(c) *Missile guidance coding*

Figure 20:
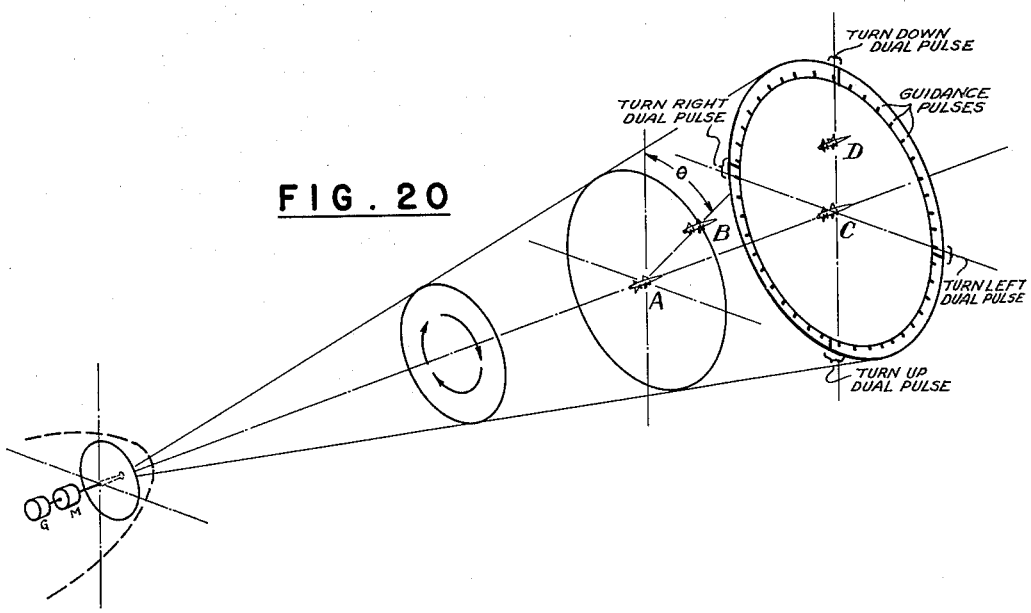

In addition to the radar tracking requirements, the radar system must serve to guide the missile to the target. The axis of the conical trace of the radar beam tracking the target provides a sight line route; the problem unique to this system concerns the method of controlling the missile to fly along this automatically maintained path or "ride the beam" as shown in FIG. 20. In order to accomplish this, it is necessary that the missile servosystem be able to sense when the missile is on the nutating beam axis. Further, if displaced, it must know the direction and degree of displacement.

Figure 19:
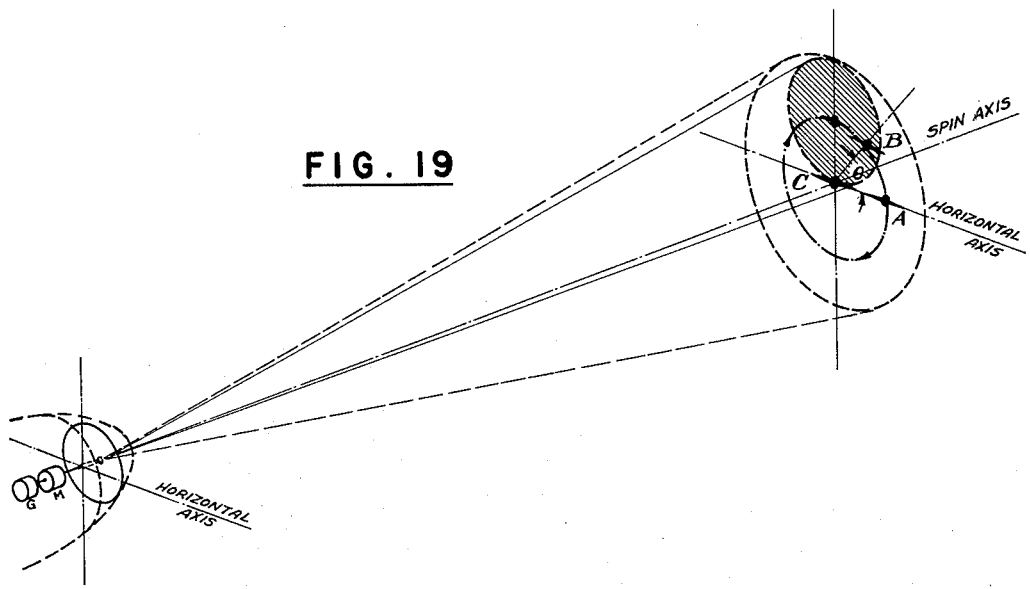
FIGS. 19 and 20 are schematic diagrams illustrating the principles of radar operation and beam-rider missile guidance operation, respectively.

If both missile and radar system have a common gyroscopic reference, the problem is closely analogous to the automatic tracking problem discussed in connection with FIG. 19. Considering the guidance situation illustrated in FIG. 20, if the missile is at the center of the guidance cone as at A, it receives a series of pulses which all have constant ampitude at any given distance from the guiding radar. When the missile is off the beam in the direction $\theta$, the amplitude of the received signal varies from a maximum value at B when the beam is pointed in the $\theta$ direction, to a minimum value when the beam is at a position of $\theta+180$ degrees. This minimum value may be at almost zero for a considerable range of angles in the vicinity of $\theta+180$ degrees when the error is large. Accordingly, the signal the missile receives is modulated at the nutation frequency when there is any error present. The amount of modulation determines how much the missile is off the axis, and the phase of the modulation determines in what direction the missile is off the axis.

Unlike the tracking servosystem however, the missile has no phase reference. As a result, while the modulated signal contains all the necessary guidance information, it must be oriented with respect to the missile. The method utilized to transmit the phase reference information is called the dual guidance pulse system. In effect, the dual pulse system constitutes a quadrant command system. Missile guidance is accomplished by sending a "turn left" signal when the beam sweeps through the right horizontal axis of a normal cone section, and a "turn right" signal when the beam sweeps through the left horizontal axis. Similar signals are dispatched for "up" and "down." If the missile is on the cone axis as at C, all "turn" signals balance and the missile continues its flight without correction. If the missile is displaced from the cone axis as at D, one signal overbalances the other and the missile obeys the stronger signal to turn back toward the nutating beam axis.

The quadrant directional signals take the form of dual pulses of varied spacing. The first pulse in each quadrant is a regular tracking pulse followed by a second pulse which is inserted between that pulse and the succeeding tracking pulse. The paired pulses are termed guidance pulses and are identified to the missile receiver by their time spacing. Once separated within the missile receiver, each set of guidance pulses controls a correctly oriented wing servo channel.

(d) Fighter flight path computation

During an attack on an enemy aircraft, the flight path of the fighter is divided into several phases. Depending upon the tactics of the attack, a maximum of four distinct phases might be utilized. As a result, the flight path computations are based on the problems presented during these different phases. FIG. 1 indicates the flight path of a fighter during a typical attack and indicates the various phases involved. The following paragraphs describe the computations involved during each phase.

*Preparatory phase.*—During the acquisition mode of operation, the radar operator utilizes the hand controls of radar hand control unit 145 (FIG. 15) to position the acquisition circle of the C-scan presentation over a selected target. This action of the hand controls also positions the spin axis of a gyro in stabilization unit 200 so that the spin axis is directed toward the selected target. In this manner, a sight line to the target is established. In addition, a computer gyro in lead angle computer 300 is continually being precessed so that the correct vector relations exist between the radar sight line (spin axis of stabilization gyro), the fighter heading, and the spin axis of the computer gyro. This relationship is desired in order that the heading cross pointers be zeroed at the beginning of the track mode so that the pilot does not have to spend time determining initial correct fighter headings for the attack.

Range data is also being prepared for the transition from acquisition to track by slaving the range servo of sensitivity computer 400 to the lower end of the radar wide gate. This slaving sets the computer range at values approximating final range existing at lock-on.

It should be noted that during this phase of flight path computation, no indication is furnished to the pilot, since the cross pointers of pilots indicator unit 500 are stowed. Therefore, the fighter heading and sight line are not dependent on the computations provided by the computer. As the fighter is maneuvered or the sight line is changed from one target to another, the corect relationship between sight line, fighter heading, and computer gyro is maintained by precessing the computer gyro accordingly.

*Lead pursuit phase.*—The lead pursiut course is computed during the track and automatic track modes and is terminated at either the missile capture time or at target clearance ime. The lead pursuit (or continuous release) course is one in which the fighter can release a missile at any time during lanuch conditions and capture the missile in the radar beam at the end of the missile propulsion time. Ideal capture conditions, as stated, are that the target, missile, and fighter are colinear and that the velocity of the missile relative to the beam has no component normal to the beam at the time of capture. In order to achieve these ideal capture conditions, the flight path of the fighter is comuuted so that the proper angle exists between the present line of sight to the target and the initial absolute velocity vector of the missile. The angle is comprised of a gravity correction angle and a lead angle. The gravity correction included in the computation consists principally of the correction necessary to compensate for gravity drop of the missile during the propulsion period. The lead angle is utilized to anticipate the angular motion of the beam during the propulsion period.

After acquiring a desired target by control of the acquisition circle of the C-scan presentation, the track mode is initiated by depressing the track button of radar hand control 145. During the short track period prior to automatic track, the stabilization gyro remains fixed in space at the final position determined by the hand controls during the acquisition mode. The antenna is switched from the search control circuits and is positioned to the azimuth and elevation defined by the stabilization gyro. The range servo is switched to range rate memory, however, since range is zero, the range condition should be unchanged from the value existing at the instant of switching from acquisition to track (i.e. the range data is slaved to the lower edge of the wide gate rather than to the searching narrow gate). Fighter true airspeed data are furnished by airspeed computer 800, gravity correction data are furnished by a vertical gyro 600, and heading error crossfeed errors (indicative of the angle between actual and computed fighter heading) are determined.

Based on these data, the computer gyro is continuously precessed to provide an indication of desired fighter heading (the desired fighter heading being displaced from the sight line by the computed gravity correction and lead angle). The error between this desired fighter heading and the actual fighter heading is indicated by the displacement of the cross-pointer intersection from the bull's-eye on pilot's indicator unit 500. Upon centering the cross-pointers on the bull's-eye, the computed lead pursuit course is achieved. However, this is not the correct lead pursuit course, since the sight line data is modified by virtue of the fixed space condition of the stabilization gyro spin axis and the precession rate of the computer gyro is modified by virtue of the approximate range data and the lack of range rate data. The purpose of this approximate lead pursuit course is to reduce pilot errors at the transition from track to automatic track. Since the transition from track to automatic track is accomplished in a relatively short period of time, this approximate lead pursuit course is not considered as one of the five phases of flight path computation but is included with the lead pursuit phase.

At the time the track mode is initiated, the radar narrow gate starts searching within the wide range gate, and when the narrow gate coincides with the target, the radar will automatically lock-on in range. The action of the range lock-on relay initiates the automatic track mode. The stabilization gyro is now precessed by the lateral and elevation errors of the radar sight line with respect to the target, and the antenna is slaved to the stabilization gyro thereby establishing automatic tracking of the target. The narrow gate provides range tracking data from which range as well as range rate data are obtained. Since the approximate lead pursuit course determined during track was due to the target memory data, now that the accurate tracking data is utilized, the same computing elements and cross-pointer indication used during track are used during atuomatic track to provide the correct lead pursuit course. In this mode of operation, the rate of precession of the computer gyro is approximately equal to the angular rate of the sight line after initial transients are reduced. Therefore the computer gyro lags the sight line by an angle proportional to the lead angle.

At any time during launch conditions, the pilot may press the firing trigger on the control stick. When the firing trigger is depressed, an uncaging relay in stabilization unit 200 uncages a phase reference gyro which functions as a free gyro, remaining fixed in space. By action of the firing relay, the gyros in those missiles selected for firing are uncaged. By uncaging these phase reference gyros at the same time, the coded quadrant guidance pulses are transmitted with respect to the same space reference that is being used in the missile. The guidance pulses are transmitted after the firing trigger is depressed but are not utilized by the missile during the missile propulsion period. During the propulsion period, the fighter continues on the lead pursuit course using the same flight path computations described above, and the missile utilizes an automatic pilot control circuit to reduce dispersion. This missile automatic pilot is disclosed in detail in a copending application S. N. 385,224, filed on October 9, 1953, for Flight Control Systems in the name of H. Harris et al., now Patent No. 2,873,074, which application is assigned to the same assignee as the present application.

*Proportional navigation phase.*—In order to reduce the lateral acceleration of the missile during its guidance period, it is desirable to reduce the sight line angular rate as much as possible by turning the fighter toward a proportional-navigation flight path. This type of path leads eventually to a constant bearing or collision course. A relatively long time would be required for the fighter to reach a collision course after beam entry of the missile because of fighter turning rate limitations. Therefore, the sight line angular rate is reduced during the missile flight time.

At a predetermined interval after the firing trigger is depressed, a timer in lead angle computer 300 starts to reduce the precession rate of the computer gyro to zero in order to provide a smooth transition from the continuous release path to a proportional navigation path. With no precessing torques acting on the computer gyro, the gyro is a free gyro and remains fixed in space. This fixed position of the computer gyro is the condition necessary for a proportional navigation type of flight path.

The same computer elements and cross-pointer indications used during the lead pursuit course are utilized for the proportional navigation phase with the computer gyro acting as a free gyro. As the fighter follows this type of path, the lead angle and the angle between the computer gyro spin axis and the desired fighter heading (deflection angle) build up in accordance with a fixed relationship established between desired fighter heading, sight line, and computer gyro spin axis. However, because of mechanical and tactical limitations on scanner and computer operation, there are mechanical stops in the computer which prevent the deflection angles from exceeding 75 degrees. To avoid hitting these limit stops, a deflection limiter circuit is provided. This deflection limiter circuit is placed into operation at the time the gyro precession rate is reduced to zero, and, at the same time, the gravity correction and heading error crossfeeds are disconnected. If the computer gyro deflection angles are less than 30 degrees, there is no output from the deflection limiter circuit. For values of deflection angles between 30 and 75 degrees, the output increases to cause the gyro to precess so as to reduce the deflection angle. An equilibrium position is reached where the gyro precession rate equals the sight-line rate, and a constant lead angle is maintained.

*Target clearance phase.*—If at any time during the automatic track mode, the fighter-target range is less than or equal to five times the range rate, collision with the target is imminent, and the target clearance relay in sensitivity computer 400 is energized. Energizing this relay initiates action which provides semi-automatic means for a sharp change in the flight path.

During the target clearance phase, the cross-pointer inputs are switched from the normal heading errors to certain trigonometric functions of the fighter pitch and roll angles. The pilot continues to follow the cross pointers and, in so doing, is automatically caused to go into a tight turn away from the previous path. If the roll angle at the start of target clearance is negative, i.e. a left bank, the pilot pulls the fighter out in a sharp right turn by following the cross pointer indication. For an initial positive roll angle, i.e. a right bank, the pilot makes a sharp left turn.

FUNCTIONAL DESCRIPTION OF SYSTEM IN OPERATIONAL MODES

Figure 12:
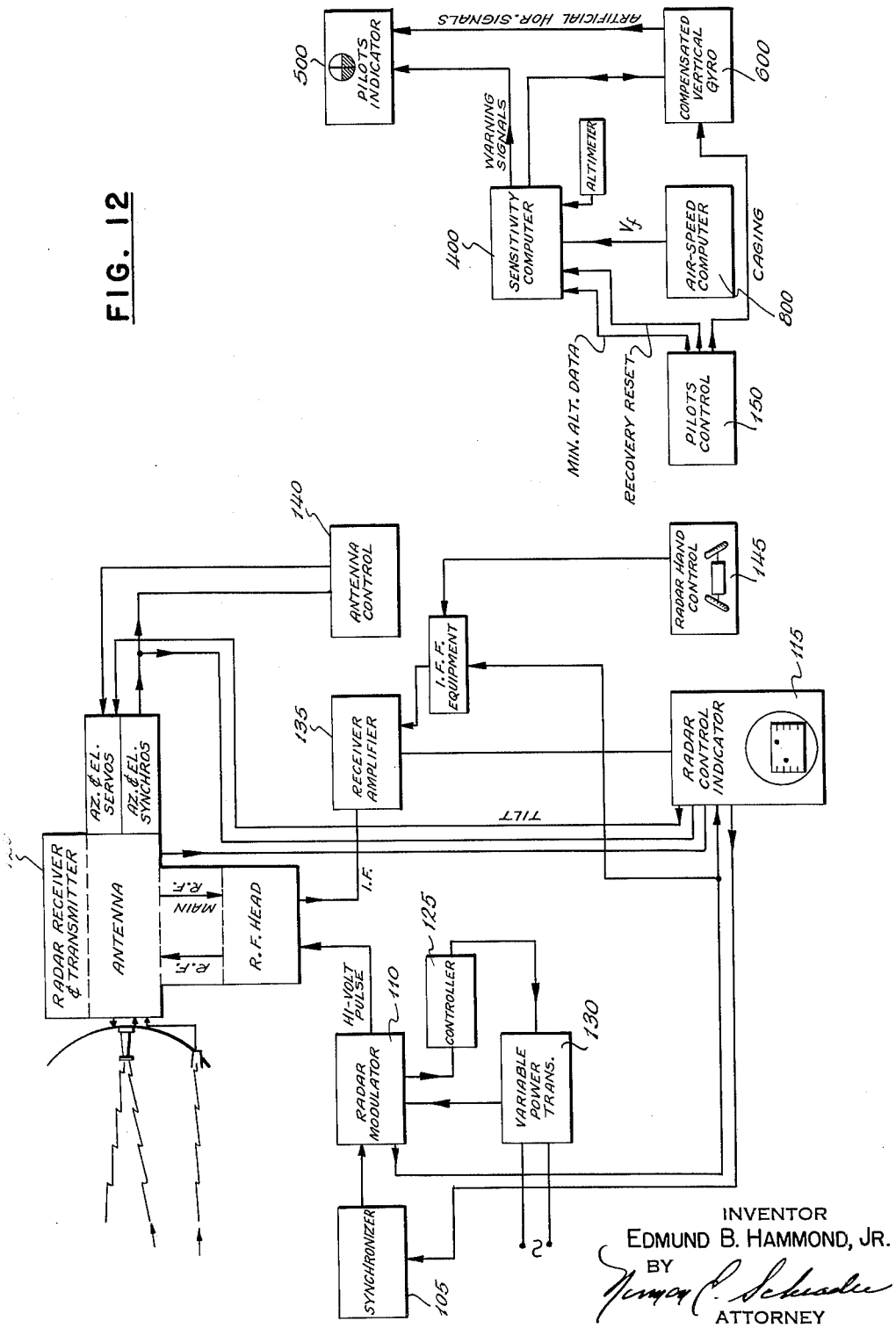
FIG. 12 is a schematic diagram illustrating data flow in the system during search and beacon modes of operation.

*Search and beacon mode (see FIG. 12).*—During the search and beacon modes of operation synchronizer 105 establishes the repetition rate of the transmitted pulses and conveys this information to radar modulator 110 as a first series of thyratron trigger pulses. The repetition rate is dependent on the range of the target and the function (search or beacon) to which the control settings of radar control-indicator 115 are positioned.

From these first thyratron trigger pulses, radar modulator 110 develops high power pulses for a magnetron oscillator in the R-F head of radar receiver-transmitter 120. The modulator also sends a first series of low power synchronizing pulses to the indicator range sweep of control-indicator 115 to provide the time origin for the range sweep of the B-scan presentation.

All primary power for the radar modulator is supplied and controlled by controller 125 and variable power transformer 130. To control the modulator high voltage, the modulator signal voltage (proportional to the high D.-C. voltage of the radar modulator) is sent to the controller where it is used to operate relays which raise or lower the output voltage of the variable power transformer, thereby maintaining a fixed modulator high voltage.

Radar receiver transmitter 120 generates an R-F pulse each time it receives a high voltage pulse from the radar modulator. These R-F pulses are transmitted and received by the antenna of the radar receiver-transmitter, and the received R-F pulses are converted to I-F signals which are supplied to amplifier assembly 135. In the amplifier assembly, the I-F signals are amplified and detected to furnish a system video signal which is then sent to radar control indicator 115 where it is displayed on a B-scan presentation.

The azimuth sweep for the B-scan presentation is developed in antenna control 140 and is then applied to the antenna azimuth servo motor of the radar receiver-transmitter. Antenna azimuth position signals are furnished by the antenna and are used by the antenna control in developing the azimuth sweep.

The elevation of the antenna nutation axis is determined by the tilt signal which is manually controlled at radar control-indicator 115. The tilt signal is then applied to the antenna elevation servo motor of the radar receiver-transmitter. Antenna elevation position signals are furnished by the antenna and are used in developing the elevation signal.

Antenna position signals are sent to radar control-indicator 115 to position the sweep trace of the B-scan presentation in synchronism with the antenna scan. During the lower ranges (5 to 25 and 50 miles), the nutator of the radar-receiver-transmitter is in operation. The antenna furnishes a 50 c.p.s. reference voltage which is used by the control-indicator to compensate for loss in target definition due to the rotating beam.

During the beacon and search modes of operation, the IFF equipment is placed in operation by depressing an IFF button of the radar hand control 145. A first system sync signal from the radar modulator is furnished to the IFF equipment, and the IFF video from this equipment is combined with the system video in amplifier assembly 135 and is presented on radar control-indicator 115.

Pilot's indicator assembly 500 displays aircraft data based on artificial horizon signals obtained from vertical gyro 600. The gyro unit also supplies a signal proportional to the cosine of the pitch angle to sensitivity computer 400 which obtains fighter true airspeed data from airspeed computer 800. The product of true airspeed and cos pitch developed in the sensitivity computer is then sent to the vertical gyro 600 where it is used to compensate the gyro for turn error and fighter longitudinal acceleration. To establish rapid erection of the compensated vertical gyro, caging control signals are furnished from pilot's control 150.

In these modes the altitude recovery warning function of the system is operative. The pilot sets in the altitude of the surrounding highest land plus some safety margin at pilot's control 150. This minimum altitude data is sent to sensitivity by computer 400 where altitude is measured. In addition, the sensitivity computer obtains fighter true airspeed data from airspeed computer 800, and cos pitch data from the gyro 600. If the condition of altitude, fighter velocity, and dive angle are such that collision with the ground is imminent, warning signals are furnished to pilot's indicator 500. These signals cause the "CLIMB" lamp to light and the "RECOVER" flag to be displayed. To return the system to normal operation, the "RECOVERY RESET" button of pilot's control 150 is pressed thereby sending recovery reset signals to the sensitivity computer.

Figure 13:
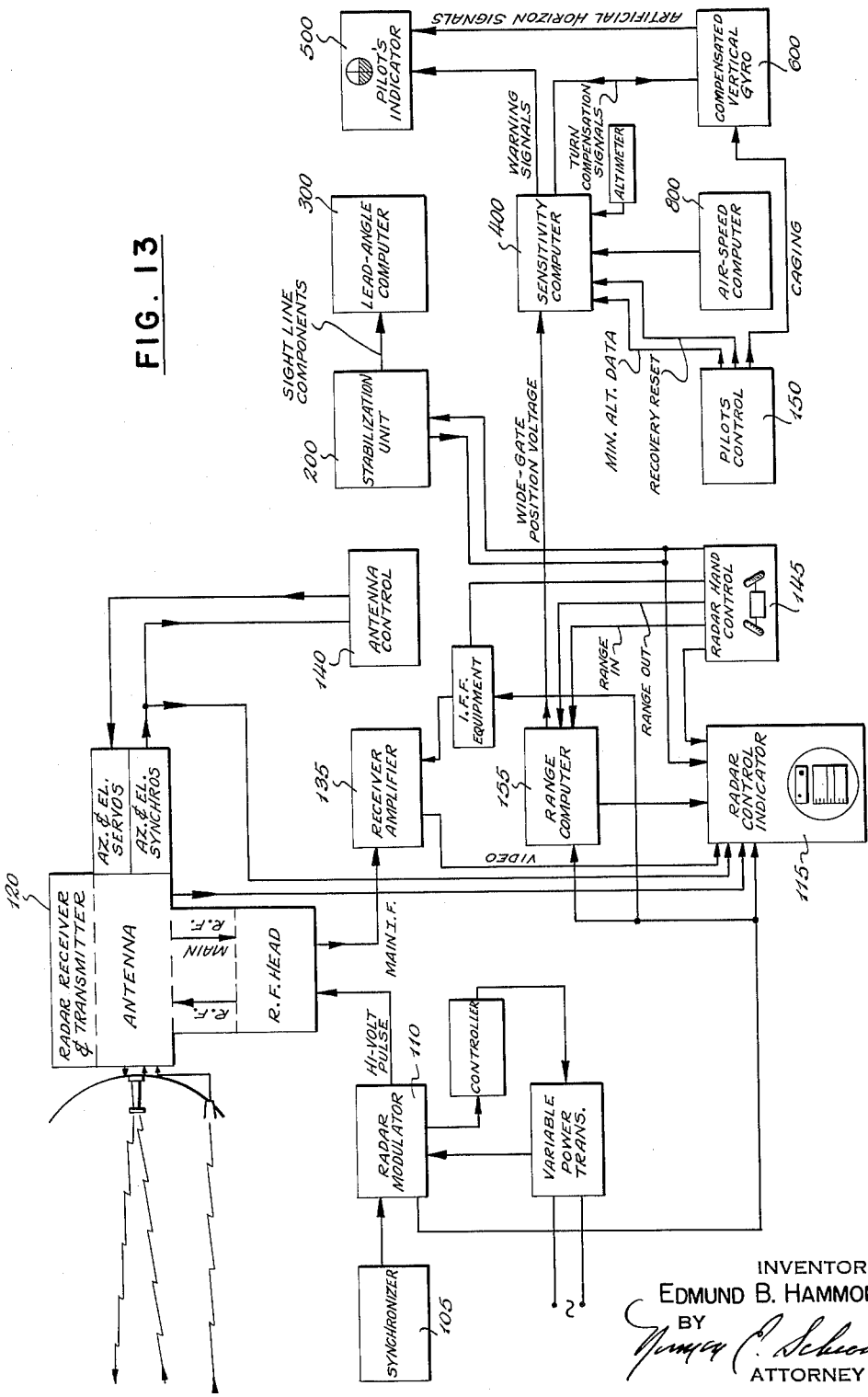
FIG. 13 is a schematic diagram illustrating data flow in the system during the acquisition mode of operation.

*Acquisition mode (see FIG. 13).*—During the acquisition mode of operation, radar control-indicator 115 is furnished with system video as in the search or beacon mode, described above, with the following addition. The low power synchronizing pulses are also furnished to range computer 155 to provide the time origin for determining the range position at which the wide gate is initiated. The IFF equipment, the artificial horizon display, and the altitude recovery warning circuit also operate as in the search and beacon modes.

The wide gate of the B-scan presentation is positioned by the range-in and range-out buttons of radar hand control 145. Range-in and range-out signals are sent to range computer 155 which also receives the first system sync signals from the radar modulator 110. From these data the wide gate positioning signals are developed and sen to radar control indicator 115 where the wide gate is displayed on the B-scan presentation. The wide gate positioning signals are also sent to sensitivity computer 400 as range data.

The acquisition circle on the C-scan presentation of the control-indicator 115 is positioned by azimuth and elevation signals obtained from the radar hand control 145. These signals are also used to position the spin axis of the stabilization gyro in stabilization unit 200. To slave the acquisition circle to the same sight line as the stabilization gyro spin axis, platform errors from the stabilization unit are combined with the acquisition circle control signals furnished to control-indicator 115.

From the stabilization unit 200, the $x, y, z$ components of the sight line relative to the aircraft X, Y, Z axis are furnished to lead angle computer 300 which serves to establish the correct relationship between fighter heading, sight-line, and computer gyro, as described above.

*Track modes (see FIG. 14).*—During the track mode of operation, radar control indicator 115 is furnished with system video, as in the acquisition mode, with the following addition. The pulse repetition frequency is maintained by comparing the repetition rate with the filtered stabilized 50-c.p.s. reference furnished by antenna control 140. The 50 c.p.s. reference is generated in the antenna of radar receiver-transmitter 120, stabilized by the phase reference gyro of stabilization unit 200, and applied to the lock-in filter of the antenna control. It should be noted that the first system sync pulses, furnished to range computer 155, is used to provide the time origin for determining the range position at which the wide gate and narrow gate are initiated.

The antenna of the radar receiver-transmitter is slaved to the sight line established by the stabilization gyro of the stabilization unit, which is, in this mode, functioning as a free gyro. Antenna position signals are sent to the stabilization unit, and antenna error signals are developed which are used to drive the azimuth and elevation motors of the antenna. Antenna position signals are sent to the radar control-indicator 115 to position the sweep trace of the B and C scan presentations in accordance with the azimuth and elevation of the antenna beam.

System video is also furnished to range computer 155 to furnish target range data. During the track mode, the Range-In and Range-Out buttons of radar hand control 145 are not used. Therefore, the wide gate positioning voltage remains constant. The narrow gate developed by the range computer sweeps within the wide gate, and as the narrow gate sweeps past the position of target range, a lock-on signal is developed which energizes the automatic track bus of the system. The wide gate and narrow gate are sent to radar control indicator 115 where they are displayed on the limited B-scan presentation. The artificial horizon display and the altitude recovery warning circuit operate as in the search and beacon modes.

From the fighter true airspeed data of airspeed computer 800 and range memory data (based on the range data obtained during acquisition), sensitivity computer 400 supplies lead angle computer 300 with the reciprocal of dynamic sensitivity ($1/R_d$). This approximate value of dynamic sensitivity is used with sight line data from the stabilization unit 200, gravity correction data from vertical gyro 600, and heading error crossfeed data to establish an approximate solution to the lead pursuit course. The heading error data are used as cross pointer signals to pilot's indicator 500. The pilot controls the fighter to place the cross-pointer intersection over a bull's-eye and thereby flies an approximate lead pursuit course.

As in the acquisition mode, the track button of radar hand control 145 is utilized to initiate the track mode of operation. Each successive operation of the track button serves alternately to energize the acquisition bus and track bus.

*Automatic track mode (see FIG. 15).*—The automatic track mode is functionally divided into the pre-launch and post-launch periods. The following paragraphs describe the data flow during each of these periods.

*Pre-launch period.*—During the pre-launch period of the automatic track mode, the basic data flow in the system is as shown in FIG. 15. The dashed data lines are utilized during the post-launch period only.

To furnish the radar control-indicator 115 with system video, the same data flow described during the track mode is applicable with the following addition. Automatic gain control is utilized to maintain system video signals at a constant amplitude and independent of the range, size, and signal fluctuation of the target being tracked and to maintain the conical scanning error sensitivity constant under the same conditions. To accomplish this, receiver amplifier assembly 135 is furnished with I-F from receiver-transmitter 120 and with the narrow gate from range computer 155. It should be noted that only the main I-F is utilized in the development of the system video supplied to the radar control-indicator.

Automatic target tracking is now in use. The I-F applied to amplifier assembly 135 is utilized in developing the 50-c.p.s. error which is furnished to antenna control 140. This 50-c.p.s. error is indicative of the target's departure from the beam center, as described above. The antenna control converts the 50-c.p.s. error into up-down, right-left D.-C. errors used to position the stabilization gyro spin axis of stabilization unit 200. In this manner, the spin axis of the stabilization gyro maintains a sight line to the target. Antenna position signals are transmitted to stabilization unit 200 from which platform error signals are developed. These signals are used to drive the azimuth and elevation motors of the antenna. Therefore, the antenna is slaved to the sight line established by the stabilization gyro spin axis.

At the lower target ranges (approximately 8000 yards), the anti-fade circuits, disclosed in above mentioned application S.N. 143,214, are utilized. Both main and auxiliary channels of the antenna, R-F head, amplifier assembly 135 and antenna control 140 are operative during all modes of operation, but only when the range voltage from range computer 155 places the divider of the antenna control into operation, is the auxiliary channel effective. The auxiliary channel furnishes the antenna control with an auxiliary 50-c.p.s. error in the same manner as the main 50-c.p.s. error is furnished. The D.-C. errors developed by the antenna control are not affected by fading as a result of the divider action.

The antenna position signals furnished to radar control-indicator 115 are unused since the C-scan is not used in this mode, and the B-scan presentation furnishes range data only. During the automatic track mode, the antenna furnishes a 50-c.p.s. reference voltage to the control-indicator. The azimuth dimensions are reduced to two beam widths so that only the targets within the cone of nutation appear on the screen.

System video is also furnished to range computer 155 to furnish target range data. The narrow gate is made to coincide with the target video pulse and any change in the relative position of the two provides an error signal which controls the level of the range voltage to keep the narrow gate aligned with the target video pulse. The wide gate is positioned so that the narrow gate remains centered in the wide gate. For selecting a new target while in the automatic track mode, the range-in or range-out data from radar hand control 145 causes the range voltage to slew in or out thereby repositioning the narrow and wide gates. The narrow and wide gate data are sent to radar control-indicator 115 for the B-scan presentation.

The range voltage determined in range computer 155 is used as inputs to antenna control 140 and sensitivity computer 400. However, in cases of excessive clutter competing with the target, an anti-clutter relay may be energized by depressing the "ANTI-CLUTTER" button of the radar control indicator. As a result, the range input to the sensitivity computer is not used, and the range memory data of the sensitivity computer is used as an input to range computer 155 and antenna control 140. This method is used as a first approximation of range prediction during the interference period.

The IFF equipment, the artificial horizon display, and the altitude recovery warning circuit operate as in the search and beacon modes.

From the fighter true airspeed data of airspeed computer 800 and the range data of the range computer 155, sensitivity computer 400 supplies lead angle computer 300 with the reciprocal of dynamic sensitivity ($1R_d$). This value of dynamic sensitivity is used with the sight line data from stabilization unit 200, gravity correction data from vertical gyro 600, and heading error crossfeed data to establish the solution to the lead pursuit course. The heading error data are used as cross-pointer signals to pilot's indicator 500. The pilot controls the fighter to place the cross-pointer intersection over a bull's-eye and thereby flys the lead pursuit course. During anti-clutter operation, sensitivity computer 400 utilizes the range rate memory as a first approximation in the computation of dynamic sensitivity.

If the target range data of sensitivity computer falls below approximately 3000 feet, the slow down warning signal is sent to pilot's indicator 500 where the "SLOW" lamp lights. The target clearance mode is operated when the range is less than or equal to five times the range rate, as described above.

As in the acquisition mode, the track button of radar hand control 145 is utilized to initiate the track mode of operation. Each successive operation of the track button will alternately energize the acquisition bus and track bus.

*Post-launch period.*—During the post-launch period of the automatic track mode, the basic data flow in the system is the same as during the pre-launch period with the following additions and modifications. The dashed lines of FIG. 15 indicate the additional data flow involved.

The time coded triggers for missile guidance pulses are developed in synchronizer 105. The guidance pulses which are triggered by a second series of thyratron trigger pulses are sent to the radar modulator 110 and are used to fire a second thyratron in the modulator. As a result, the high voltage pulse R-F, and transmitted pulse include both tracking and guidance pulses.

To insure correct spacing between the two thyratron triggers, low power pulses which comprise a second series of system sync pulses occur simultaneously with the firing of the second thyratron and are sent back to synchronizer 105. The spacing of first and second system sync pulses for the "up" position of the nutator is compared and maintained constant by control circuits.

Only four transmitted pulses in each nutation cycle are used as part of the dual guidance pulses. Dual pulse blanking is provided to disable the narrow gate generator of range computer 155, and to disable the indicator range sweep of the radar control-indicator 115, thus preventing the echoes of the dual pulses from giving incorrect target information.

The phase reference gyro in stabilization unit 200 is uncaged at the instant the launch button is depressed and the 50-c.p.s. reference is stabilized with respect to the axes of this free gyro. Phase reference gyros in the missiles are uncaged simultaneously so that a mutual space reference is established between missile and guidance pulses.

The remainder of the system in the post-launch mode, is functioning as described in the pre-launch data flow except that the dynamic sensitivity value generated by sensitivity computer 200 is being reduced to zero, as described above. This results in the proportional navigational course.

DERIVATION OF THE FLIGHT PATH COMPUTER EQUATIONS

A. *Function of the computer*

The type of flight path to be flown by the fighter while launching Sparrow missiles is defined herein as a "continuous-release" path. This expression is used to describe any flight path from which a missile can be launched at any elected time and be propelled to a position such that it may be controlled by the radar guidance beam of the fighter at the end of the propulsion period of the missile. (See FIG. 1.) The ideal conditions under which to acquire control of the missile are those in which the target, missile, and fighter are colinear, and the velocity of the missile relative to the guidance beam has no component normal to the beam at the time at which the beam-rider servo circuits in the missile are energized.

The use of a continuous-release path during the launching and propulsion periods allows the launching of more than one missile at one firing. Because of the particular missile suspension arrangement presently contemplated, the missiles are not fired simultaneously since they might collide with each other. However, by controlling the individual launchings with a timing device so that they occur at about one-half second intervals, interference between missiles is avoided. This multiple launching method is termed "ripple fire."

As soon as the missile is under the control of the radar guidance beam, it is considered advisable to turn the fighter toward a constant-bearing or collision course with the target. The purpose of this procedure is to reduce the angular rate of the guidance beam and consequently the lateral acceleration required of the missile to keep it in the beam. This reduction in missile acceleration is desirable, especially at high altitudes, in order to keep it less than the maximum available acceleration which decreases as the speed of the missile decreases. It can be appreciated that the fighter piloting error should be held to within a few mils while the continuous-release path is being followed in order to minimize the beam-entry error. However, piloting errors of several times this magnitude can be tolerated during the missile guidance period without seriously affecting the guidance accuracy.

It is the function of the flight path computer to compute continuously the correct space orientation for the longitudinal axis of the fighter, and to compute the actual piloting error components for use in the pilot's tracking-error indicator during both the launching and missile-guidance phases of the attack. The computer inputs are directly measurable quantities such as fighter-target range, range rate, sight-line angular rate, fighter speed, etc., and are introduced automatically.

With the system disclosed herein, it can be shown that the missile can effectively be controlled by the radar guidance beam even when it is initially displaced from the center of the beam by as much as 200 feet, assuming the crossing velocity to be zero. This means that the computer is not required to determine the fighter heading exactly. Therefore, approximations to the exact solution are used in an effort to simplify the computer mechanism. The approximations and assumptions used in developing the final computer equations are described in the following paragraphs.

In FIG. 2, is shown the ideal relationship existing between the fighter-target range vector at launch $(\underline{D}_{ft})_1$ and the fighter, missile, and target incremental displacement vectors $\underline{\Delta D}_f$, $\underline{\Delta D}_m$, and $\underline{\Delta D}_t$, respectively, in the general prediction problem to be solved by the flight-path computer. This relationship can be expressed by the following vector equations:

$$\frac{\underline{\Delta D}_m - \underline{\Delta D}_f}{|\underline{\Delta D}_m - \underline{\Delta D}_f|} = \frac{(\underline{D}_{ft})_1 + \underline{\Delta D}_t - \underline{\Delta D}_f}{|(\underline{D}_{ft})_1 + \underline{\Delta D}_t - \underline{\Delta D}_f|} = \frac{(\underline{D}_{ft})_1 + \underline{\Delta D}_t - \underline{\Delta D}_m}{|(\underline{D}_{ft})_1 + \underline{\Delta D}_t - \underline{\Delta D}_m|} \quad (1)$$

Inspection of FIG. 2 shows that the flight paths of the fighter, missile, and target are involved in the solution of this prediction problem. The missile path can be determined in terms of the launching conditions or controlled in a predetermined manner by a missile automatic pilot, and the fighter path can be controlled by the flight-path computer and flight control system. It is necessary, however, to make certain assumptions with regard to the shape of the target path since target position represents the independent variable of the system, the time function for which is not known.

FIG. 3 shows the general relationship between a target prediction error and the resulting beam-entry error, assuming that the fighter path is not influenced by the deviation of the target from its assumed path. The assumed target incremental-displacement vector is shown as $\underline{\Delta D}_t'$ and the actual vector as $\underline{\Delta D}_t$. The prediction error vector $\underline{P}$ is given by $$\underline{P} = \underline{\Delta D}_t' - \underline{\Delta D}_t \quad (2)$$

$$= \underline{P}_b + \underline{P}_n \quad (3)$$

where $\underline{P}_b$ and $\underline{P}_n$ are prediction error components parallel and normal to the final beam axis. The beam-entry error $\underline{E}_m$ can be closely approximated as follows:

$$\underline{E}_m \cong \left[\frac{(D_{fm})_p}{(D_{ft})_p}\right] \underline{P}_n \quad (4)$$

Values of the ratio $(D_{fm})_p/(D_{ft})_p$ normally vary between the limits of 1/4 and 1/14 under actual tactical conditions; therefore, a relatively large prediction error can be allowed. When extremely short-range tail attacks are carried out, this ratio could conceivably be as large as 1/2. Such attacks, however, are assumed to be ill-advised because of the effectiveness of the target's tail gun turrets at this short range. Therefore, ratios of this magnitude are considered to be improbable.

It is expected that the target will normally follow a straight path in approaching its destination in order to keep the duration of the attack at a minimum. Therefore, it seems reasonable to assume that the target path will be straight during the missile propulsion period. In any event, the beam-entry error produced by a target maneuver during propulsion will always be considerably smaller than the prediction error itself.

B. *Application of the lead-computing sight to the launching problem*

Since the accuracy requirements of the flight-path computer are not critical, an exact computation of the heading is not necessary. An empirical approach to the computer design problem is used in an effort to simplify the circuitry involved. Consequently, a small fighter heading error normally will be present because of certain approximations or assumptions used in developing the computer equations.

FIG. 4 shows a typical continuous-release fighter path. In order to simplify this diagram, it is assumed that the missile displacement increment $\Delta D_m$ lies in the direction of the fighter velocity vector at the time of launch. It will be noted that a lead angle ($\lambda$) between the fighter-target range vector (in the direction of the radar beam axis) and the missile displacement vector is required to anticipate the angular motion of the beam during the propulsion period. This lead angle normally is small, and there is a marked similarity between the resulting fighter flight path and the conventional lead-pursuit course flown by fighters while firing fixed forward-firing guns. For this reason the conventional aircraft lead-computing sight theory is applied to the solution of this problem. It should be remembered, however, that although lead-computing sight equations may be used to determine the fighter lead angle as a function of time, an existing sight mechanism cannot be used in the equipment because of special requirements of the fighter control system hereinafter described.

Neglecting the dynamic lag due to computer smoothing circuits, the characteristic vector equation for a conventional lead-computing sight is as follows:

$$R_s \underline{\Omega}_s = (\underline{s} \times \underline{f}) \quad (5)$$

where $\underline{\Omega}_s$ is the sight-line angular rate vector, $\underline{s}$ and $\underline{f}$ are unit vectors in the direction of the sight line and the indicated fighter heading, respectively, and $R_s$ is a scalar quantity which has been called the static angular-rate sensitivity of the computer. This equation demonstrates that the indicated heading vector must always lie in the plane of action (plane normal to $\Omega_s$) and be displaced from the sight line through a lead angle $\lambda$, the magnitude of which is given by the following equation:

$$\sin \lambda = R_s \Omega_s \quad (16)$$

The modification of this equation which is used to smooth the computer output data is described later.

The angular-rate sensitivity of the lead computer can be determined as a function of the variables involved in the problem such as fighter-target range, range rate, fighter speed, etc. In the following description it is shown that sensitivity values may be determined by numerical integration procedures for arbitrary values of the input variables, and that an empirical equation may be derived to relate these values to the necessary measurable variables.

C. *Determination of the power trajectory of the missile*

Before an accurate calculation of the lead angle or of angular-rate sensitivity can be made, the nature of the missile trajectory during the propulsion period must be known. This trajectory is a function of the initial launching conditions. Therefore, these conditions must be taken into account in determining the correct lead angle.

The uncontrolled, free-flight, power trajectory for the Sparrow missile was analyzed in detail by numerically integrating the flight equations and by solving these equations by means of an analogue simulator. As a result of these studies it was determined that the missile has only a marginal amount of weathercock stability at the time of launching, and that the missile dispersion, caused by random misalignments of its wings and of the motor thrust vector, would be too large to be allowed. Therefore, an automatic pilot control circuit is incorporated in the missile, to reduce to an acceptable value the dispersion caused by misalignments during the propulsion period of the missile. This autopilot is described in detail in the above-noted copending application S.N. 385,224.

Although the missile autopilot described in this copending application S.N. 385,224 is preferred, any suitable type of automatic pilot may be used to control the missile during the propulsion period. The control element may be a free gyroscope, two or more rate gyroscopes, linear accelerometers, angular accelerometers, or combinations of these components. Different missile trajectories would result in each case. However, the most desirable missile trajectory is one for which the missile's incremental-displacement vector during the propulsion period is expressed by $$\underline{\Delta D_m} = (L)\underline{x} + (t_p)\underline{V_f} + \left[\frac{t_p^2}{2}\right]\underline{A_g} \qquad (7)$$

where $x$ is a unit vector in the direction of the boresight datum line (missile longitudinal axis before launching), $L$ is the magnitude of the relative missile displacement caused by motor thrust during time $t_p$, $t_p$ is the propulsion time, and $\underline{A_g}$ is the gravity acceleration vector. This type of trajectory is generated by the automatic pilot control circuit of S.N. 385,224 and makes unnecessary the measurement of fighter angle of attack for use in the flight path computer.

The relative missile displacement caused by motor thrust is very nearly constant, but undergoes slight variations because of changes in altitude, temperature of the missile propellant, and fighter speed. The inclusion of these secondary variables in the calculation of L is not considered necessary because the angle between the missile displacement vector and the radar beam direction at the time of beam entry is small. Thus, the beam-entry error produced by an error in the estimation of missile displacement is small.

The time ($t_p$) represents the time interval between the time of launch and the time at which the beam-rider control circuit in the missile is energized. It is not considered desirable to energize these control circuits before the motor burning is complete. Therefore, $t_p$ is controlled by a time-delay circuit in the missile and is greater than the maximum motor burning time.

Although these values will vary for different types of missiles and propellants, in the present case a relative missile displacement value of 1686 feet and a propulsion time of 2.2 seconds are used. The total displacement in feet for this missile is, therefore, given by $$\underline{\Delta D_m} = (1686)\underline{x} + (2.2)\underline{V_f} + (2.42)\underline{A_g} \qquad (8)$$

D. *Determination of static sensitivity*

The total correction angle between the sight-line and the boresight datum line may be considered to be composed of two parts; namely, a lead angle to compensate for angular rotation of the radar beam during missile propulsion, and a ballistic angle which is necessary to compensate for the drop of the missile in the direction of gravity. Inasmuch as the gravity-drop distance and the relative missile displacement are assumed to have constant values of 77.9 feet and 1686 feet, respectively (from Equation 8), then the relative gravity drop correction angle ($\beta$) can be approximated by $$\beta \cong \frac{77.9 \sin \zeta}{1686} = 0.046 \sin \zeta \text{ (radian)} \qquad (9)$$

where $\zeta$ is the fighter zenith angle as measured from a true vertical axis to the boresight datum line. If a set mutually perpendicular fighter reference axes $x$, $y$, and $z$ be defined as shown in FIG. 5, then the azimuth and elevation components of the gravity-drop correction angle can be made respectively proportional to the $y$ and $z$ components of the gravity acceleration vector. These in turn can be measured by a pair of properly interconnected component resolvers attached to the gimbals of a gyro vertical.

In the solution for lead angle, it is assumed that the gravity-drop correction angle components can be added directly to the corresponding lead-angle components without disturbing the solution of the lead-angle computer. On the basis of this assumption, gravitational forces and accelerations are omitted. The derivation is further simplified by assuming the fighter angles of attack and sideslip relative to the boresight datum line to be zero. The simplified form of Equation 8 which is used in lead-angle and angular-rate-sensitivity derivations is, therefore, $$\underline{\Delta D_m} = (1686 + 2.2 V_f)\underline{x} \qquad (10)$$

Referring again to FIG. 4 it can be seen that the instantaneous, angular-rate of the beam axis ($\Omega_s$) is given by $$\Omega_s = \frac{V_t \sin \tau - V_f \sin \lambda}{D_{ft}} = \dot{\tau} \qquad (11)$$

where $V_t$ and $V_f$ are the instantaneous target and fighter speeds, respectively, $\tau$ is the fighter approach angle, $\lambda$ is the lead angle, $D_{ft}$ is the fighter-target range, and $\dot{\tau}$ is the time derivative of the approach angle. Another expression for $\dot{\tau}$ is given by Equation 6, which can be written as follows:

$$\dot{\tau} = \frac{\sin \lambda}{R_s} \qquad (12)$$

The fighter-target range rate ($\dot{D}_{ft}$) is given by $$\dot{D}_{ft} = -V_t \cos \tau - V_f \cos \lambda \qquad (13)$$

A simultaneous solution of Equations 11 through 13 will yield the approach angle at beam entry in terms of the approach angle at launch, the launching range, the fighter and target speeds, and the static sensitivity. By inspection of FIG. 4 it can be seen that if the beam-entry error is to be zero, the value of $\tau_p$ must satisfy the following equation:

$$\tan \tau_p = \frac{(D_{ft})_1 \sin \tau_1 - \Delta D_m \sin (\tau_1 + \lambda_1)}{(D_{ft})_1 \cos \tau_1 - \Delta D_m \cos (\tau_1 + \lambda_1) - t_p V_t} \qquad (14)$$

Therefore, it is necessary to determine the static sensitivity such that the solution of Equations 11 through 13 and of Equation 14 give identical values for $\tau_p$.

It is apparent that a table of discrete values for the static sensitivity given in terms of $V_f$, $V_t$, $\tau_1$, and $(D_{ft})_1$, would not represent a complete solution to the problem at hand. Instead, an expression defining $R_s$ as a function of these variables is required; and by definition of the continuous-release path, the lead angle at any time other than the actual launching time must also satisfy the launching conditions.

An exact functional relationship between $R_s$ and the controlling variables would be difficult, if not impossible, to find. However, it can be shown that values of static sensitivity will, in general, vary between the limits of 2 and 6 seconds and that this variation will always be slight during the 2.2-second propulsion period. Therefore, it is considered expedient to assume the sensitivity to be constant in solving for its correct values. In accordance with this assumption, Equations 11 through 14 may be solved by numerical integration procedures for any desired number and type of arbitrary launching conditions, and the resulting values of $R_s$ may be used in the determination of the dynamic angular-rate sensitivity, as described hereinafter.

E. *Introduction of smoothing into the computer solution*

Thus far, the computer is considered to be instantaneous or "static" in nature, i.e., without dynamic lag or smoothing circuits. This type of computer is of little practical value because of the inherent amplification of radar beam jitter associated with the differentiation of the beam motion. Therefore, a dynamic lag circuit must be inserted into the computer in order to smooth the output data and reduce random perturbations.

Figure 6:
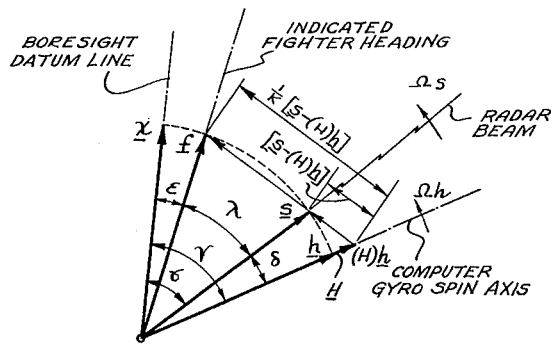
FIG. 6 is a vector diagram of the computer gyro arrangement.

In order to measure the sight-line angular rate for the determination of lead angle, a gyro of known angular momentum could be slaved to the radar beam and the total slaving torque could be taken as a measure of the beam rate. Such a device is disclosed in copending application S.N. 762,297, by H. Harris, filed July 21, 1947. A dynamic lag can be inserted into this type of rate-measuring circuit in many ways, but perhaps the simplest and most direct method is that of allowing the gyro spin-axis to lag the sight line in the plane of action by an angle approximately proportional to the lead angle. FIG. 6 shows the relationship existing between the gyro axis, sight line, and boresight datum line for this type of computer. Unit vectors $\underline{h}$, $\underline{s}$, and $\underline{f}$ are shown in the directions of the gyro spin axis, the sight-line, and the indicated fighter heading, respectively. The angle $\delta$ represents the gyro lag angle and $\epsilon$ is defined as the pilot's tracking error. In order to simplify the computer mechanism, it is convenient to employ the following arbitrary vector equation relating to $\underline{h}$, $\underline{s}$, and $\underline{f}$:

$$(H)\underline{h} + \frac{1}{K}[\underline{s} - (H)\underline{h}] = \underline{f}$$

or $$\underline{f} = \left(\frac{1}{K}\right)\underline{s} - H\left(\frac{1}{K} - 1\right)\underline{h} \quad (15)$$

where K is a constant which is called a smoothing parameter and H is a scalar coefficient, the magnitude of which is implied by Equation 15. A scalar equation relating the magnitudes of the lead angle and the gyro lag angle can be derived from Equation 15 as follows:

$$\sin \delta = K \sin(\lambda + \delta) = K \sin \gamma \quad (16)$$

$$\gamma = \lambda + \delta \quad (17)$$

The vector expression for the gyro precession-rate vector ($\underline{\Omega}_h$) is as follows:

$$\underline{\Omega}_h = \frac{\underline{s} \times \underline{f}}{R_d} = \left(\frac{\sin \lambda}{R_d \sin \delta}\right)(\underline{h} \times \underline{s}) \quad (18)$$

This equation is a dynamic equivalent to the static solution expressed by Equation 5, and in order to maintain the same steady-state solution for lead angle, the static sensitivity ($R_s$) of Equation 5 has been replaced by a dynamic sensitivity ($R_d$). The relationship between these two values of sensitivity is discussed below.

The smoothing characteristics of the computer described by Equations 15 and 18 may not be apparent because they are nonlinear. However, the nonlinearity is not extreme and these equations can be linearized and combined to give a linear vector differential equation relating $\underline{f}$ and $\underline{s}$, which shows rather clearly the approximate dynamic characteristics of the system. In performing these operations it must be recognized that $$\underline{\dot{h}} = \underline{\Omega}_h \times \underline{h}$$
$$= \left(\frac{\sin \lambda}{R_d \sin \delta}\right)[(\underline{h} \times \underline{s}) \times \underline{h}] \quad (19)$$

and an expansion of this equation in combination with Equation 16 gives $$\left(\frac{KR_d}{1 - K\cos\lambda}\right)\underline{\dot{h}} + \underline{h} = (\sec \delta)\underline{s} \quad (20)$$

which may be approximated by $$\left(\frac{KR_d}{1-K}\right)\underline{\dot{h}} + \underline{h} = \underline{s} \quad (21)$$

Equation 15 may be written as $$\underline{h} = \left(\frac{1}{H(1-K)}\right)\underline{s} - \left(\frac{K}{H(1-K)}\right)\underline{f} \quad (22)$$

which may in turn be approximated by $$\underline{h} = \left(\frac{1}{1-K}\right)\underline{s} - \left(\frac{K}{1-K}\right)\underline{f} \quad (23)$$

By differentiating this equation and combining the resulting expression with Equations 21 and 23, the following final equation is obtained:

$$\left(\frac{KR_d}{1-K}\right)\underline{\dot{f}} + \underline{f} = \left(\frac{R_d}{1-K}\right)\underline{\dot{s}} + \underline{s} \quad (24)$$

The coefficient $(KR_d/(1-K))$ may be considered to be the time constant of the computer since the dynamic sensitivity does not change its magnitude rapidly; and the computer solution time ($S_c$) may be defined as the time required for the computer to erase 95 percent of its initial transient error, in which case $$S_c = \frac{3KR_d}{1-K} \quad (25)$$

This computer solution time should not be confused with the system solution time incorporating the effect of fighter motion on the dynamics of the system. An expression for the system solution time is derived below.

Figure 7:
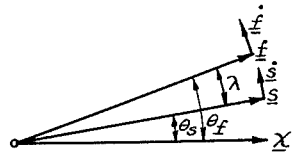
FIG. 7 is a vector resolution diagram.

In observing the noise-transmission characteristics of the computer, it is helpful, although not entirely necessary, to convert Equation 24 into a scalar equation relating angles measured in the plane of action. FIG. 7 shows the unit vectors $\underline{s}$ and $\underline{f}$ together with a stationary reference vector ($\underline{X}$) lying in the plane of action in the approximate direction of $\underline{s}$. Equation 24 may now be written approximately as $$\left(\frac{KR_d}{1-K}\right)\dot{\theta}_f + \lambda = \left(\frac{R_d}{1-K}\right)\dot{\theta}_s$$

or $$\left(\frac{KR_d}{1-K}\right)\dot{\theta}_f + \theta_f = \left(\frac{R_d}{1-K}\right)\dot{\theta}_s + \theta_s \quad (26)$$

If a sinusoidal input noise function be assumed such that $$\theta_s = U \sin(\omega_t)$$

then the magnification ratio (M) between the resulting amplitude of the $\theta_f$ oscillation and the input amplitude (U) is given by $$M = \sqrt{\frac{1 + [R_d\omega/(1-K)]^2}{1 + [KR_d\omega/(1-K)]^2}} \quad (27)$$

Figure 8:
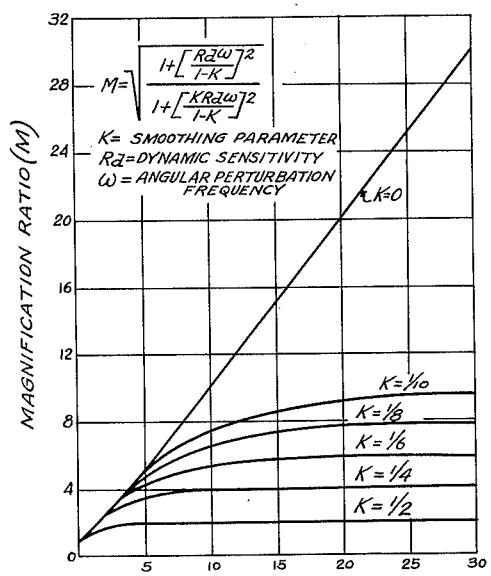
FIG. 8 is a graph of the computer noise magnification ratio.

A graph of this magnification ratio plotted against the nondimensional product ($R_d\omega$) for several possible values of the smoothing parameter is shown in FIG. 8. The curve which is plotted for $K=0$ gives the magnification ratio which would result if not smoothing were employed, since $\delta=0$ for this value of the smoothing parameter (see Equation 16).

Equation 26 may be easily converted to the form $$\left(\frac{KR_d}{1-K}\right)\dot{\lambda}+\lambda=R_d\Omega_s \qquad (28)$$

which shows the computer time constant to be $KR_d/(1-K)$. This would be the time constant for the entire computing system except for the fact that a direct relationship exists between the lead angle and the sight-line angular rate (see Equation 11), thus making it impossible to consider the sight-line angular rate as an independent variable of the system. However, by combining and linearizing Equations 11 and 28, the following equation results:

$$\left(\frac{KD_{ft}R_d}{(1-K)(D_{ft}+R_dV_f)}\right)\dot{\lambda}+\lambda=\frac{D_{ft}R_dV_t\sin\tau}{D_{ft}+R_dV_f} \qquad (29)$$

Here, the forcing function is shown to the right of the equality sign; and while this funcetion is still not completely independent of the lead angle, it is independent to the extent that it is related only to the time integral of $\lambda$ rather than to $\lambda$ itself. The coefficient of the $\lambda$ term of Equation 29 can be shown to be a fairly close approximation to the actual system time constant for reasonable values of the smoothing parameter. The corresponding approximation to the system solution $S_s$ is $$S_s=\frac{3KD_{ft}R_d}{(1-K)(D_{ft}+R_dV_f)} \qquad (30)$$

where $S_s$ is approximately the time required for the system to erase 95 percent of its initial transient error.

The selection of a smoothing parameter for use in the flight-path computer must be made in a somewhat arbitrary manner, since a compromise between a large system solution time and a large noise-amplification ratio involved. Also, the solution time given by Equation 30 represents the system solution time only under the condition that the maximum turning rate of the fighter is not exceeded during the transient intervals. Consequently, it cannot be concluded that the solution time will approach zero as K approaches zero. In other words, there exists some optimum value of K such that a decrease in the smoothing parameter value below this critical value will result in no decrease in solution time due to a turning-rate limitation of the fighter itself. This critical value is determined for certain conditions in a manner now to be described.

It was assumed that, during the target acquisition period, the fighter would be guided along a pure pursuit curve by the carrier-based vectoring control system. At the initiation of automatic radar tracking, the guidance of the fighter is taken over by the flight-path computer and the correct lead angle is generated. If the transition from the pursuit course to the lead pursuit course to be made without appreciable fighter lag, then the angular rate of the indicated heading vector ($f$) must not exceed the maximum fighter turning rate during this transition period. For this set of conditions, the maximum angular rate of the heading vector occurs at the start of the transition period ($\lambda=0$). Consequently, the critical smoothing parameter value can be determined without knowledge of the value of the dynamic sensitivity.

For example, Equation 26 takes the following simple form when the lead angle is made equal to zero:

$$K\dot{\theta}_f=\dot{\theta}_s$$

$$K=\frac{\dot{\theta}_s}{\dot{\theta}_f} \qquad (31)$$

If the minimum allowable value of K is desired, Equation 31 can be solved using the maximum expected value of sight-line angular rate and the maximum allowable value of fighter turning rate. A computer using a smoothing parameter value less than this critical value would indicate a fighter turning rate in excess of the maximum.

Figure 9:
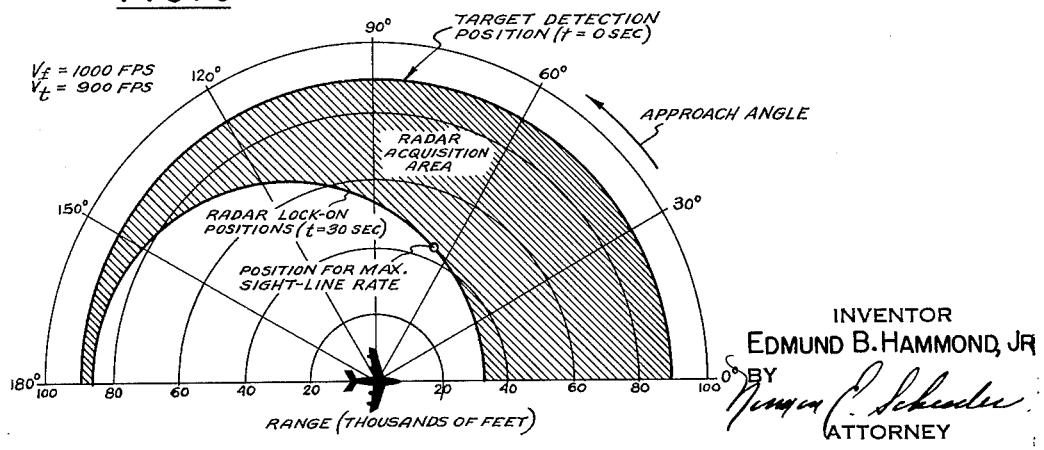
FIG. 9 is a diagram of a typical radar acquisition region.

It is assumed that the target will first be sighted in the radar acquisition scope at a range of 90,000 feet and that a maximum of 30 seconds will be required to execute the radar lock-on procedure. The maximum fighter and target speeds are considered to be 1000 and 900 ft./sec., respectively. For these conditions a locus of possible fighter locations at the time of radar lock-on is as shown in FIG. 9. The approximate fighter location for maximum sight-line angular rate is also shown, the rate being 0.0185 rad./sec. at this point.

The maximum turn acceleration for a high-speed fighter operating at an altitude of about 50,000 feet is assumed to be about 75 ft./sec.$^2$, which gives a maximum turning rate of 0.0750 rad./sec. for a fighter speed of 1000 ft./sec. The critical smoothing parameter value for these selected conditions is therefore given by $$K_{\text{crit.}}=\frac{0.0185}{0.0750}=0.2467 \qquad (32)$$

On the basis of this computation, a value of 1/4 is selected for the flight-path computer smoothing parameter. The maximum noise magnification ratio corresponding to this value is 4 and this ratio appears to be satisfactory.

F. *Determination of the dynamic sensitivity equation*

The dynamic angular-rate sensitivity is defined by Equation 18. Converted to scalar form this equation gives $$R_d=\frac{\sin\lambda}{\Omega_h} \qquad (33)$$

and by combining this equation with Equation 6 the following equation relating the static and dynamic sensitivities is obtained:

$$\frac{R_s}{R_d}=\frac{\Omega_h}{\Omega_s}=1-\frac{\dot{\delta}}{\Omega_s} \qquad (34)$$

Equation 16 may be approximated as follows:

$$\sin\delta=K\sin(\lambda+\delta)$$
$$\cong K\sin\lambda+K\delta\cong\delta$$

or $$\delta\cong\left[\frac{K}{1-K}\right]\sin\lambda\cong\frac{KR_s\Omega_s}{1-K} \qquad (35)$$

Assuming the static sensitivity to be constant, this equation may be differentiated and combined with Equation 34 to give $$\frac{R_s}{R_d}=1-\left[\frac{KR_s}{1-K}\right]\frac{\dot{\Omega}_s}{\Omega_s} \qquad (36)$$

By combining equations 11 and 12, the following expression for sight-line angular rate is obtained $$\Omega_s=\frac{V_t\sin\tau}{D_{ft}+R_sV_f} \qquad (37)$$

For a target of constant velocity, the time derivative of the approach angle ($\tau$) is equal to the sight-line angular rate. Therefore, a differentiation of Equation 37 and a combination with Equation 13 gives $$\frac{\dot{\Omega}_s}{\Omega_s}=\frac{2V_t\cos\tau+V_f\cos\lambda}{D_{ft}+R_sV_f} \qquad (38)$$

This expression can be inserted directly into Equation 36 to give a final dynamic sensitivity equation as follows:

$$\frac{1}{R_d}=\frac{1}{R_s}-\left(\frac{K}{1-K}\right)\left(\frac{2V_t\cos\tau+V_f\cos\lambda}{D_{ft}+R_sV_f}\right) \qquad (39)$$

where $\lambda$ is expressed by $$\lambda = \sin^{-1}\left(\frac{R_s V_t \sin \tau}{D_{ft} + R_s V_t}\right) \quad (40)$$

ADAPTATION OF IDEAL EQUATIONS

The desired computer operation, excluding gravity compensation, is expressed by Equations 15, 18 and 39. Equation 9 gives the magnitude of the gravity compensation angle which represents an angular displacement of the unit vector $f$ from its uncompensated position. This displacement is in a plane passing through $f$ and the true vertical and in such a direction that the angle between $f$ and the zenith is lessened. However, these equations are difficult to mechanize in their present form. Therefore it is necessary to modify and make approximations to them in order to simplify the computer mechanism.

The lead angle computer contains, as its basic element, a free gyro with means for generating accurately controlled precessional rates by the application of torques to the gyro gimbals and means for measuring the displacement of the spin axis of this gyro relative to the fighter axis system as defined by FIG. 6 through the use of gimbal follow-up servos. The precession of this computer gyro is controlled generally in accordance with Equation 18, and the fighter heading vector $f$ is computed from Equation 15 on the basis of computer gyro position and sight line position as measured by the computer gyro follow-up servos and the radar tracking loop servos, respectively.

It was found advantageous to modify Equation 18 by combining it with Equation 15 and assuming $K$ to be 1/4 to give:

$$\underline{\Omega}_h = \left(\frac{3H}{4R_d}\right)(\underline{h} \times \underline{f}) \quad (41)$$

where $H$ is implicitly defined by Equation 15. Also it is convenient to make the temporary assumption that the piloting or heading error remains equal to zero so that the unit vector $f$ can be assumed equal to the unit vector $\underline{x}$ in the direction of the longitudinal axis of the fighter. This assumption yields $$\underline{\Omega}_h = \left(\frac{3H}{4R_d}\right)(\underline{h} \times \underline{x}) \quad (42)$$

Figure 10:
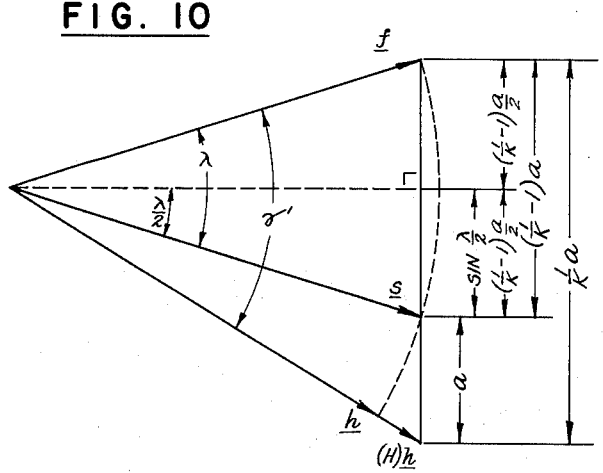
FIG. 10 is a modified vector diagram of the computer gyro arrangement of FIG. 6.

From inspection of FIG. 10 it is evident that $$H \cos\left(\gamma' - \frac{\lambda}{2}\right) = \cos\left(\frac{\lambda}{2}\right) \quad (43)$$

and $$H \sin\left(\gamma' - \frac{\lambda}{2}\right) = \left[1 + \frac{2}{\frac{1}{K}-1} \sin\frac{\lambda}{2}\right] \quad (44)$$

when $K = 1/4$, Equation 44 may be expressed as $$H \sin\left(\gamma' - \frac{\lambda}{2}\right) = \left(\frac{1+K}{1-K}\right) \sin\left(\frac{\lambda}{2}\right) = \frac{5}{3} \sin\left(\frac{\lambda}{2}\right) \quad (45)$$

where $\lambda$ is the angle between $\underline{s}$ and $\underline{f}$ and $\gamma'$ is the angle between $\underline{h}$ and $\underline{f}$, these angles being equal to angles between $\underline{s}$ and $\underline{x}$ and $\underline{h}$ and $\underline{x}$, respectively, under the conditions of the assumption that the piloting error is zero. The angle between $\underline{s}$ and $\underline{x}$ is subsequently called $\sigma$, and the angle between $\underline{h}$ and $\underline{x}$ is called $\gamma$ when this limiting condition is later removed. By solving Equations 43 and 45 simultaneously and eliminating $\lambda$, an expression for $H$ is obtained as follows.

Expanding Equations 43 and 45:

$$H \cos \gamma' \cos \frac{\lambda}{2} + H \sin \gamma' \sin \frac{\lambda}{2} = \cos \frac{\lambda}{2} \quad (46)$$

$$3H \sin \gamma' \cos \frac{\lambda}{2} - 3H \cos \gamma' \sin \frac{\lambda}{2} = 5 \sin \frac{\lambda}{2} \quad (47)$$

Dividing Equations 46 and 47 by $\cos \lambda/2$:

$$H \cos \gamma' + H \sin \gamma' \tan \frac{\lambda}{2} = 1 \quad (48)$$

$$3H \sin \gamma' - 3H \cos \gamma' \tan \frac{\lambda}{2} = 5 \tan \frac{\lambda}{2} \quad (49)$$

Solving Equations 48 and 49 for $\tan \lambda/2$ and equating:

$$\tan \frac{\lambda}{2} = \frac{1 - H \cos \gamma'}{H \sin \gamma'} = \frac{3H \sin \gamma'}{5 + 3H \cos \gamma'} \quad (50)$$

Crossmultiplying:

$$5 + 3H \cos \gamma' - 5H \cos \gamma' - 3H^2 \cos^2 \gamma' = 3H^2 \sin^2 \gamma' \quad (51)$$

Simplifying:

$$3H^2 + 2H \cos \gamma' - 5 = 0 \quad (52)$$

and solving for $H$:

$$H = \frac{-2 \cos \gamma' + \sqrt{4 \cos^2 \gamma' + 60}}{6}$$

or $$H = \frac{-\cos \gamma' + \sqrt{\cos^2 \gamma' + 15}}{3} \quad (53)$$

and this value may be substituted in Equation 42 to obtain:

$$\underline{\Omega}_h = \left(\frac{1}{R_d}\right)\left(\frac{-\cos \gamma + \sqrt{\cos^2 \gamma + 15}}{4}\right)(\underline{h} \times \underline{x}) \quad (54)$$

since the angles $\gamma$ and $\gamma'$ were temporarily assumed equal.

From Equation 54 it is evident that the gyro precession rate, and consequently the gyro gimbal torques, must be linear functions of the dynamic sensitivity reciprocal and that the products of the dynamic sensitivity and the gyro precession rate vector components in the direction of the fighter axes can be determined as functions of the $\underline{h}$ vector components alone. Thus, the torques to be applied to the gyro gimbals may be expressed as $$T_y = \frac{1}{R_d}[f_1(h_y, h_z)] \quad (55)$$

and $$T_z = \frac{1}{R_d}[f_2(h_y, h_z)] \quad (56)$$

Figure 11:
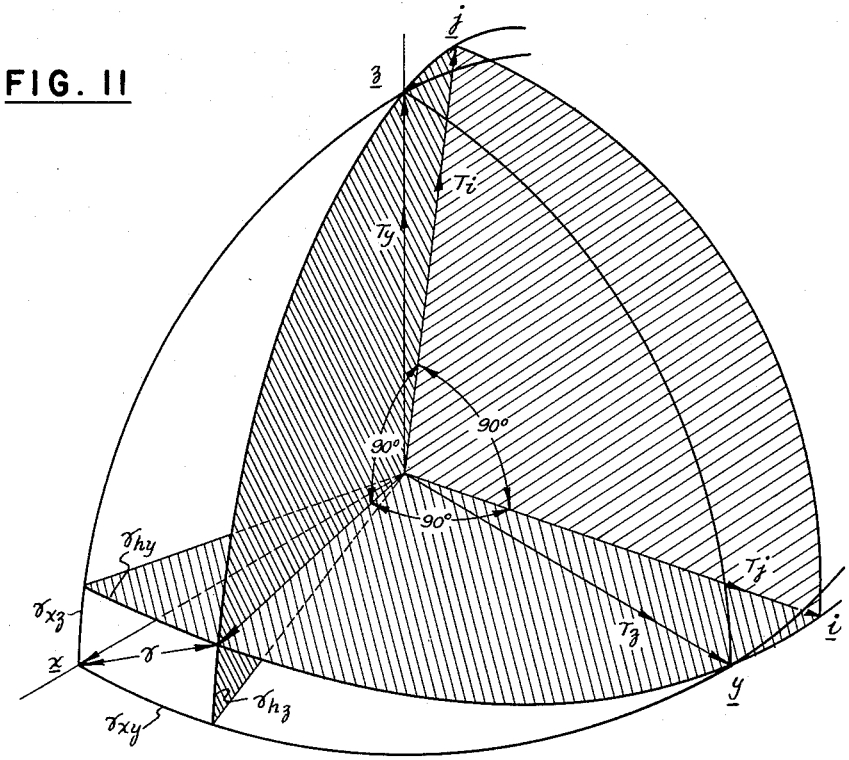
FIG. 11 is a vector diagram used to develop the computer gyro torque relationships.

Equations 55 and 56 may be developed, as follows, by reference to FIG. 11 in which the gyro precession rate is produced by torques $T_y$ and $T_z$ applied about the $y$ and $z$ axes, respectively, and $T_i$ and $T_j$ are torques applied to the gyro normal to the gyro momentum axis $h$. Then Total torque $$\underline{T} = \underline{T}_i + \underline{T}_j \quad (57)$$

and, from inspection:

$$\underline{T}_i = \frac{\underline{h} \times (\underline{y} \times \underline{h})}{|\underline{h} \times (\underline{y} \times \underline{h})|}\left[\frac{T_y}{\cos \gamma_{hy}}\right] \quad (58)$$

$$\underline{T}_j = \frac{\underline{h} \times (\underline{z} \times \underline{h})}{|\underline{h} \times (\underline{z} \times \underline{h})|}\left[\frac{T_z}{\cos \gamma_{hz}}\right] \quad (59)$$

expanding Equations 58 and 59

$$\underline{T}_i = \frac{T_y}{\cos^2 \gamma_{hy}}[\underline{y} - (\underline{h} \cdot \underline{y})\underline{h}] \quad (60)$$

$$\underline{T}_j = \frac{T_z}{\cos^2 \gamma_{hz}}[\underline{z} - (\underline{h} \cdot \underline{z})\underline{h}] \quad (61)$$

The precession rate of the gyro is expressed by $$M\underline{\Omega}_h = \underline{h} \times \underline{T} = \underline{h} \times (\underline{T}_i + \underline{T}_j) \quad (62)$$

in which M is proportional to the angular momentum of the gyro. Substituting Equations 60 and 61 in Equation 62 and expanding $$M\underline{\Omega}_\text{h} = \frac{T_y}{(1-h_y^2)}(\underline{h} \times \underline{y}) + \frac{T_z}{(1-h_z^2)}(\underline{h} \times \underline{z}) \quad (63)$$

Expressing Equation 63 in terms of the $x$, $y$, $z$ components $$\underline{\Omega}_\text{h} = \frac{T_y}{M(1-h_y^2)}[-h_z\underline{x}+h_x\underline{z}] + \frac{T_z}{M(1-h_z^2)}[h_y\underline{x}-h_x\underline{y}] \quad (64)$$

Expressing Equation 54 in terms of the $x$, $y$, $z$ components $$\underline{\Omega}_\text{h} = h_z\left[\frac{1}{4R_\text{d}}(-h_x+\sqrt{h_x^2+15})\right]\underline{y} - h_y\left[\frac{1}{4R_\text{d}}(-h_x+\sqrt{h_x^2+15})\right]\underline{z} \quad (65)$$

Since $$\sqrt{h_x^2+h_y^2+h_z^2}=1$$

then $$h_x^2 = 1-(h_y^2+h_z^2) \quad (66)$$

Substituting Equation 66 in Equation 64

$$\underline{\Omega}_\text{h} = \underline{x}\left[\frac{T_z h_y}{M(1-h_z^2)} - \frac{T_y h_z}{M(1-h_y^2)}\right] - \underline{y}\left[\frac{T_z\sqrt{1-(h_y^2+h_z^2)}}{M(1-h_z^2)}\right] + \underline{z}\left[\frac{T_y\sqrt{1-(h_y^2+h_z^2)}}{M(1-h_y^2)}\right] \quad (67)$$

Substituting Equation 66 in Equation 65

$$\underline{\Omega}_\text{h} = \underline{y}\left[\frac{h_z}{4R_\text{d}}(-\sqrt{1-(h_y^2+h_z^2)}+\sqrt{16-(h_y^2+h_z^2)})\right] - \underline{z}\left[\frac{h_y}{4R_\text{d}}(-\sqrt{1-(h_y^2+h_z^2)}+\sqrt{16-(h_y^2+h_z^2)})\right] \quad (68)$$

Equating the coefficients of the $y$ and $z$ components of Equations 67 and 68 and solving for the ratio of torque to angular momentum $$-\frac{T_z}{M} = \frac{h_z(1-h_z^2)}{4R_\text{d}}\left[-1+\sqrt{\frac{16-(h_y^2+h_z^2)}{1-(h_y^2+h_z^2)}}\right] \quad (69)$$

$$-\frac{T_y}{M} = \frac{h_y(1-h_y^2)}{4R_\text{d}}\left[-1+\sqrt{\frac{16-(h_y^2+h_z^2)}{1-(h_y^2+h_z^2)}}\right] \quad (70)$$

It can be shown that Equations 69 and 70 may be approximated, respectively, by $$-\frac{T_z}{M} = \frac{C \sin N\gamma_{xz}}{R_\text{d}} \quad (71)$$

and $$-\frac{T_y}{M} = \frac{C \sin N\gamma_{xy}}{R_\text{d}} \quad (72)$$

in which $C = 0.43955$ and $$N = \frac{29}{17}$$

Equations 71 and 72 express the torques required to precess the computer gyro but do not include corrections for tracking errors and missile gravity drop. In order to maintain the lead angle solution independent of tracking or piloting errors a first order correction proportional to $\epsilon_y$, $\epsilon_z$, as obtained from the error signals transmitted to the pilot's indicator unit, is included as a crossfeed in the torque network. In addition the $y$ and $z$ components $\beta \cos \theta_\text{p} \sin \theta_\text{r}$, $\beta \cos \theta_\text{p} \cos \theta_\text{r}$ of the gravity correction expressed by Equation 9, as obtained from the vertical gyro unit are included. In their final form the torque equations are as follows:

$$\frac{T_y}{M} \simeq \frac{C \sin N\gamma_{xy} + \epsilon_y + \beta \cos \theta_\text{p} \cos \theta_\text{r}}{R_\text{d}} \quad (73)$$

$$\frac{T_z}{M} \simeq \frac{C \sin N\gamma_{xz} + \epsilon_z + \beta \cos \theta_\text{p} \sin \theta_\text{r}}{R_\text{d}} \quad (74)$$

SOLUTION FOR H

In order to maintain the vector relationship defined by FIG. 6, it is essential to determine the magnitude of the variable H in Equation 15. To this end it is necessary to obtain the direction cosines of the line-of-sight gyro and of the computing line gyro. These may be obtained from FIG. 21 which is a portion of a unit sphere in which the $h$ vector is related to the roll $(x)$, pitch $(y)$ and yaw $(z)$ axes of the aircraft.

The $\underline{h}$ and $\underline{s}$ vectors being unit vectors are radii of the unit sphere. The plane of action is drawn through the origin and the tips of $\underline{h}$ and $\underline{s}$. A plane is drawn through $\underline{h}$ and $\underline{z}$ and the angle in this plane from the $xy$ plane to $\underline{h}$ is designated $\gamma_{hz}$. The $hz$ plane intersects the $xy$ plane and makes an angle with the $xz$ plane which is designated $\gamma_{xy}$. Another plane is drawn through $h$ and $y$ and the angle between this plane and the $xy$ plane is designated $\gamma_{xz}$. From FIG. 21 it is evident that $$h_x = \cos \gamma_{hz} \cos \gamma_{xy}$$
$$h_x = \cos \gamma_{hz} \sin \gamma_{xy} \quad (75)$$
$$h_z = \sin \gamma_{hz}$$

Figure 21:
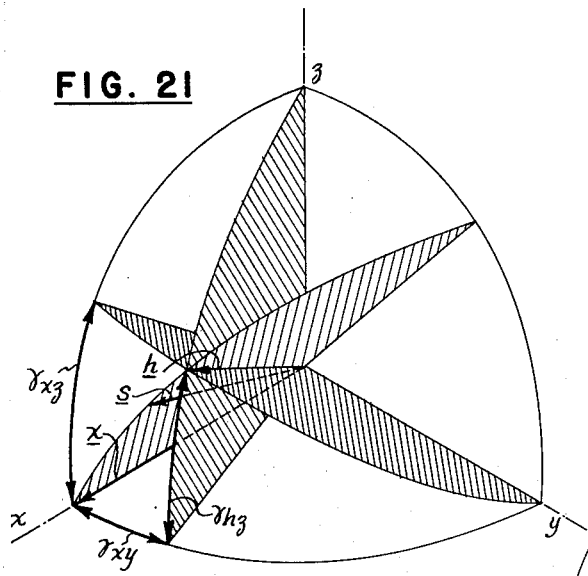
FIG. 21 is a portion of a unit sphere illustrating the relationship of the $x$, $y$, $z$ components of the gyro unit vector and its related angles.
Figure 22:
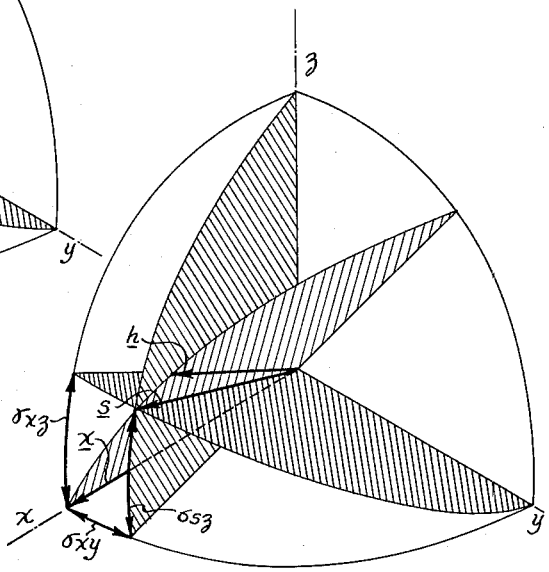
FIG. 22 is a portion of a unit sphere illustrating the relationship of the $x$, $y$, $z$ components of the sight line unit vector and its related angles.

FIG. 22 is similar to FIG. 21 except that the two planes other than the plane of action are drawn through $\underline{s}$. The purpose of this figure is to establish certain relations between the $x$, $y$ and $z$ components of the $s$ vector and the sines and cosines of certain angles. From FIG. 22 it is evident that $$s_x = \cos \sigma_{sz} \cos \sigma_{xy}$$
$$s_y = \cos \sigma_{sz} \sin \sigma_{xy} \quad (76)$$
$$s_z = \sin \sigma_{sz}$$

Having established Equations 75 and 76 it now remains to show how the electromechanical circuits in the computer solve the vector relations shown in FIG. 6.

Figure 23:
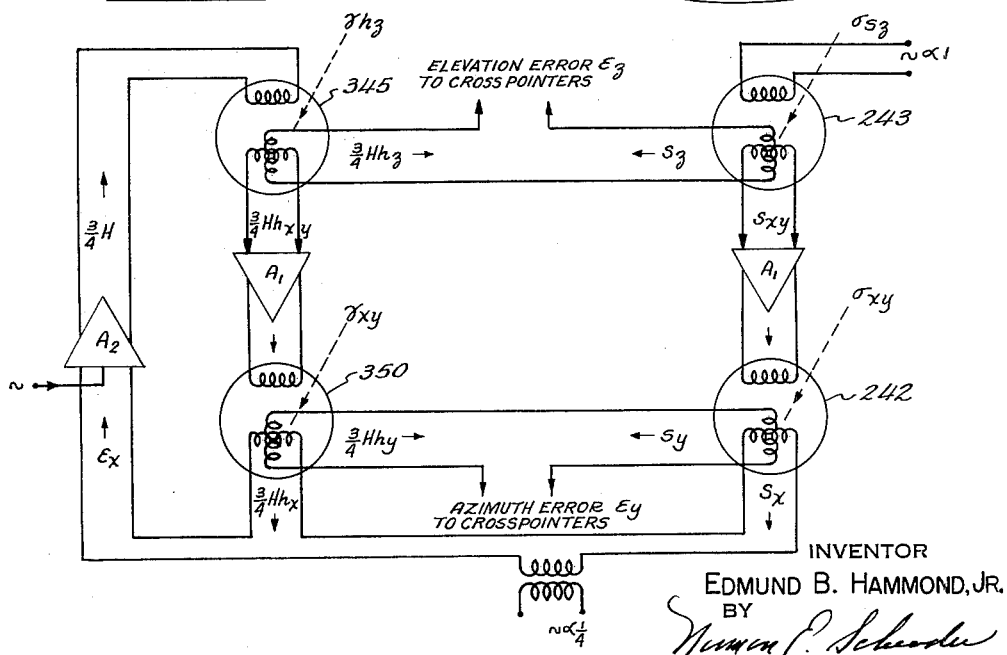
FIG. 23 is a schematic diagram of the resolver circuit used to derive the elevation and azimuth cross-pointer signals.
Figure 24:
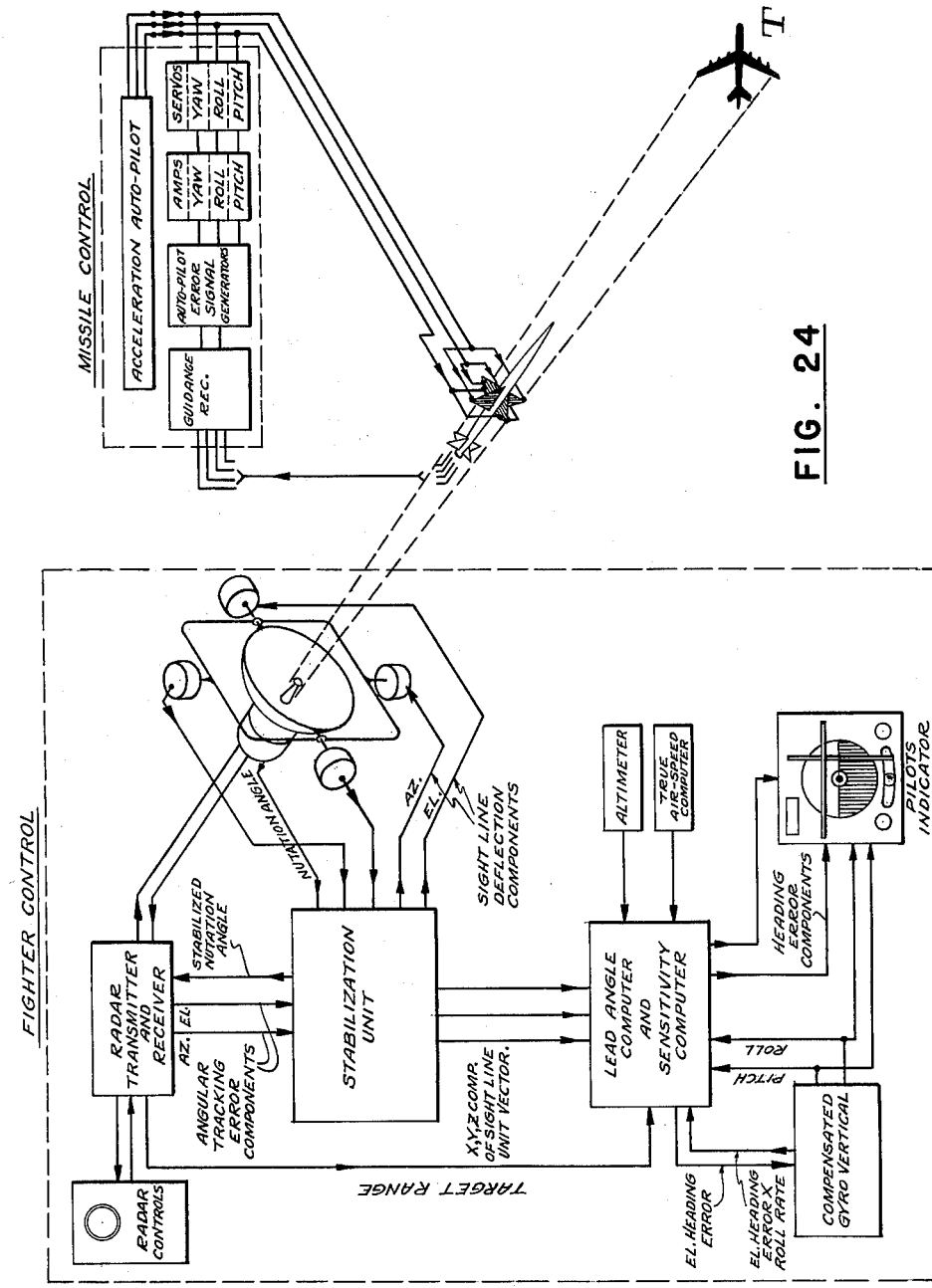
FIG. 24 is a simplified schematic diagram of the fighter and missile control systems.

FIG. 23 is a diagram of the resolver circuit that is employed herein to produce the voltage signals used to actuate the cross-pointers in the pilot's indicator unit. The two resolvers shown on the left are the gamma resolvers and measure angles associated with the $\underline{h}$ vector which is the vector showing the direction of the spin axis of the computer gyro. The resolvers on the right are the sigma resolvers and measure angles associated with the spin axis of the stabilization gyro.

It should be mentioned at this point that these synchro resolvers are connected for $1\phi$ to $2\phi$ operation. In this case there are two output voltages from the rotor windings of the synchro; one is equal to the product of the input voltage on the stator and the cosine of the angle between the rotor and the stator, the other is equal to the product of the input voltage on the stator and the sine of the angle between the rotor and the stator.

The uper right hand resolver is designated the $\sigma_{sz}$ resolver and its rotor is positioned so as to produce the angle $\sigma_{sz}$ between its rotor and stator. An A.-C. voltage proportional to unity is impressed on its stator. The output voltages on its rotors are proportional to:

$$1 \cos \sigma_{sz} = s_{xy}$$
$$1 \sin \sigma_{sz} = s_z$$

where $s_z$ is the $z$ component of the $\underline{s}$ vector and $s_{xy}$ is the projection of the $\underline{s}$ vector on the $xy$ plane.

The $s_{xy}$ voltage is fed through an isolation amplifier $A_1$ to the stator of the $\sigma_{xy}$ resolver. The rotor of this resolver is positioned to produce the angle $\sigma_{xy}$ between its rotor and stator. The output voltages on its rotor windings are proportional to:

$$s_{xy} \cos \sigma_{xy} = s_x$$
$$s_{xy} \sin \sigma_{xy} = s_y$$

The upper left hand resolver is the $\gamma_{hz}$ resolver. If it be assumed for the moment that a voltage proportional to $\tfrac{3}{4}H$ is impressed on its stator, then, when its rotor is positioned to produce the angle $\gamma_{hz}$ between its rotor and stator, its outputs are:

$$\tfrac{3}{4}H \cos \gamma_{hz} = \tfrac{3}{4} H h_{xy}$$
$$\tfrac{3}{4}H \sin \gamma_{hz} = \tfrac{3}{4} H h_z$$

The $\tfrac{3}{4} H h_{xy}$ voltage is fed through an isolation amplifier $A_1$ to the stator of the $\gamma_{xy}$ resolver. The rotor of this resolver is so positioned as to produce the angle $\gamma_{xy}$ between its stator and rotor. The outputs of this resolver are given by:

$$\tfrac{3}{4} H h_{xy} \cos \gamma_{xy} = \tfrac{3}{4} H h_x$$
$$\tfrac{3}{4} H h_{xy} \sin \gamma_{xy} = \tfrac{3}{4} H h_y$$

It can now be demonstrated that these component relationships are used in the solution of H.

Writing Equation 15 in component form, with K equal to $\tfrac{1}{4}$:

$$f_x = 4s_x - 3Hh_x$$
$$f_y = 4s_y - 3Hh_y \qquad (77)$$
$$f_z = 4s_z - 3Hh_z$$

In the resolver circuit disclosed, the y components of the $\gamma_{xy}$ and $\sigma_{xy}$ resolvers are combined and transmitted as an error signal $\epsilon_y$ to the azimuth indicator of the crosspointer unit. Similarly the sum of the z components of the $\gamma_{hz}$ and $\sigma_{hz}$ resolvers is transmitted as an error signal $\epsilon_z$ to the elevation indicator. When the heading error is zero, the y and z components of Equation 77 equal zero and the x component equals unity, Equation 77 becomes $$\tfrac{3}{4} H h_x - S_x + \tfrac{1}{4} = 0$$
$$\tfrac{3}{4} H h_y = S_y \qquad (78)$$
$$\tfrac{3}{4} H h_z = S_z$$

Therefore, no signal is sent to the crosspointers. However, whenever a fighter heading error exists, corresponding signals $\epsilon_z$ and $\epsilon_y$ are transmitted to the pilot's indicator, because these would be an inequality in the y and z components of Equation 78.

The preceding solution for error signals $\epsilon_y$ and $\epsilon_z$ is based on the assumption that a voltage proportional to $\tfrac{3}{4}H$ is impressed on the stator of the $\gamma_{hz}$ resolver. In the present arrangement this value of $\tfrac{3}{4}H$ is obtained by means of a feedback amplifier loop using the x component of Equation 78. Dividing the x component of Equation 78 by 4

$$\tfrac{1}{4} = S_x - \tfrac{3}{4} H_{hx} \qquad (79)$$

Then, let Q equal $\tfrac{3}{4}H$ $$\tfrac{1}{4} = S_x - Q_{hx} \qquad (80)$$

An expression for Q may be written as $$G[\tfrac{1}{4} - (S_x - Q_{hx}] = Q \qquad (81)$$

where G is an arbitrary constant.
Solving Equation 81 for Q $$Q = \frac{1/4 - s_x}{\dfrac{1}{G} - h_x} \qquad (82)$$

if G is infinite $$Q = \frac{1/4 - s_x}{h_x} = 3/4 H \qquad (83)$$

which is identical with the solution for $\tfrac{3}{4}H$ from Equation 79.

Equation 81 may be solved by means of a circuit employing a feedback amplifier $A_2$ with a gain of G. If an amplifier of infinite gain could be designed, it can be seen from Equation 82 that the expression for Q could be solved to produce $\tfrac{3}{4}H$ exactly. Since amplifiers are limited to finite gains, it is required to apply a compensating factor. For this purpose, for the condition of zero lead angle (in which case H equals unity), a fixed voltage is added to the input of amplifier $A_2$. This voltage is determined by adjustment until $\epsilon_x$ is zero, which satisfies the requirement of the x component of Equation 78; i.e., the summation of the x component outputs of the $\gamma$ and $\sigma_{xy}$ resolvers plus a voltage proportional to $\tfrac{1}{4}$ equals zero.

SOLUTION FOR $1/R_d$

Equation 39 can be used to convert the static angular-rate sensitivity values, described above, into the dynamic sensitivity values which are to be determined by the sensitivity computer circuit. On the basis of the latter values, an empirical expression for the dynamic sensitivity reciprocal may be obtained that is more suitable for use in the computer mechanism, as follows:

$$\frac{1}{R_d} = \frac{696.7}{V_f + 1533}\left[1 + \frac{3.816(2\dot{D}_{ft} + V_f + 80)}{D_{ft} + 5000}\right] \qquad (84)$$

where $V_f$ and $\dot{D}_{ft}$ are expressed in ft./sec., $D_{ft}$ in feet, and $R_d$ in seconds. The reciprocal of dynamic sensitivity is given here because, in the embodiment disclosed, the lead-computer mechanism requires it in that form. It will be noted that only quantities which are directly measurable within the fighter are used as independent variables in Equation 84.

FIGHTER CONTROL SYSTEM
(FIG. 24)

In the embodiment disclosed herein, the invention comprises a fighter control system, that operates in conjunction with the radar set, to perform the functions required to compute and direct the fighter pilot to follow the proper flight path during launching and guidance of the Sparrow missile, and during the recovery period after an attack; to indicate the maximum and minimum missile release points, and to provide pilot warning signals; and to stabilize the scanner servo drives and the scanner reference plane. Essentially, the system comprises:

(a) Stabilization unit
(b) Lead angle computer
(c) Sensitivity computer
(d) Pilot indicator unit
(e) Compensated vertical gyro

STABILIZATION UNIT
(FIGS. 25, 30, 31)

The primary functions of the stabilization unit are to stabilize the radar antenna against disturbing motions of the fighter, to provide target azimuth and elevation data for use in the computer, and to modify the timing of the transmitted radar missile guidance pulses to compensate for the component of antenna roll about its nutation axis.

Two free gyros are required to accomplish these functions; namely, a stabilization gyro and a phase reference gyro. The stabilization gyro is a line-of-sight gyro with electromagnetic torque motors for precessing the gyro in accordance with measured radar error signals, the stabilization unit platform and radar antenna being slaved to the stabilization gyro through the action of their respective azimuth and elevation drives. The phase reference gyro is designed to maintain its outer gimbal axis essentially parallel to the stabilization gyro spin axis, and its spin axis parallel to the fighter yaw axis at the time of launching. This gyro is uncaged during the time-of-flight of the missile, and a synchro resolver mounted on its outer gimbal shaft is used to modify the frequency of the scanner nutation reference voltage during this period.

Because of the inherent smoothing action of the stabilization gyro, the direction of its spin axis is measured and used as an indication of the direction of the target relative to the fighter. These measured target-direction components are transmitted to the computer where a continuous computation of tracking error is made for transmittal to the pilot indicator unit.

The elements of the stabilization unit are mounted on an azimuth platform 205 which is supported by a base casting that is rigidly secured to the fighter airframe in a plane normal to the fighter yaw axis.

The platform is pivoted at its center to the base casting and rotates about the azimuth axis between limits of ±70 degrees. In addition to servomotors, gear trains, data transmission components, dials, and other accessory equipment for both the azimuth and elevation axes, the azimuth platform supports an elevation frame 210 which supports the stabilization gyro assembly 215 and the phase reference gyro 220. Elevation frame 210 is free to rotate about an axis perpendicular to the azimuth axis between limits of ±60 degrees relative to the azimuth platform.

Stabilization gyro assembly 215 consists of the stabilization gyro and its associated gimbal rings, four torque motors, and four platform pickoffs. All of these units are supported on elevation frame 210.

The stabilization gyro comprises an induction motor enclosed in a case 225 which in turn is supported in a gimbal 226. The case may be secured with the gyro spin axis normal to the azimuth and elevation axes by means of alignment pins. When not pinned the gyro is free to move ±4 degrees in any direction in its gimbals.

Armatures in the shape of spherical sections are mounted on gyro case 225 at opposite ends of the gyro spin axis. One armature 27 is of soft iron and moves between the poles of four small electromagnets or torque motors 228 which are used to precess the gyro. Each torque motor consists of a coil wound on a C-shaped, solid core. The second armature 229 is of copper and moves between the poles of four platform pickoffs 230. Each pickoff consists of a coil wound on a laminated, C-shaped core. Motion of the gyro spin axis relative to the pickoffs produces a signal voltage which is used to drive either the platform servos or the torque motors, depending upon the mode of system operation.

Phase reference gyro 220 is a free gyro, similar to the stabilization gyro, and is supported by a gimbal 231 that is fixed to elevation frame 210 and has an axis parallel to the spin axis of the stabilization gyro when pinned. Gyro 20 is normally caged, by a suitable caging mechanism, with its spin axis parallel to the fighter yaw axis. This gyro and a similarly caged free gyro in the missile are uncaged simultaneously at launching, thus providing a stabilized directional reference between the missile and the fighter during the flight of the missile. The outer axis of gimbal 231 positions the rotor of a phase reference resolver 232. When the phase reference gyro is uncaged, resolver 232 shifts the phase of the reference signals supplied by the nutator drive to the pulse timing circuits in synchronizer 105 so that the orientation of the guidance pulses is stabilized regardless of fighter maneuvers.

*Data transmisison components.*—The gear trains in the azimuth and elevation axes of the stabilization unit are each meshed with a coarse (1:1) and a fine (35:1) synchro transformer 240, 241 and a 2φ-2φ synchro resolver 242, 243. The elevation axis also contains a 1φ-1φ synchro resolver 244 that is driven at a ratio of 40:39. The synchro transformers 240, 241 are part of the two-speed data transmission system which slaves the antenna to the stabilization unit in the track and auto-track modes and slaves the stabilization unit to the radar hand control 145 in the acquisition mode. The resolvers 242, 243 convert the azimuth and elevation components of the fighter-to-target sight line into components along the three axes of the fighter for use in the lead angle computer. The 1φ-1φ resolver 244 in the elevation axis is used in the feedback loop of a high-gain amplifier (the secant gain corrector). The purpose of this latter resolver is to feed back to the corrector circuit the product of its output and the cosine of the platform elevation angle. The functioning of these circuits is described below.

STABILIZATION UNIT OPERATION

In the acquistion, track and auto-track modes of operation, the components of the stabilization unit function as integral parts of several servo loops which are used to align various direction sensitive components in the fighter control system.

*Acquisition mode.*—In the acquisition mode, the stabilization gyro 225 is slaved to the stabilization platform 205 by means of the stablization gyro loop and the stabilization platform 205, is slaved to the radar hand control 145 by means of the platform servo loop. Hence, the spin axis of the stabilization gyro is slaved to the line-of-sight and, therefore, the spin axis is approximately aligned with the sight line to the target when the TRACK BUTTON is pressed.

Since the stabilization gyro 225 is mounted in the elevation frame 210 which in turn is mounted on the azimuth platform, the spin axis of the gyro tends to maintain a fixed direction in space at all times and, therefore, any movement of the elevation frame causes a relative displacement between the elevation pickoff coils 230 and the copper armature 229. Similarly, any displacement of the azimuth platform causes a relative displacement between the lateral pickoff coils and the armature. These displacements generate error signals which are fed to the elevation and the azimuth torque motors 228. The motors reposition the armature 227 and hence the spin axis of the gyro. In this manner, the gyro is slaved to the azimuth platform 205 and the elevation frame 210.

Figure 31:
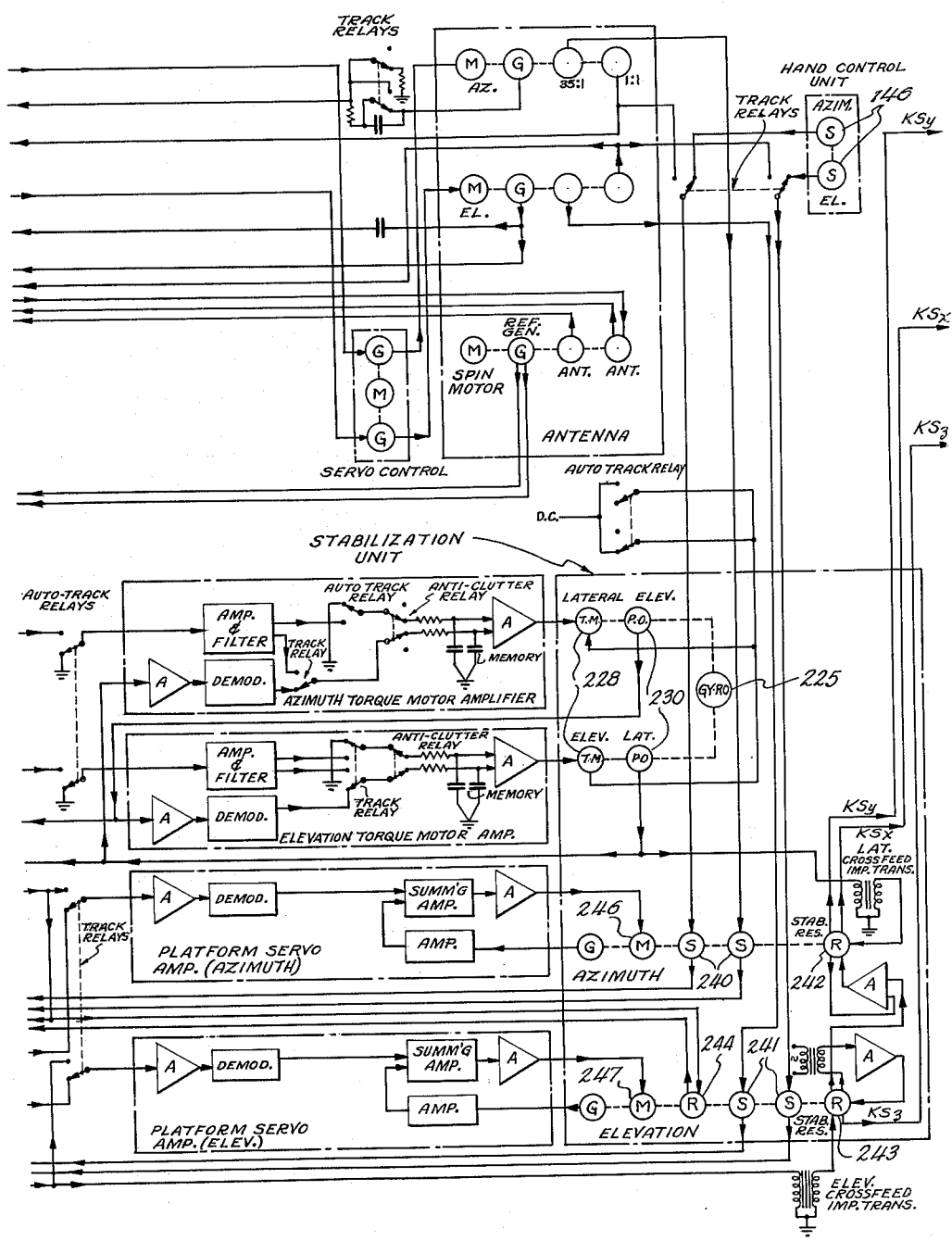

The frame and the platform are slaved to the radar hand control 145 by means of synchro transformers 146 (see FIG. 31). Movement of the radar hand control 145 causes relative displacements between the rotors of the azimuth and elevation synchros 146 in the radar hand control 145 and those in the stabilization unit. These displacements cause error signals to be generated, and the error signals are fed to the azimuth and elevation servo motors 246, 247 which position the azimuth platform 205 and the elevation frame 210. Hence the platform and the frame are slaved to the radar hand control.

*Track and auto-track mode.*—In the track mode the stabilization gyro is a free gyro and therefore, maintains the orientation in space that it had at the instant the "TRACK BUTTON" was pressed, i.e., its spin axis is pointed along the line-of-sight to the target. However, in the auto-track mode, the antenna is slaved to the stabilization gyro through the stabilization gyro servo loop and therefore, the center of the radar beam is oriented along the line of sight to the target.

Radar error signals proportional to the difference in angular position between the center of the radar beam and the line-of-sight to the target are fed to the torque motors from the angle tracking unit through the radar demodulators and the gyro is caused to precess until these error signals are zeroed out. The error signals are zeroed out since the antenna is slaved to the stabilization gyro and follows the gyro in the direction that tends to reduce the angular difference between the antenna line-of-sight and the center of the radar beam. Therefore, the spin axis of the stabilization gyro is aligned with the line-of-sight to the target.

In the track and auto-track modes of operation, the stabilization platforms are slaved to the stabilization gyro by the platform servo loop. This is done so as to maintain the plane of the elevation frame normal to the spin axis of the gyro and, therefore, to keep a datum line on this frame parallel to the axis. Hence the gimbal axes are maintained perpendicular to the spin axis of the stabilization gyro.

Stabilization unit—antenna servo loop

The antenna servo loop consists of the radar antenna and its associated azimuth and elevation servo motors, the servo control unit, the antenna azimuth and elevation servo amplifiers; certain relays and amplifiers in the platform switching unit; the antenna and platform synchros and the platform pickoffs as data devices during track and autotrack modes; and the search control unit, step relay unit and certain controls on the indicator console as data input devices during beacon, search and acquisition modes. This servo loop is also shown in block form in FIGS. 30 and 31.

In beacon, search and acquisition modes, the function of the antenna servo loop is to slave the antenna and hence the radar beam to program controls in the search control unit.

In track and autotrack modes, the antenna servo loop keeps the antenna and, hence, the radar beam aimed along the stabilization gyro spin axis line of sight to the target. It will be understood that a fine and coarse multi-speed data system is used in the servo loop for slaving the antenna to the stabilization platforms, since the accuracy required of the antenna servo is greater than that obtainable from a coarse speed system alone. Two synchros are geared to each of the antenna elevation and azimuth gear trains. The coarse synchro is geared at a 1:1 ratio to the antenna and the fine synchro at a 35:1 ratio to the antenna. These four synchros are excited by a suitable power source and their stators are connected to the stators of four corresponding synchro control transformers geared to the stabilization platforms at the same gear ratios. The stators of the fine synchros are connected directly while the coarse synchro stators are connected through contacts of energized track relays, which switch the platform synchros stator connections from the hand control synchros to the antenna coarse synchros.

The output signals from the fine and coarse synchro rotors are error signals which are proportional to the difference in position of the platform and the antenna. These error signals are fed to the azimuth and elevation antenna servo amplifier. The error signal from the fine synchros has an accuracy 35 times that of the coarse synsynchros; therefore, it is desirable to take the error signal from the fine synchros. However, it is necessary to provide fine-coarse selectors for controlling the antenna from the outputs of the coarse synchros until the correct revolution of the fine synchros is reached.

The error signal outputs of the fine-coarse selectors are fed through contacts of energized track relays, to the summing amplifier and demodulator inputs of the azimuth and elevation antenna servo amplifiers. Here the error signals are summed with the pickoff error signals from the pickoffs of the stabilization gyro. These pickoff error signals are the same error signals that control the platform servo during track and autotrack modes and they are fed forward to the antenna servo amplifiers for the purpose of eliminating errors generated in the platform servo loop from the antenna servo loop. For a complete discussion of these crossfeeds, reference is made to copending application Ser. No. 747,008, filed May 9, 1947, in the names of W. T. White, E. B. Hammond, Jr., and G. C. Newton, Jr.

This combined error signal is then amplified, demodulated, summed with the tachometer feedback stabilizing signal, and power amplified in the antenna servo amplifiers in the same manner as described previously for the other modes of operation. In like manner, the outputs of the antenna servo amplifiers are fed to the fields of the servo control unit generators which supply the control current to the antenna servo motors. These motors now drive the antenna in such a direction as to zero out this error signal and thus keep the antenna and radar beam aimed along the line of sight to the target.

Figure 25:
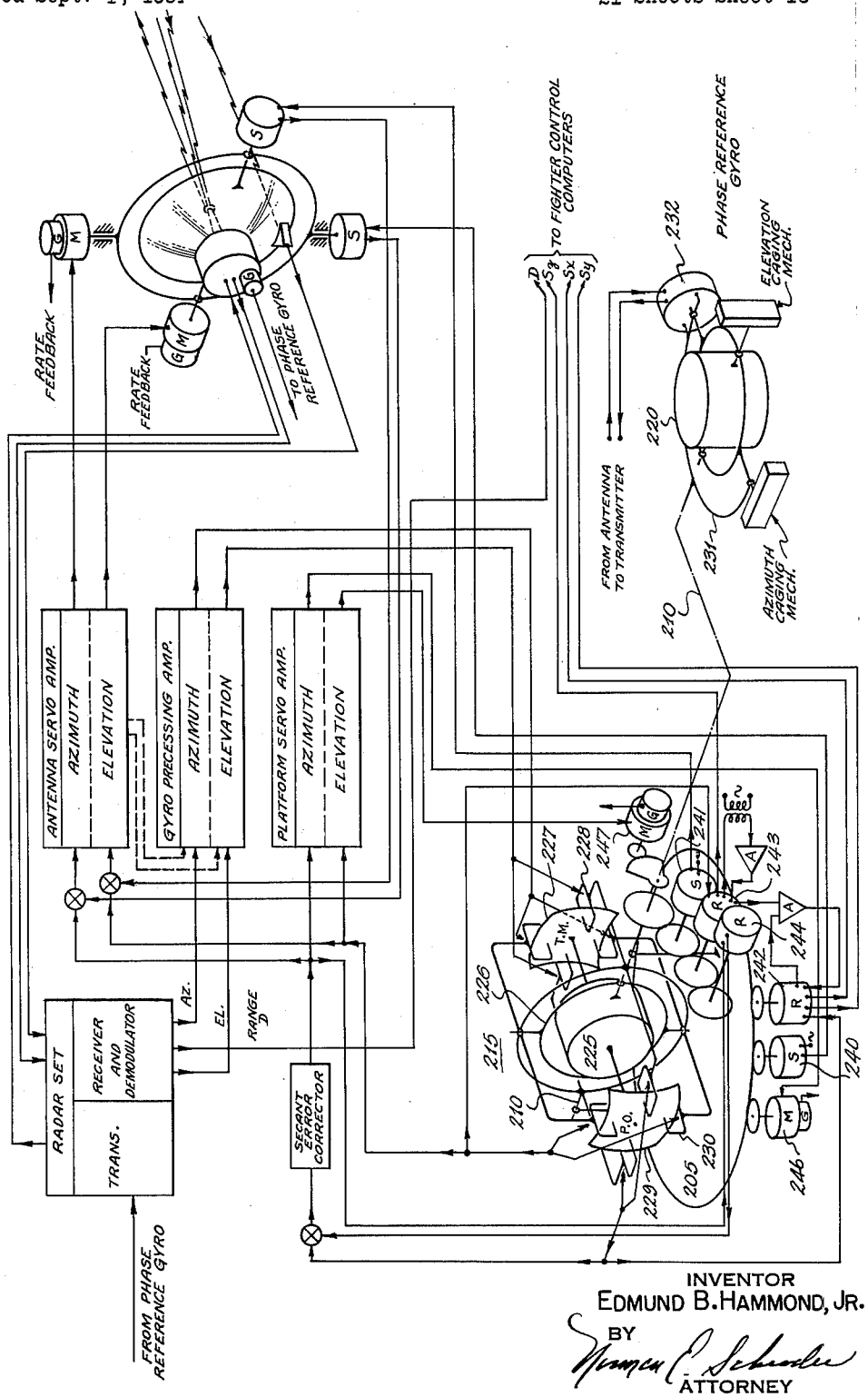
FIG. 25 is a schematic diagram of the stabilization unit and associated circuits.

In addition to the above servo functions, the radar tracking loop system supplies information to other parts of radar system. The error signals from the stabilization gyro pickoffs are fed through resolver impedance transformers, to one set of windings of the azimuth and elevation platform resolvers, in the stabilization unit (FIGS. 25 and 31). These resolvers accurately resolve the fighter-to-missile line of sight (gyro spin axis) into signals representing the fighter axis components of the line of sight and feed these signals to the computer.

The phase reference gyro 220, which is mounted on the stabilization platform 205 by a gimbal ring 231 connected to the elevation frame 210, is caged so that its spin axis is aligned with the yaw axis of the airplane prior to launching the missile. This is accomplished by means of suitable caging switches, and caging motors in the stabilization unit. When the missile is launched, this gyro is uncaged by action of an uncaging relay which is energized from the launch button or switch. A similar gyro in the missile is uncaged at the same time and these gyros provide a common reference that is fixed relative to space regardless of airplane roll. The phase reference resolver 232 is mounted on the elevation frame and its rotor is connected to the phase reference gyro gimbal 231. Its rotor windings are excited from the spin reference generator on the antenna and the output signals from its stator windings are trignometric functions of the airplane roll angle. These signals are fed to the radar and trigger the quadrant identification pulses which are transmitted to the missile. Thus regardless of the roll of the airplane about the line of sight, the guidance pulses received by the missile will be with reference to the missile gyro at the instant of launch, except for the gyro drifts which will not be appreciable in the short time of missile flight.

Stabilization unit—gyro servo loop

The stabilization gyro servo loop consists of the stabilization gyro and its associated torque motor coils, the torque motor amplifiers, certain relays in the platform switching unit, the pickoffs as the data device during beacon, search and acquisition modes, and the radar as the data device during autotrack mode. This servo loop is shown in block form in FIGS. 30 and 31.

In beacon, search and acquisition modes, the function of the stabilization gyro servo loop is to slave the stabilization gyro to the stabilization platforms. The gyro is mounted in an elevation frame which in turn is mounted on an azimuth platform as shown schematically in FIG. 25. At all times the stabilization gyro is tending to maintain a fixed spin axis. Any movement of the elevation frame produces a relative displacement between the vertical pickoff coils mounted on the elevation frame and the copper armature connected to the stabilization gyro case. Similarly, any movement of the azimuth platform produces a relative displacement between the lateral pickoff coils and the copper armature.

These relative displacements create pickoff error signals proportional to the displacements. The error signals are then fed to the inputs of the azimuth and elevation torque motor amplifiers. After amplification and demodulation, these signals are fed through contacts of unenergized track relay and unenergized anti-clutter relay and into the power amplifiers of the torque motor amplifiers. These amplifiers supply control current to the lateral and elevation torque motor coils mounted on the elevation frame. The torque motor armature is connected to the opposite end of the stabilization gyro from the pickoff armature and the control currents cause the torque motors to precess the gyro until the pickoff signals are reduced to zero.

In the track mode, power to the torque motor coils and power amplifiers are open circuited by energized track relay and the torque motor amplifier and filter outputs are connected to the power amplifier inputs through contacts of the same relay. The inputs to the amplifier and filter are grounded through contacts of unenergized autotrack relay, and no precessional torques are applied to the gyro. Therefore, in this mode the stabilization gyro is a free gyro and its spin axis maintains the same space reference that it had at the instant the operator pressed the track button.

In autotrack mode, power is reconnected to the torque motor coils and power amplifiers through contacts of energized autotrack relay and the radar azimuth and elevation error signals from the radar demodulators and are fed through contacts of the same relay to the input to the amplifier and filters of the torque motor amplifiers. These radar errors are proportional to the difference in the angular positions of the line of sight to the target and the center of the radar beam. (See FIG. 19.) They are filtered, amplified and fed through contacts of unenergized anti-clutter relay, energized track relay, and energized autotrack relay into the torque motor power amplifiers. These amplifiers again supply control current to the azimuth and elevation torque motors which cause the gyro to precess until the radar error signals are reduced to zero. The radar error signals are reduced to zero by this action, since the antenna is slaved to the stabilization gyro during autotrack mode and follows the gyro in the direction which reduces the difference in the angular positions of the sight line and the radar beam to zero. In this manner the spin axis of the stabilization gyro is kept aligned with the line of sight to the target.

In addition to the above functions, the stabilization gyro servo loop performs one additional function. In cases of excessive clutter or radar noise competing with the target, the operator will press an anti-clutter button which energizes the anti-clutter relays. Anti-clutter relay removes the radar error signals from the inputs of the torque motor power amplifiers. Memory capacitors connected from the grids of the torque motor power amplifiers to ground act as a memory circuit and cause the stabilization gyro to continue to precess at the rate it was precessing when the anti-clutter button was pressed. Therefore, since the antenna is slaved to follow the gyro, the radar beam is moved at this same rate during the time the operator keeps the anti-clutter button depressed.

*Stabilization unit—platform servo loop*

The platform servo loop consists of the stabilization elevation and azimuth platforms 210 and 205 respectively and associated servo motors, the platform servo amplifiers, certain relays and amplifiers in the platform switching unit, the hand control and platform synchros as the data devices during beacon, search, and acquisition modes, and the pickoffs as the data devices during track and autotrack modes.

In beacon, search and acquisition modes, the function of the platform servo loop is to slave the stabilization platforms to the hand controls. The elevation and azimuth hand control synchro rotors are excited from a suitable voltage source and the stators of these synchros are connected through contacts of unenergized track relays to the elevation and azimuth platform synchros respectively. Both hand control and platform synchros are zeroed with respect to the yaw and pitch axes of the airplane. Any movement of the hand controls about the pitch axis produces a relative displacement between the rotor of the hand control elevation synchro and the rotor of the platform elevation synchro. Similarly, any movement of the hand controls about the yaw axis produces a relative displacement between the rotor of the hand control azimuth synchro and the rotor of the platform azimuth synchro.

These relative displacements create error signals in the platform synchro rotors which are fed to the platform amplifiers. From these amplifiers, the signals are fed through contacts of unenergized track relay to the inputs of the azimuth and elevation platform servo amplifiers. After amplification and demodulation, these signals are summed with tachometer feedback signals generated in the tachometers on the platform servo motors. These tachometer signals are proportional to the angular speed of the servo motors and, hence, of the platforms, and they are fed through a hi-pass filter before they are summed with the synchro error signals.

The purpose of the tachometer feedback signals is for stabilizing the platform servo loop. After summing, the error signals are amplified in the platform servo amplifiers. The power amplifiers of the platform servo amplifiers supply control current to the azimuth and elevation servo motors. These motors then drive the elevation frame and azimuth platform in such a direction as to make the synchro error signals zero. In this manner the stabilization platforms are slaved to follow the hand controls, and the spin axis of the stabilization gyro is also kept aligned with the line of sight of the hand controls since the gyro is slaved to the platforms during these modes of operation.

The platform synchro error signals are also fed to the indicator console where they are summed with hand control positional signals from the hand control synchro stators. These signals are then used to produce the acquisition circle on the C scope with which the operator circles the target indication on the scope. In this manner the stabilization gyro spin axis is approximately aligned with the sight line at the time the track button is pressed.

In track and autotrack modes, the function of the platform servo loop is to slave the stabilization platforms to the stabilization gyro so that the plane of the elevation frame is maintained normal to the spin axis of the gyro and hence a datum line on this frame is kept parallel to the spin axis. As described above, the spin axis of the stabilization gyro is kept aligned with the line of sight to the target during these modes and any movement of the gyro produces a relative displacement between the pickoff coils mounted on the elevation frame and the copper armature connected to the gyro.

The pickoff error signals created by these relative displacements are fed to the platform servo amplifier inputs through contacts of energized track relay. It will be noted that the lateral pickoff error signal is fed through a secant gain corrector in the platform switching unit where it is multiplied by a signal proportional to the secant of the elevation angle derived in the secant gain resolver—geared to the elevation frame 210. This signal effectively makes the gain of the azimuth platform servo amplifier proportional to the secant of the elevation angle. This is necessary since the lateral pickoff errors are measured with respect to the lateral plane through the stabilization gyro spin axis, whereas the azimuth platform servo motor that corrects these errors drives the platform in the azimuth plane which contains the roll and pitch axes of the airplane. For a more detailed discussion of the above secant gain correction reference is made to the copending application Serial No. 517,008, filed January 5, 1944, in the names of G. White and D. Pensyl.

The elevation and azimuth pickoff error signals are amplified, demodulated, summed with tachometer signals, and power amplified and supplied to the platform servo motors which drive the elevation frame and azimuth platform in such a direction as to reduce the pickoff error signals to zero. Therefore, the stabilization platforms follow the stabilization gyro and maintain the gimbal axes perpendicular to the stabilization gyro spin axis during these modes of operation.

LEAD ANGLE COMPUTER (FIGS. 26, 32, 35)

The function of the lead angle computer is to compute continuously the correct space orientation for the longitudinal axis of the fighter, i.e., to compute the actual heading for a continuous-release path during the missile launching and propulsion phases of the attack, and for a constant-bearing course during the missile guidance phase. The principal elements required to perform this function are a gyro deflection angle assembly, a gimbaled resolver assembly, a timer, and the associated servo loops.

Figure 26:
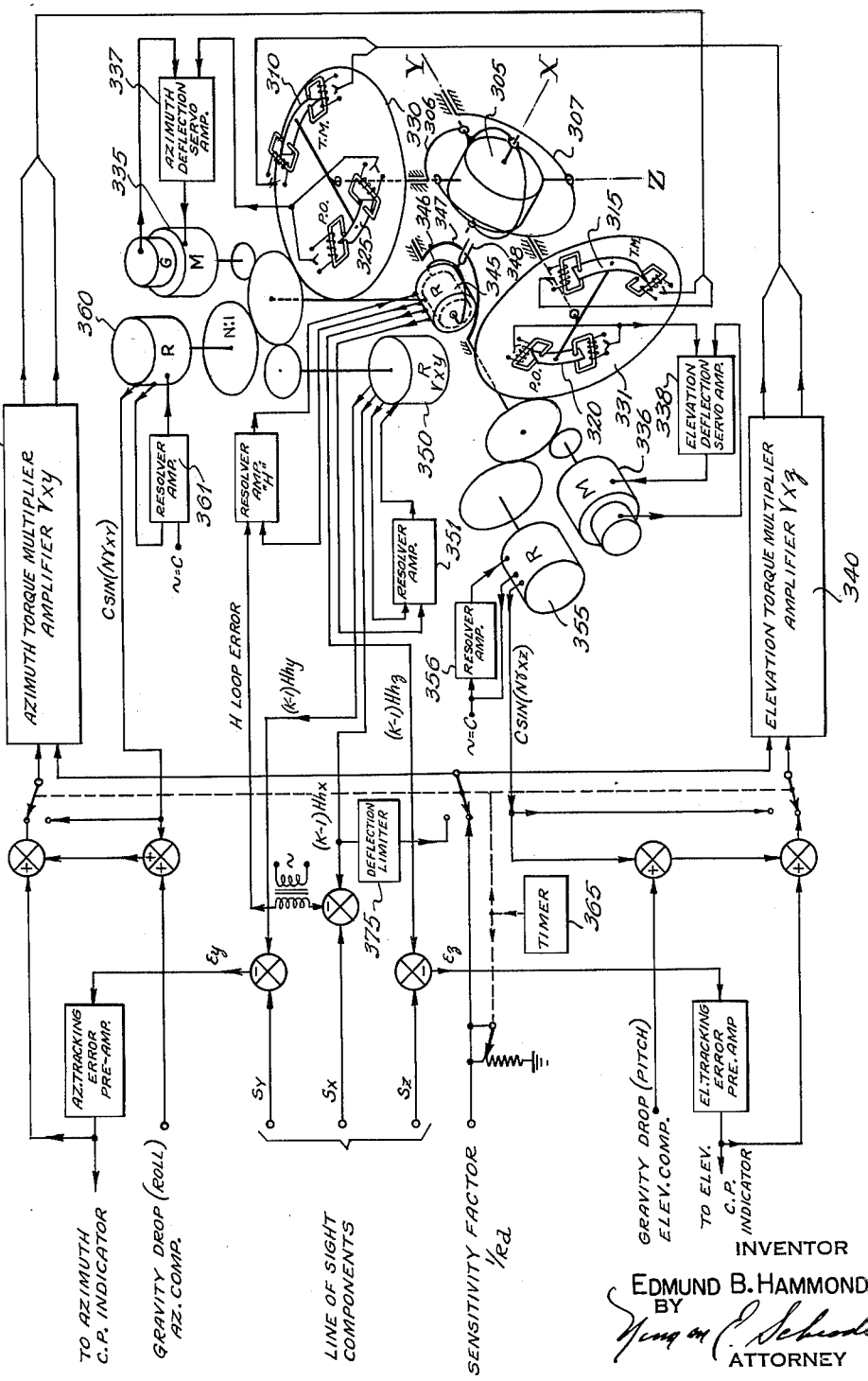
FIG. 26 is a schematic diagram of the lead angle computer.

*Gyro deflection angle assembly.*—The gyro deflection angle assembly consists of a synchronous gyro 305 (FIGS. 26, 32) and its supporting gimbals 306, 307, elevation and azimuth torque motors 310, 315, elevation and azimuth pickoffs 320, 325, azimuth and elevation platforms 330, 331, and certain associated gearing, dials and limit stops. It is the function of this assembly to precess the gyro to the correct lead angle for a particular tactical situation.

The gyro has two degrees of freedom and is precessed by motors capable of applying torques to its gimbals. The total gyro precessional rate is essentially proportional to the angular displacement of the gyro spin axis from its normal position parallel to the longitudinal axis of the fighter. Thus, the gyro spin axis lags the motion of the fighter's longitudinal axis by an angle proportional to the precessional rate of the gyro.

The azimuth and elevation deflection platforms 330, 331 are electrically coupled to the gyro gimbals 305, 306. These platforms serve as a mounting for the azimuth and elevation pickoffs 325, 320, and the azimuth and elevation torque motors 315, 310. The platforms are slaved to the gyro 305 and are caused to follow its precessional motion by the pickoff signals which are amplified and used to drive the deflection servo motors 335, 336 that position the platforms.

The elevation torque motors 310 are mounted on the azimuth deflection platform 330 and the azimuth torque motors 315 are mounted on the elevation deflection platform 336. The input signals which control these motors are received from torque multiplier amplifiers 340, 341 and cause net torques to be applied about the elevation and azimuth axes respectively.

The pickoffs 320, 325 used in the computer are double-C, eddy-current pickoffs having a high sensitivity-to-null ratio. It is the function of these pickoffs to feed error signals to the deflection servo motors 336, 335 through the deflection servo amplifiers 337, 338 when their armatures are moved by the precessional motion of the gyro. These error signals cause the servo motors 336, 335 to reposition the platforms 320, 325 in such a manner as to reduce the error signals to zero. Hence, the platforms are caused to follow the gyro in the track and auto-track modes. In the acquisition mode the pickoff signals are fed to the torque multiplier amplifiers 340, 341 and are used to precess the gyro. Thus the gyro is slaved to the platforms 325, 320 and the correct vector relationship between the spin axis of the computer gyro and the sight line is maintained.

*Gimbaled resolver assembly.*—The gimbaled resolver assembly consists of the elevation and azimuth deflection servo motors 336, 335 and tachometers, the $\gamma_{hz}$ gimbaled resolver 345, the $\gamma_{xy}$ resolver 350, the $C \sin N\gamma_{xz}$ resolver 355, and the $C \sin N\gamma_{xy}$ resolver 360. The assembly also contains fine and coarse dials and gearing associated with these components as well as the gimbals 346, 347 which support and actuate the gimbaled resolver 345.

The deflection servo motors are tachometer stabilized servo motors which are used to drive the deflection platforms. The tachometers are required to provide stabilization in the deflection servo loops.

The azimuth and elevation deflection servo motors receive their driving signals from the deflection servo amplifiers 337, 338. During the acquisiton mode, the error signals are received from the tracking error amplifier, and during the track mode, they are received from the gyro pickoffs. Hence the gyro is slaved to the platforms in the acquisition mode and the platforms are slaved to the gyro in the track mode.

The four synchro resolvers in the computer are each of a type having two rotor and four stator windings. These resolvers are identical in construction but they differ in the manner in which their stator windings are connected. By varying the number of stator windings used, input errors to the amplifier can be minimized and input-to-output phase can be changed. These resolvers have two bifilar primaries. That is, each primary consists of two separate, closely wound coils. One winding, called the stator, serves as the actual resolver input; while the other, the compensating winding picks up a voltage from the stator through transformer action. The voltage across the compensating winding is brought back to the input of the resolver amplifier and thus closes the feedback loop.

The $C \sin N\gamma_{xy}$ and the $C \sin N\gamma_{xz}$ resolvers 360, 355 each have one set of their stator windings shorted to ground and therefore, a one-phase to one-phase relationship is established between the remaining windings. The rotors of these resolvers are coupled to the deflection 330, 331 through a gear ratio of 29/17 and therefore, the rotors are rotated through 29/17 of the angles through which the platforms are rotated. The stators are excited with a constant voltage C. Therefore, the output voltages on the rotors of these resolvers is $C \sin N\gamma_{xy}$ and $C \sin N\gamma_{xz}$ where N equals 29/17. These output voltages are fed to the torque multiplier amplifiers 341, 340 where they are added to certain correction crossfeeds and multiplied by the reciprocal of dynamic sensitivity ($1/R_d$) in order to produce the energizing signals for the torque motors 315, 310 which precess the gyro.

The $\gamma_{xy}$ resolver 350 is geared to the azimuth deflection platform 330 through a 1/1 gear ratio and therefore, its rotor is turned through the same angle as the azimuth platform. This resolver is connected for one-phase to two-phase operaton and its function is to resolve the projection of the $h$ vector on the $xy$ plane into its $x$ and $y$ components. The $\gamma_{xy}$ resolver 350 receives as its input a voltage proportional to $\frac{3}{4}Hh_{xy}$ and its outputs are voltages proportional to $\frac{3}{4}Hh_x$ and $\frac{3}{4}Hh_y$.

The $\gamma_{hz}$ gimbaled resolver 345 is used to resolve the $h$ vector into its $z$ component and its projection on the $\overline{xy}$ plane. The resolver is gimbaled because it must solve for the angle $\gamma_{hz}$ which is located in the $hz$ plane. The case of the resolver is rotated through the angle $\gamma_{xy}$ and the yoke 348 which couples the rotor of the resolver to the bail ring 347 are positioned accordingly. The bail ring 347 is rotated thru the angle $\gamma_{xz}$ and the resultant rotation coupled to the rotor of the $\gamma_{hz}$ resolver is equal to the angle $\gamma_{hz}$. This resolver is electrically connected for one-phase to two-phase operation similar to the $\gamma_{xy}$ resolver described previously. The input to this resolver is a voltage proportional to $\frac{3}{4}H$ and its outputs are voltages proportional to $\frac{3}{4}Hh_z$ and $\frac{3}{4}Hh_{xy}$ (see also FIG. 23).

*Timer assembly.*—The timer assembly 365 (see FIG. 35) consists of a synchronous motor 366, a magnetic clutch 367, a timer potentiometer 368, and a microswitch 369. The synchronous motor drives the timer shaft 370 through the magnetic clutch 367 and the potentiometer 368 shorts the $1/R_d$ input to zero when the timer operates.

The microswitch 369 causes the constant bearing relay 367 (see FIG. 32) in the deflection limiter 375 to operate.

The synchronous motor 366 is connected through gearing to the timer shaft 370 which is connected to the magnetic clutch 367. The clutch is activated when the pilot presses the firing button on the control stick. At that instant, the upper arm 371 of the mechanical timer assembly 365 which is connected to the output of the clutch begins to rotate. In the arrangement shown, the upper arm takes 4.1 seconds to rotate to the point where it picks up the lower arm 372. The lower arm which is connected to the timer potentiometer 368 makes the second revolution with the timer shaft. The rotation of the potentiometer arm shorts the $1/R_d$ signal from the sensitivity computer 400 to ground in approximately 3 seconds, or 7.1 seconds after the firing button is pressed. This action reduces the precession torques on the gyro 305 to zero. As the potentiometer arm 372 reaches a predetermined point in its travel, the microswitch 369 is tripped energizing the constant bearing relay 376 in the lead angle computer. The relay action allows the deflection limiter 375 to send a new $1/R_d$ signal to the torque multiplier amplifiers 340, 341 which prevents the gyro 305 from hitting its limit stops during the constant bearing course. This is accomplished by causing the gyro to precess when the deflection angles approach their limits. As the $h_x$ component decreases, the output of the deflection limiter 375 increases and causes the pilot to control his plane so that the $x$ component of the gyro heading increases. The limiter action begins for angles of approximately 30 degrees, i.e., if the angle between the gyro spin axis and the planes heading vector exceeds 30 degrees. An equilibrium position will be reached and a fixed gyro position will be maintained relative to the plane's heading.

*Computer gyro and platform deflection servo loops.*—The computer gyro and the platform deflection servo loops are closely interrelated. In the acquisition mode, the computer gyro 305 (FIGS. 26, 32) is slaved to the deflection platforms 330, 331 through the C pickoffs and in the track and auto-track mode the platforms are slaved to the gyro through the C pickoffs.

The computer gyro 305 is caused to precess in azimuth and in elevation by torques which are applied about the elevation and the azimuth axes respectively. These torques are applied by the azimuth and elevation torque motors 315, 310 which are energized by signals from the torque multiplier amplifiers 341, 340. In the acquisition mode the inputs to the amplifiers are the error signals from the deflection pickoffs 320, 325 and a dummy $1/R_d$ signal from the slave adjust potentiometer 378. The azimuth pickoff error signal is fed to the amplifier through a contact of track relay 380 and the elevation error signal is fed to the amplifier through a contact of track relay 382. The dummy $1/R_d$ signal is fed to the amplifiers through a contact on constant bearing relay 376 and another contact on track relay 382. In the track mode the inputs to the amplifiers 341, 340 are the signals from the $C \sin N \gamma$ resolvers 360, 355 and the $1/R_d$ signal from the sensitivity computer 400. The resolver signals are fed to the amplifiers through contacts on the track relays 380 and 382. These relays are energized when the switch is made from acquisition to track. The $1/R_d$ signal is fed to the amplifiers through the track relay 382 and the constant bearing relay 376. The timer 365 functions to reduce the $1/R_d$ input to zero 7.1 seconds after the firing button is pressed. The timer also trips a microswitch which energizes the constant bearing relay 376 and allows the deflection limiter 375 to send a new $1/R_d$ signal to the amplifiers 341, 340 which prevents the gyro 305 from hitting its limit stops.

The deflection platforms 330, 331 are slaved to the heading error signals in the acquisition mode and to the pickoff error signals in the track mode. The platforms are positioned by the deflection servo motors 335, 336 which receive their driving signals from the deflection servo amplifiers 337, 338. In the acquisition mode, the amplifiers receive their inputs (the heading error signals) from the track relays 380 and 382. When the switch is made from acquisition to track, the relays are energized and the error signals from pickoffs 320, 325 are fed to the deflection servo amplifiers 338, 337. The other inputs to the deflection servo amplifiers are the tachometer feedback signals from the A.-C. tachometer generators which are mounted on the same shafts as the servo motors.

*Synchro resolvers.*—The four synchro resolvers 345, 350, 355, 360 in the lead angle computer are used to produce the sine and cosine functions of certain angles associated with the spin axis of the computer 305. Their rotors are geared to the deflection servo motors 335, 336 and therefore are positioned so as to reproduce the desired gamma angles. The gamma resolvers 350, 345 of the lead angle computer 300 and sigma resolvers 242, 243 of the stabilization unit 200 function together to solve the vector relationship discussed above.

The $\gamma_{hz}$ gimbaled resolver 345 is connected for 1 phase to 2 phase operation. Its input is a voltage equal to ¾H and its rotor is positioned to reproduce the angle $\gamma_{hz}$. Therefore its outputs are ¾$Hh_z$ and ¾$Hh_{xy}$. The compensating winding and the entire second stator winding are effectively shorted and do not affect the operation of the resolver.

The $\gamma_{xy}$ resolver 350 is also connected for 1 phase to 2 phase operation. Its input is the ¾$Hh_{xy}$ output of the $\gamma_{hz}$ gimbaled resolver and its rotor is so positioned as to reproduce the angle $\gamma_{xy}$. Hence its outputs are ¾$Hh_y$ and ¾$Hh_x$. The entire second stator winding is effectively shorted-out, as before, but the voltage on the compensating winding is fed back to the input of its amplifier 351 where it is subtracted from the input signal coming from the rotor of the $\gamma_{hz}$ gimbaled resolver 345. The purpose of the feedback is to maintain unity gain and zero phase shift from the rotor of the $\gamma_{hz}$ gimbaled resolver 345 to the stator of the $\gamma_{xy}$ resolver 350.

The $\sigma_{sz}$ and $\sigma_{xy}$ resolvers 243, 242 (FIGS. 25, 31) are connected for 2 phase to 2 phase operation. One of their stator windings is connected in exactly the same manner as the stator winding of the $\gamma_{xy}$ resolver 350. Their rotors are positioned by elevation frame 210 and azimuth platform 205, respectively, to reproduce the $\sigma_{sz}$ and $\sigma_{xy}$ angles. However, the frame and platform do not accurately follow the stabilization gyro 225 during precession and there is a certain error lag that would cause inaccuracies if it were not eliminated. To correct for this error lag, a signal proportional to the error is impressed on the second stator winding. This signal is electrically subtracted at the rotors to give the desired error free outputs. The ouputs of these resolvers are the $x$, $y$ and $z$ components of the fighter to target sight line.

The $C \sin N$ resolvers 355, 360 (FIGS. 26, 32) are connected for 1 phase to 1 phase operation. Their stators are excited with a voltage $C$ from a reference transformer and the signal on the compensating winding of each resolver is fed back to the input of the associated amplifier 356, 361. The second stator winding of each resolver is tied to ground and therefore is not effective in the operation of the resolver. Each of these resolvers also has one unused rotor winding. The second rotor is positioned through a gear train having a ratio of 29/17 and is therefore rotated through 29/17 of the angle through which the gyro turns. The outputs of these resolvers are $C \sin 17/29_{xy}$ and $C \sin 17/29_{xz}$.

*Torque multiplier amplifier.*—There are two identical torque multiplier amplifiers 341, 340 used in the lead angle computer 300; one in the azimuth and the other in the elevation channel. Each torque multiplier amplifier consists of two channels which take the sum and the difference of two input signals. These sum and difference signals, when amplified, supply a D.-C. voltage to the associated torque motor 310 or 315 causing the motor to exert a net torque on the associated gyro gimbal 306 or 307 which causes the computer gyro 305 to precess at a rate proportional to the product of the two inputs to the amplifier. A detailed description of these torque motor amplifiers may be found in my copending application S. N. 311,290, filed September 24, 1952, for Electromagnetic Force Producing System, now Patent No. 2,795,143, and assigned to the same assignee as the present application.

The two channels in the amplifier are identical except for the transformers in which the signals are added and subtracted. Each channel consists of a cathode follower, a transformer, a detector circuit, two differential amplifiers, and a power output stage. In the acquisition mode, the inputs to the amplifier are the pickoff error signal from the track relay and the dummy $1/R_d$ signal from the slave gain potentiometer. In the track mode, however, the inputs are a summed signal (output of $C \sin N \gamma$ resolver plus the heading error cross feed plus the gravity correction cross feed) from the track relay and the $1/R_d$ signal from the sensitivity computer. When the airplane is flying a constant bearing collision course the $1/R_d$ input is reduced to zero as explained above.

*Deflection limiter.*—In the event the lead angle becomes excessive during the constant bearing course when the computer gyro 305 is functioning as a free gyro, means are provided to supply a precessing torque to the gyro when the lead angle exceeds certain limits. For this purpose a deflection limiter 375 is provided to supply an A.-C. voltage to both torque multiplier amplifiers 340, 341 which varies inversely with the input voltage from the azimuth ($\gamma_{xy}$) resolver 350, when the input voltage falls below a certain established level.

To this end the input from the azimuth resolver 350 is rectified, filtered and fed to the D.-C. amplifier. The output of the D.-C. amplifier is added to a D.-C. reference voltage and the sum voltage is impressed on the variable gain A.-C. amplifier. Then, as the D.-C. sum voltage varies due to variations in the A.-C. input level, the gain of the A.-C. amplifier will vary, varying the A.-C. output voltage. By choosing the proper sign for the D.-C. reference voltage, the sum voltage can be made to cause the A.-C. output voltage to increase as the A.-C. input voltage decreases.

The limiter circuit must not supply voltage until the A.-C. input voltage falls below a definite value. This is accomplished by holding the variable gain amplifier just at cut-off with the critical sum voltage (sum of reference voltage plus value of voltage input must not fall below). Then no output will appear as long as the sum voltage is below this point. However, as the difference voltage passes through the cut-off point, the output voltage increases from zero.

At the end of the transition period from the continuous release course to the constant bearing course, no torques are acting on the computer gyro 305 through the torque motors 310, 315 because $1/R_d$ is reduced to zero. However, the pickoffs 320, 325 still measure error signals and move the deflection servos 336, 335 to allow the gyro 305 to remain fixed in space. During this period the lead angle continues to increase. As $1/R_d$ is reduced to zero a switch 369 is thrown by the computer timer 365 allowing the deflection limiter 375 to function. For deflection angles up to 30° there is no output. For angles from 30 to 75° the output increases to supply a torque sufficient to cause gyro precession at sight line rate.

LEAD ANGLE COMPUTER OPERATION

*Acquisition mode.*—During the acquisition mode, the following inputs are coming into the lead angle computer 300 (FIGS. 26, 32): the $1/R_d$ signal from the sensitivity computer 400 which is terminating on an open contact of the track relay 382, a dummy $1/R_d$ signal from the slave adjust potentiometer 378, the $x$, $y$, and $z$ components of the sight-line vector $s$ from the sigma resolvers 242, 243 in the stabilization unit 200, the azimuth and elevation heading error voltages, and the lateral and elevation gravity correction voltages from the pitch and roll resolvers in the compensated vertical gyro 600.

The voltages representing the $x$, $y$, and $z$ components of the sight line vector are combined with the $x$, $y$, and $z$ components of the vector representing the spin axis of the computer gyro, as described above, to obtain the elevation and azimuth components of the heading error. In the acquisition mode, the heading errors are not fed to the cross pointers. Instead the heading error components are fed to the deflection servo amplifiers 337, 338 which drive the deflection servo motors 335, 336. The servo motors are so driven as to position the gamma resolvers 345, 350 in such a manner that the heading error voltages are kept at zero. The lead angle gyro 305 is slaved to the deflection platforms 330, 331 through the C pickoffs 320, 325 on the azimuth and elevation deflection platforms. The signals from the pickoffs 320, 325 are fed to the torque multiplier amplifiers 341, 340 along with a dummy $1/R_d$ signal from the slave gain potentiometer 378. The outputs of the amplifiers 341, 340 are fed to the azimuth and elevation torque motors 315, 310 to produce torques on the gyro gimbals 307, 306 which cause the gyro 305 to precess. These torques are proportional to the product of the inputs to the amplifier and therefore the dummy $1/R_d$ signal is of just sufficient magnitude to cause precession when the pickoff signals are present.

Thus the gyro 305 is continually being precessed in such a manner that the correct vector relationships always exist between the $\underline{h}$ vector (computer gyro spin axis), the $\underline{s}$ vector (stabilization gyro spin axis), and the $\underline{f}$ vector (computed fighter heading). This condition is desirable in order that the heading error cross pointers be zeroed when the switch is made from acquisition to track so that the pilot does not have to waste time determining the initial correct heading.

In addition, the $C \sin N\gamma$ resolvers 355, 360 are continuously being correctly positioned since they are mechanically coupled through gearing to the deflection servo motors 336, 335. The gravity correction and heading error cross feeds which are summed in the deflection limiter chassis are being fed to an open contact on the track relays 380, 382.

In the acquisition mode, the flow of data in the computer may be traced in the elevation channel, by way of example, as follows: Consider, as a starting point, an instant in time at which the vectors representing the indicated fighter heading, the sight line, and the spin axis of the computer gyro are related to one another as in FIG. 6. As the fighter flies thru space, the $z$ component of the sight line vector changes, and an error signal $\epsilon_z$ is generated and fed to the elevation servo motor 336 thru the elevation deflection servo amplifier 338. This signal causes the motor to drive the $\gamma_{hz}$ gimbaled resolver 345 in such a direction as to reduce the error signal to zero. The elevation deflection platform 331 is also geared to the elevation deflection servo motor 336. Hence, the platform is turned causing an error signal to be induced in the elevation pickoffs 320. This error signal is fed to the elevation torque multiplier amplifier 340 along with a dummy $1/R_d$ signal from the slave gain potentiometer 378. The output of the torque multiplier amplifier 340 causes the elevation torque motors 310 to apply a torque about the gyro gimbals which causes the gyro 305 to precess until the pickoff error signal is reduced to zero. Hence, the gyro is continually being precessed to maintain the proper relationship between the $\underline{s}$, $\underline{f}$, and $\underline{h}$ vectors.

*Track and auto-track modes.*—The following inputs are being fed into the computer during the track and auto-track modes of operation: the $1/R_d$ signal from the sensitivity computer 400, the voltages representing the $\underline{x}$, $\underline{y}$, and $\underline{z}$ components of the sight line vector from the sigma resolvers 242, 243 in the stabilization unit 200, the azimuth and elevation heading error voltages, and the lateral and elevation gravity correction voltages from the pitch and roll resolvers in the vertical gyro.

In the track mode, the heading error components are obtained as described above. These heading errors are amplified and fed to the pilot indicator cross pointers so that the pilot has a visual indication of the heading error of his airplane. The pilot reduces the heading error to zero by so controlling his airplane that the cross pointers move to their zero position.

The computer gyro 305 is precessed by torques which are impressed on its gimbals 306, 307 by the torque motors 310, 315. The torque motors receive their excitation signals from the torque multiplier amplifiers, 340, 341 and the torques produced by the motors are proportional to the product of the inputs to the amplifiers. The input signals to the amplifiers 340, 341 are the outputs of the $C \sin N\gamma$ resolvers 355, 360, the $1/R_d$ signal from the sensitivity computer 400 and the correction cross feeds. The deflection platforms 330, 331 are positioned by the deflection servo motors 335, 336. These motors receive their driving signals from the deflection servo amplifiers 337, 338. The input signals to the amplifiers are derived from the deflection pickoffs 325, 320 on the deflection platforms 330, 331.

The action of the computer in this mode can best be explained by assuming that the heading error components are zero at the instant the switch is made from acquisition to track and auto-track. The pilot begins to receive cross pointer information and the indicated heading errors begin to build up due to the changing positions of the sigma resolvers, i.e., the sight line vector is moving with respect to the nose of the plane. Hence, the voltages representing the $x$, $y$, and $z$ components of the sight line vector are changing. Since the voltages representing the $x$, $y$, and $z$ components of the computer gyro vector are not at the proper values for this new sight line information, heading error voltages are developed.

The pilot begins to correct for these errors and in so doing causes the $C \sin N\gamma$ resolvers 355, 360 to change their rotor positions with respect to their stators, since the gyro 305 tends to maintain its precession rate in space. This change in the $N\gamma$ angles causes the precession torques on the gyro to change and the gyro starts to precess at a new rate. This motion of the gyro causes the C pickoffs 325, 320 to feed error signals to the deflection servo amplifiers 337, 338. The amplified signals are fed to the deflection servo motors 335, 336 and cause the motors to reposition the platforms 330, 331 in such a manner as to reduce the pickoff error signals to zero. In so doing the motors also reposition the rotors of the gamma resolvers 345, 350 in such a manner as to follow the gyro 305. Hence, H is being solved and the vector triangle relationship between $\underline{h}$, $\underline{s}$, and $\underline{f}$ is being maintained. The $C \sin N\gamma$ resolver shafts are also repositioned by the action of the servo motors and cause signals to be fed to the torque motors which cause the computer gyro to be precessed at such a rate as to maintain the proper lead angle.

After initial transients have died out, the precession rate of the gyro is approximately equal to the turning rate of the plane. The gravity correction cross feeds are introduced in the $C \sin N\gamma$ channels in order that the missile drop due to gravity during the propulsion period can be compensated for by altering the flight attitude of the aircraft. The heading error cross feed voltages are also introduced because, for the exact solution of the vector relationships between $\underline{f}$, $\underline{s}$ and $\underline{h}$, the $\gamma$ angles should be measured from the $\underline{f}$ vector (indicated fighter heading) rather than from the $\underline{x}$ vector (actual fighter heading) to the $\underline{h}$ vector (spin axis of computer gyro). The vector addition of the heading error components to the measured $N\gamma$ components accomplishes the precise solution.

The data flow in the auto-track mode may be traced, as follows: when the pilot alters the flight path of the aircraft in order to center or zero the cross pointers, the rotors of the $C \sin N\gamma_{xz}$ resolver 355 are caused to change their positions with respect to their stators. Therefore, a new $C \sin N\gamma_{xz}$ signal is fed to the elevation torque multiplier amplifier 340 causing the elevation torque motors 310 to exert a new torque on the gyro gimbals about the z axis. The gyro begins to assume a new position and in so doing causes the armature to move relative to the elevation pickoffs 320. The pickoffs feed and error signal to the elevation deflection servo amplifier 338. This amplified error signal is used to drive the elevation servo motor 336. The servo motor drives the elevation deflection platform 331 in such a direction as to reduce the pickoff error signal to zero. In repositioning the platform, the servo motor also repositions the gamma resolvers 345, 350 in such a manner that they are putting out voltages which result in zero heading error. The $C \sin N\gamma$ resolvers 355, 360 are also repositioned in such a manner as to maintain the proper lead angle.

Therefore, in the auto-track mode, the computer gyro 305 is slaved to the $C \sin N\gamma$ resolvers 355, 360 and the deflection platforms 330, 331 are slaved to the C pickoffs 325, 320. The functioning of the computer after a missile is fired is discussed above. The tactical significance of the reduction of the $1/R_d$ input to zero is that the fighter course must change from the continuous release path which involves the generation of a lead angle proper to missile capture, to a constant bearing collision course which involves minimum space rate of change of the sight line.

SENSITIVITY COMPUTER

(FIGS. 27, 32)

The major function of the sensitivity computer 400 is to derive a signal proportional to $1/R_d$, the reciprocal of dynamic angular rate sensitivity (see Equation 84), which is fed to the lead angle computer 300 and used in the calculation of the gyro precession rate. In addition to the computation of $1/R_d$, the computer 400 derives the following pilot directing signals: the altitude recovery signal, the target clearance signal, the maximum launch range signal, the "on-course" signal, and the "slow down" lamp signal. All of the directing signals are present in the auto-truck mode only, except the altitude recovery signal.

RANGE DRIVE ASSEMBLY

The range drive assembly comprises the range servo motor 405, the range servo tachometer 407, the range drive clutch 409, and their associated gears, dials, limit stops and microswitches. It also contains the range potentiometer 410, the range feed back potentiometer 415 the minimum launch range potentiometer 420, and the range reciprocal potentiometer 425.

The range servo motor 405 is driven by an error signal generated by the range servo amplifier 403. The error signal is the difference between the range voltage fed to the amplifier 403 by the radar and the range repeat back voltage received from the range feedback potentiometer 415. The range voltage from the radar represents actual range to the target while the voltage on the range feedback potentiometer 415 represents the range at which the gear train is set. The servo motor 405 imparts a rotation proportional to the error signal to drive shaft 406 to actuate the associated tachometer and potentiometers.

The range servo tachometer 407 is coupled to the shaft of the range servo motor 405. Its output is a voltage proportional to range rate $\dot{D}$.

The magnetic clutch 409 is a double acting clutch that is spring loaded in the track position. In this position it couples the rotation imparted by the range motor 405 to a gear train that drives the potentiometer shafts at a rate equivalent to a maximum tracking rate of 2000 feet per second. When actuated to its slew position, the clutch couples the rotation imparted by the range motor to a gear train that drives the potentiometer shafts at a rate equivalent to a slewing rate of 10,000 feet per second.

The mechanical limit stop is connected through gearing to the range servo motor. It is designed to have 30 revolutions from the minimum to the maximum limit and each revolution equals 2000 feet of range. At ranges of 59,100 feet and 900 feet, the limit stop trips motor safety microswitches which cause the driving power to the range servo motor to be reduced and at 3000 feet the limit stop trips a microswitch 427 which causes the slow-down warning lamp to light.

The range feedback potentiometer 415 is a linear potentiometer which is fed a D.-C. voltage from the range calibration potentiometer 429. Its wiper is positioned by the range servo motor 405 through a gear train and its output is the range repeat (feedback) input to the range servo amplifier 403.

The range potentiometer 410 is positioned through gearing by the range servo motor 405. It is a linear potentiometer and it supplies the range input voltage to the warning signal circuits. The range reciprocal potentiometer 425 is excited by a signal from the warning signal circuits and its shaft is positioned through gearing by the range servo motor 405. It is a linear potentiometer and it feeds a signal to the warning signal circuits equal to its input voltage divided by actual range plus 5000 feet. The minimum launch range or $f(D)$ potentiometer 420 is positioned through gearing by the range servo motor 405. This potentiometer is functional or non-linear, and its output is fed to the warning signal circuits. In the present arrangement, these three potentiometers are ganged and their wipers are positioned by the same shaft.

*True airspeed assembly.*—The true airspeed assembly comprises the true airspeed drive motor 435, a selsyn transmitter 440, and their associated gearing and dials. In addition the assembly contains the $1/R_d$ potentiometer 445, the $V_f$ potentiometer 450, the maximum launch range signal potentiometer 455, the $\cos \theta_p$ potentiometer 460, and the $V_f^2$ potentiometer 465.

The true airspeed motor 435 is driven by an error signal received from the synchrotel 436 in the true airspeed meter 437. The error signal is the difference between the true airspeed and the airspeed at which the gear train is set. The servo motor 435 imparts a rotation that is proportional to the error signal to drive shaft 438 to actuate the associated potentiometers.

The selsyn transmitter 440 is a one phase to three phase transmitter synchro. Its stator is connected to the stator of the synchrotel 436 in the true airspeed meter 437 and its rotor is excited from a 400-c.p.s. source. When its rotor is positioned by the true airspeed motor 435 through the gear train, the voltages induced in its stator windings cause currents to flow in the stator windings of the synchrotel. These currents cause a magnetic field to be set up in the stator of the synchrotel. This induced magnetic field has the same direction relative to the stator windings of the synchrotel that the field set up in the stator of the transmitter synchro by the excited rotor winding has relative to its stator windings. Therefore, the magnetic field indicates the angle through which the rotor of the transmitter synchro has been turned. The rotor of the synchrotel is positioned by the true airspeed meter 437 and a voltage is induced in it proportional to the difference in the position of the two rotors. This error signal is used to drive the true airspeed motor 435 in such a direction as to reduce the error signal to zero.

The $KV_f^2$ potentiometer 465 is a functional potentiometer which is excited by a $(1-\cos \theta_p)$ voltage from the vertical gyro 600. It multiplies this input voltage by $V_f^2$ and feeds its output to the minimum altitude potentiometer 467.

The $\cos \theta_p$ potentiometer 460 is a linear potentiometer that is excited by a signal from the compensated vertical gyro 600. It multiplies this input signal by $V_f$ and feeds its output back to the compensated vertical gyro 600 where it is used to velocity compensate the gyro.

The maximum launch range potentiometer 455 is a linear potentiometer that is excited by a signal proportional to range rate. It multiplies this signal by $V_f$ and feeds its output to the warning signal circuit.

The $1/R_d$ potentiometer 445 is a linear potentiometer that is excited by a signal proportional to a function of $D$, $\dot{D}$ and $V_f$. It divides this input signal by $(2.2+KV_f)$ and feeds its output voltage to the lead angle computer 300.

All of these potentiometers are mounted on the same shaft 438 and their wipers are positioned concurrently by the true airspeed servo motor 435 through the true airspeed gear train.

*Altitude assembly.*—The altitude assembly 470 (FIG. 32) comprises a pressure sensitive bellows 469 and three potentiometers that are ganged to a shaft 468 positioned by the bellows. The bellows contains a fixed amount of air so that it expands as outside air pressure decreases (increasing altitude).

The minimum altitude potentiometer 467 is a linear potentiometer that is used to derive an output signal that is fed to the recovery circuits in the warning signal circuits.

The time-of-flight ($F_2H$) potentiometer 472 is a functional potentiometer that is excited by a signal from the range rate amplifier 475. Its output is fed to the maximum launch range circuit in the warning signal circuits.

The relative range ($F_1H$) potentiometer 471 is a functional potentiometer that is used to derive an output signal that is fed to the launch condition circuits in the warning circuits.

All of these potentiometers are mounted in such a manner that their wipers are positioned concurrently by the altitude bellows.

SENSITIVITY COMPUTER OPERATION

*Auto-track mode.*—In the auto-track mode, the computer 400 (FIGS. 27, 32) receives three inputs: fighter-to-target range $D$, which is fed to the range servo amplifier 403 by the radar system in the form of a D.-C. voltage; fighter true airspeed $V_f$, in the form of a shaft rotation from the true airspeed meter; and fighter altitude $H$, with respect to sea level, in the form of shaft motions on the altitude assembly potentiometers 467, 471, 472. Two of these inputs (range and true airspeed) are used by the computer along with the factor $\dot{D}$ (range rate) to solve the sensitivity equation. The altitude data is required for the warning signal circuits.

The range factor $1/(D \div 5000)$ appearing in Equation 84 is obtained from the range reciprocal potentiometer 425 in the range drive assembly, and the range rate ($\dot{D}$) is obtained from the range tachometer 407.

The $V_f$ term is obtained from the fighter velocity potentiometer 450 in the true airspeed assembly. The factor $1/(V_f \div 1533)$ is obtained from the $1/R_d$ potentiometer 445.

Figure 27:
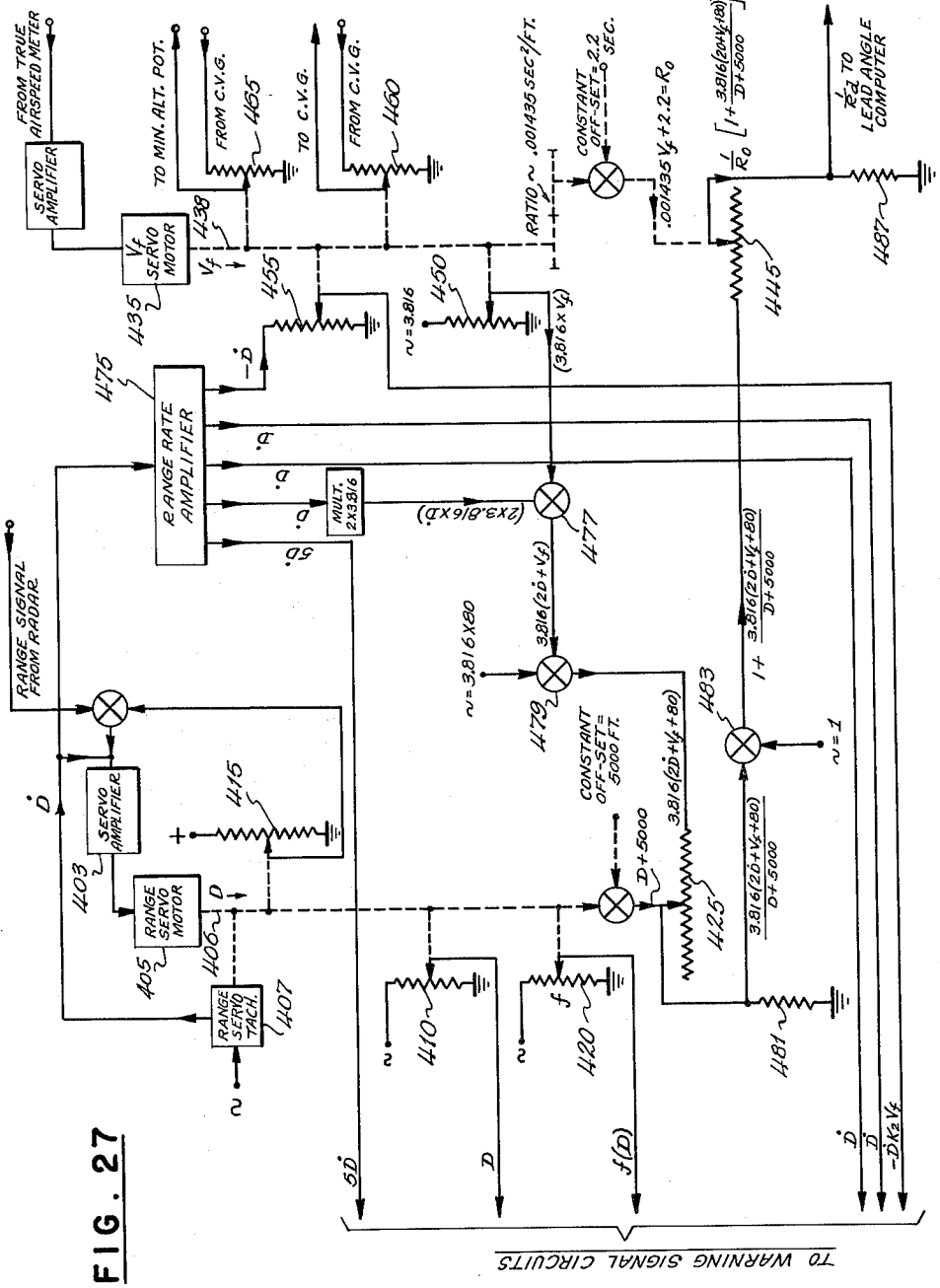
FIG. 27 is a schematic diagram of the sensitivity computer.
Figure 28:
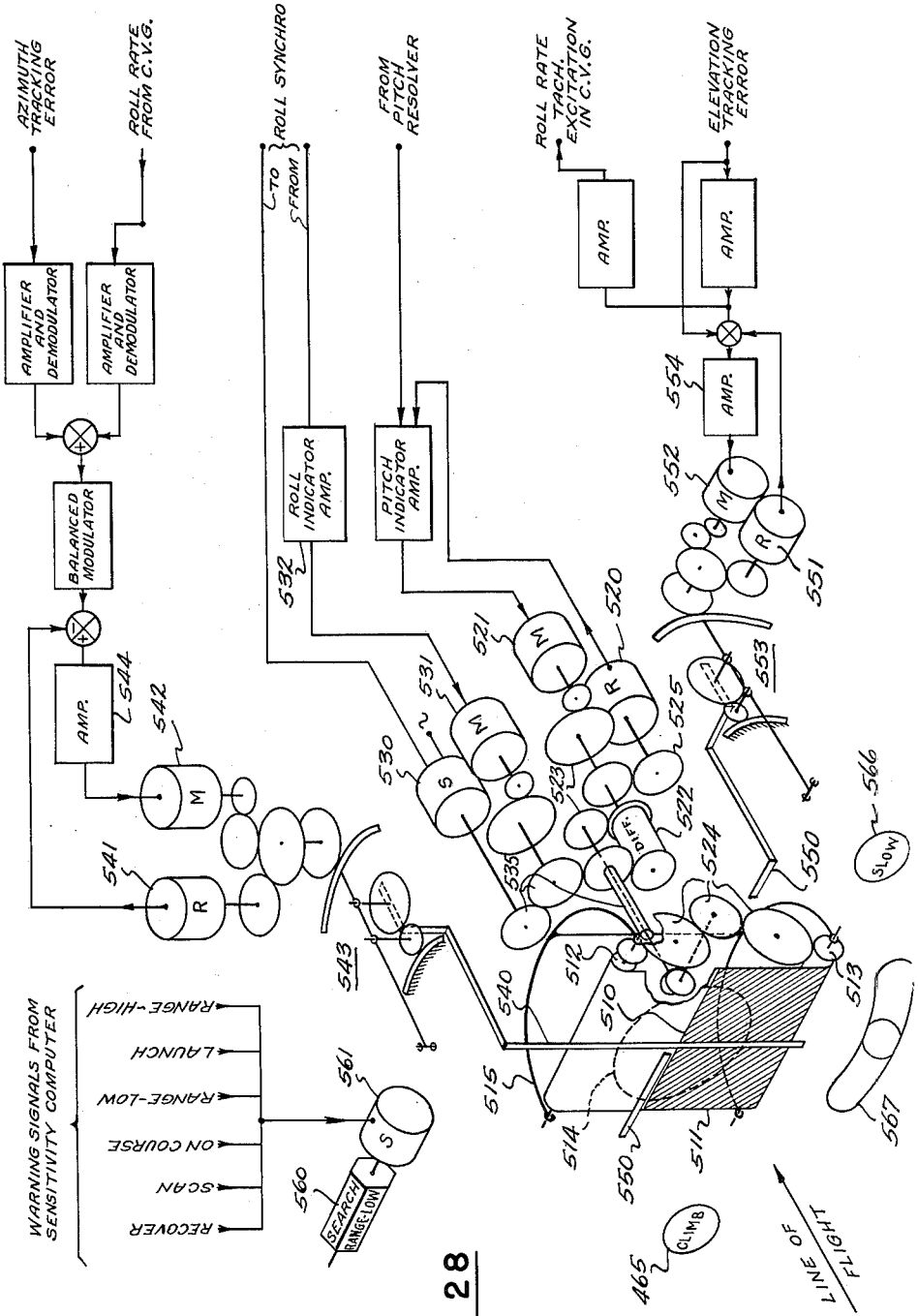
FIG. 28 is a schematic diagram of the pilot's indicator unit.
Figure 29:
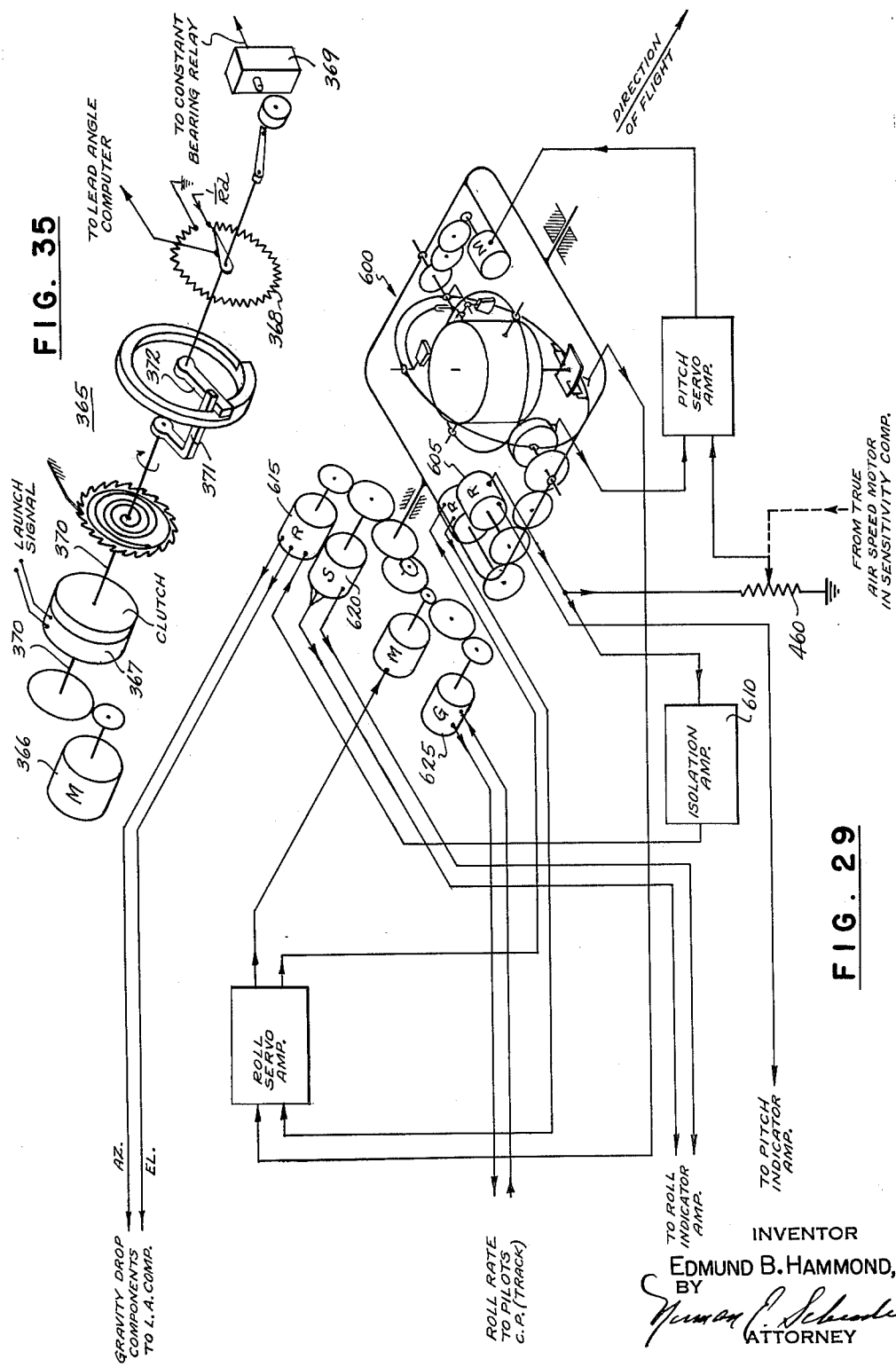
FIG. 29 is a schematic diagram of the compensated vertical gyro.
Figure 30:
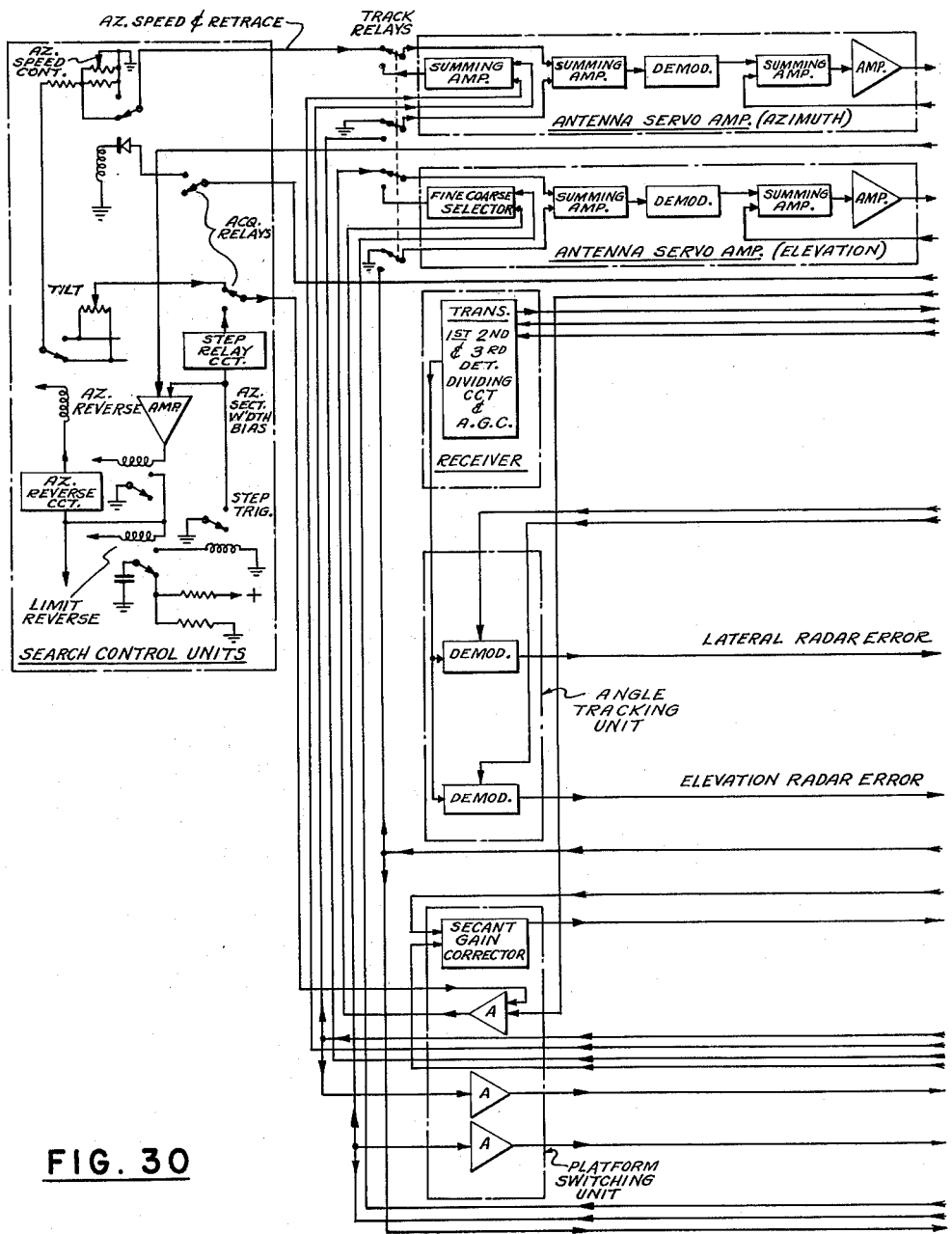
Figure 32:
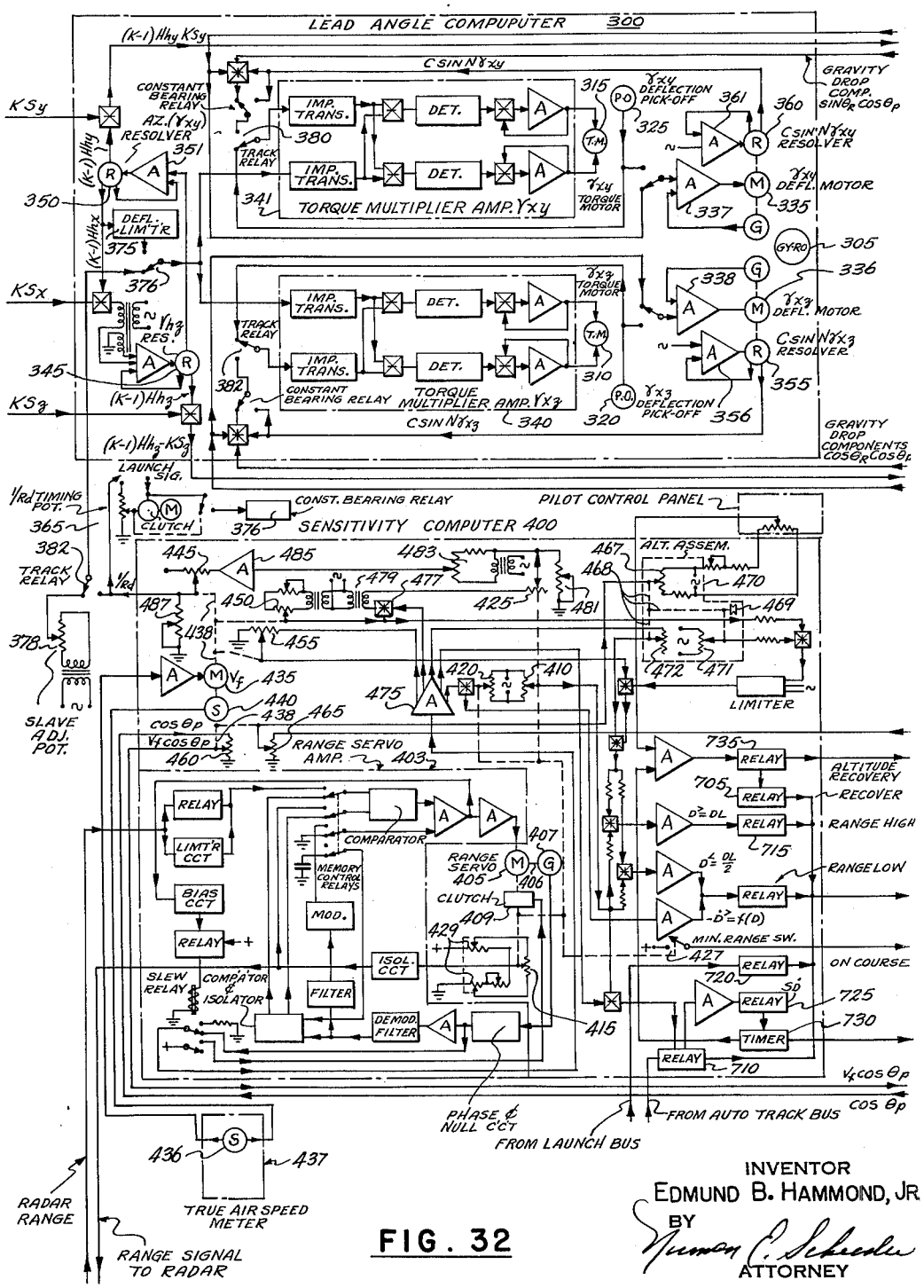

Referring to FIGS. 27 and 32, the quantity $1/R_d$ is obtained, as follows:

The velocity potentiometer 450 is excited by a voltage proportional to the value 3.816. The potentiometer arm is positioned in accordance with fighter velocity ($V_f$) and the output thereof is therefore proportional to the product $3.816 \times V_f$. This voltage is transmitted to a suitable summing network 477 where a voltage proportional to $(2 \times 3.816 \times \dot{D})$ is added. This latter voltage is obtained from the range rate amplifier 475 excited by a range rate signal from the rate generator 407 driven by the range servo motor 405. A multiplying device multiplies the signal proportional to range rate by a factor of (2×3.816). The output of the summing network, then, is proportional to $3.816(2\dot{D}+V_f)$. This voltage is fed to another summing network 479 where a voltage proportional to (3.816×80) is added. The output of this summing network is then proportional to $3.816(2\dot{D}+V_f+80)$.

This value is fed to one end of the range reciprocal potentiometer 425. The arm of this potentiometer is series connected to ground through a resistance 481. The motion of the potentiometer arm proportional to range, from the range servo motor 405, combined with the voltage division action of resistance 481, causes the voltage at the arm of the potentiometer to be its excitation voltage divided by $(D+5000)$. Therefore, the output voltage at the arm of this potentiometer is proportional to $$\left(\frac{3.816(2\dot{D}+V_f+80)}{D+5000}\right)$$

A voltage proportional to unity is added in series at 483 to the previously summed voltages. The net voltage is fed to a unity gain amplifier 485 whose output is $$\left(1+\frac{3.816(2\dot{D}+V_f+80)}{D+5000}\right)$$

From this point, the summed voltages are fed to the $1/R_d$ potentiometer 445. The motion of the arm of this potentiometer is proportional to $V_f$ and, utilizing resistor 487 by the same action described previously for the range reciprocal potentiometer 425, the net output voltage is the summed input voltage impressed on the potentiometer divided by $(2.2+0.001435V_f)$. Thus the output voltage is $$\frac{1}{2.2+0.001435V_f}\left[1+\frac{3.816(2\dot{D}+V_f+80)}{D+5000}\right]=\frac{1}{R_d} \quad (4)$$

the desired dynamic angular rate sensitivity.

*Track mode.*—In the track mode, the range servo system operates on range rate memory, since the actual range rate is normally zero in this mode. The range servo remembers the range rate that existed at the instant the system was last switched from acquisition to track and maintains this range rate until the auto-track bus is energized. The other parts of the computer operate in the same manner as in the auto-track mode.

*Acquisition mode.*—In the acquisition mode, the computer receives the same inputs that it receives in the auto-track mode. However, the input range information is the range of the trailing edge of the radar wide gate modified by the action of the range limiter in the range servo amplifier. The computer circuits function in the same manner as in auto-track but the output voltage $(1/R_d)$ is not fed to the torque multiplier amplifiers in the lead angle computer. Instead it is terminated on an open contact of the track relay.

Operation of the fighter control system in the beacon and search modes does not involve the sensitivity computer, as these are primarily navigational modes of operation. However, the computer is electrically in the track mode.

PILOT'S INDICATOR

(FIGS. 28, 33)

The Pilot's indicator assembly 500 supplies fighter control information to the pilot from the computing and warning signals circuits in the fighter control system through five indicating circuits—azimuth tracking, elevation tracking, pitch, roll, and warning signals.

The warning signal indicator is activated by a system of relays in the sensitivity computer 400 and, depending on the phase or mode of the attack, presents the appropriate signal or "flag" to the pilot. The azimuth tracking, elevation tracking, pitch and roll units each consist of a synchro and motor combination receiving power from corresponding servo amplifiers, and function to position the artificial horizon indicator 510 in pitch and roll and to position the cross pointers 540, 550 in azimuth and elevation. The azimuth and elevation errors originate in lead angle computer 300; the azimuth error signal is compensated for roll rate as determined by the roll-rate tachometer in the compensator and vertical gyro 600. The pitch and roll signals originate in the pitch resolver and roll synchro, respectively, located in the vertical gyro unit.

The artificial horizon indicator presents visual pitch and roll data to the pilot. The horizon 510 is simulated by the horizontal boundary of two contrasting colors on a curtain or shade 511, which is suspended between geared rollers 512, 513 and viewed through a circular aperture 514. The extent and direction of airplane pitch is indicated by vertical positioning of the curtain 511 over the rollers 512, 513; the extent and direction of airplane roll is indicated by rotation about the roll axis of the frame 515 in which the curtain is suspended.

The pitch indication system includes a synchro resolver 520, a pitch control motor 521, and a gear train which positions the horizon curtain 511. An angle of attack control is provided and may be adjusted at the discretion of the pilot. The pitch motor 521 drives the horizon curtain 511 in accordance with signals from gyro vertical 600 proportional to sin $\theta_p$ in a vertical direction through a differential 522 and gear train 523, 524 from motor to curtain. The differential 522 is provided for preventing the introduction of roll motion from causing a consequent pitch motion not derived by the pitch system. The synchro resolver 520 is meshed through a gear train 525 to the pitch motor 521.

The roll indication system includes a synchro 530, roll control motor 531, gear train, and the curtain suspension frame 515. The motor 531 receives control voltage from the roll indicator amplifier 532 which receives roll error signals from the gyro vertical 600, and, through a gear train 535, rotates the curtain frame 515.

The azimuth cross-pointer system contains a resolver 541, control motor 542, and epicyclic gear train 543, and a vertical pointer 540. The azimuth control motor 542 receives control voltages from the azimuth indicator servo amplifier 544 which amplifies the tracking error signal from the computer system. The motor 542 drives through a gear train which leads into the epicyclic gear arrangement 543. This epicyclic unit transforms rotation of the motor shaft into horizontal translation of a vertical pointer 540 parallel to the face of the indicator panel. The azimuth resolver 541 meshes with the epicyclic train and is thereby positioned by the motor. When the cross-pointers are not used, as during beacon, search and acquisition, the control motor receives a dummy signal which drives the cross pointers to a stowed position out of view of the operator beyond sight.

The elevation system is identical to the azimuth system employing the same type of gear response as used in the azimuth system, but moving a horizontal pointer 550 parallel to the face of the instrument in a vertical direction.

The warning signal drum indicator 560 is provided for directing the pilot to institute certain piloting actions and providing him with necessary information to bring about a successful attack. This information and these directions are printed on flattened surfaces of a cylindrical dial. The dial is coupled to the rotor of a repeater motor 561 which is positioned through relays in sensitivity computer 400. These directions and the proper information are as follows and are presented at the appropriate time:

"SCAN"—radar operator is searching for a target.
"RANGE LOW"—fighter too close to target for effective launching.
"RANGE HIGH"—fighter too far from target for effective launching.
"LAUNCH"—conditions favor launching of missiles.
"ON COURSE"—missile has been launched.
"RECOVER"—fighter to climb from dangerously low altitude or to resume normal operations after pulling out of attack.

Certain other directions are presented to the pilot during an attack. In one case a warning light 565 flashes "CLIMB" when the plane's altitude is below a minimum value set by the pilot. This light receives its energizing signal from an altitude recovery relay in sensitivity computer 400. In the other case a warning light 566 flashes "SLOW" whenever the fighter is within 3,000 feet of the target, a distance which is considered to be a potential collision range. This light also receives its signal from the sensitivity computer 400.

The pilot's indicator is further provided with a ball-bank indicator 567 of conventional design which conveniently indicates to the pilot the extent and direction of airplane slip.

COMPENSATED VERTICAL GYRO
(FIGS. 29, 33)

The vertical gyro employed in the fighter control system is of the type disclosed in my co-pending application S.N. 196,315, filed November 17, 1950. This gyro is essentially a completely compensated vertical gyro; i.e., it is compensated for both longitudinal and lateral accelerations. The manner in which this compensation is performed is disclosed in detail in the above-mentioned application.

In the present embodiment, the vertical gyro functions as an accurate vertical reference and is provided with suitable resolving and synchro devices to generate certain signals proportional to functions of roll and pitch angles of the aircraft for use in other components of the system. These signals comprise two signals proportional to $\sin \theta_r \cos \theta_p$ and $\cos \theta_r \cos \theta_p$ which are fed to the torque multiplier amplifiers 340, 341 in the lead angle computer 300 for gravity drop correction, a roll rate tachometer signal that is fed to the tracking error amplifier for directive control of the azimuth cross-pointer, a true $\sin \theta_p$ signal that is fed to the pitch indicator in the pilot's indicator 500, a roll error signal that is fed to the roll indicator in the pilot's indicator 500, a $$(1 - \cos \theta_p)$$

signal to an airspeed potentiometer in the sensitivity computer 400 for use in the warning signal circuits, and a $\cos \theta_p$ signal to the $\cos \theta_p$ potentiometer 460 in the sensitivity computer for turn acceleration compensation purposes.

In addition to the necessary excitation voltages, the inputs to the compensated vertical gyro 600 are an $\epsilon_z$ error signal from the lead angle computer 300, and a $V_f \cos \theta_p$ signal from potentiometer 460 in the sensitivity computer 400 for turn acceleration compensation.

It was stated above that the gravity drop correction components, that are added to the missile flight path during the propulsion period, can be made proportional to the components of the gravity acceleration vector along the $y$ and $z$ axes of the airplane, i.e., the component of gravity along the $y$ axis is proportional to the product $\cos \theta_p \sin \theta_r$ and that the component along the $z$ axis is proportional to the product $\cos \theta_p \cos \theta_r$. The method by which these trigonometric functions of the pitch and roll angles are obtained will now be explained.

The pitch resolver 605 is positioned by the aircraft angular motion in pitch $\theta_p$. The windings of the rotor of this resolver are so interrelated and excited that the output of one stator winding is proportional to the cosine of the pitch angle ($\cos \theta_p$) and the output of the other stator winding is proportional to the sine of the pitch angle ($\sin \theta_p$). The signal voltage proportional to $\cos \theta_p$ is fed through a phase shifter and an isolation amplifier 610 to a rotor winding of a roll resolver 615.

The roll resolver 615 is positioned by aircraft angular motion in roll $\theta_r$. The stator windings of this roll resolver are so interconnected as to produce signals proportional to the product $\cos \theta_p \sin \theta_r$ which is the desired component of the gravity vector along the $y$ axis, and the product $\cos \theta_p \cos \theta_r$ which is the desired component of the gravity vector along the $y$ axis. These components are fed to the summing networks of the lead angle computer 300.

As above stated, in addition to supplying gravity drop components to the lead angle computer 300, pitch and roll information is supplied to the pilot's indicator 500 for the actuation of an artificial horizon 510 in the pilot's indicator. These signals are derived from a suitable roll synchro 620 geared to the roll gimbal and the $\sin \theta_p$ winding of the pitch resolver 605.

The roll rate tachometer signal above mentioned that is fed to the tracking error amplifier for providing derivative control of the azimuth cross-pointer is derived from a suitable generator 625 driven by the roll gimbal. Its excitation is proportional to the elevational piloting error and therefore its output is proportional to this piloting error times rate of roll of the aircraft.

The $\cos \theta_p$ signal is derived, as described above, in a resolver 605 positioned by pitch motion of the aircraft. This $\cos \theta_p$ signal is combined with a voltage proportional to unity in a suitable combining network 630, the outputs of which are proportional to $(1 - \cos \theta_p)$.

WARNING SIGNAL CIRCUITS
(FIGS. 32, 33)

The warning signal circuits contain relays necessary for the switching of signals to the synchro motor 561 in the pilot's indicator 500. The six positions of the dial are successively presented to the pilot by five relays in the warning signal circuits in the sensitivity computer 400. These six positions, as above described, are: RECOVER, SCAN, ON COURSE, RANGE LOW, LAUNCH and RANGE HIGH. The order here given is the functional order of priority. For example, if the RECOVER signal relay 705 has been energized, RECOVER will show on the pilot's indicator drum 560 and no other relay energized will take precedence over this. Two other main functions done by the warning signal circuits are that of target clearance and voltage limiting switching action. The target clearance time may be described as the minimum time necessary for the pilot to pull clear of the target. The limiter limits the value of the signal going to the maximum launch range potentiometer 455 in the sensitivity computer.

The pilot's indicator drum 560 will read "Scan" until the auto-track mode is initiated. When this happens the scan relay 710 is energized and the "range high," "launch," or "range low" flag will appear on the pilot's panel. However, if the input signals representing functions of altitude and range indicate that the range is too high, a relay 715 will be closed by a suitable circuit which compares signals representing functions of altitude and range, and will cause "range high" to appear on the pilot's indicator drum 560. As the pilot maintains the crosspointers 540, 550 at zero deflection, the aircraft will keep on course and a signal proportional to the maximum launch range will cause the "Launch" flag to appear.

If for some reason the pilot does not operate the missile firing switch but instead continues on course to the target, a signal proportional to the minimum launch range will cause the "Range Low" flag to appear. The signals proportional to maximum and minimum launch range are determined by further comparison of signals proportional to functions of altitude, range, and airspeed as generated in the sensitivity computer 400. On the other hand, if the pilot operates the missile firing switch after the "Launch" flag appears, a relay 720 will be energized and the "On Course" flag will appear. This indicates to the pilot that the missile is on its way. If at any time the fighter aircraft is in danger of hitting the target or major pieces of debris (radar reflectors) therefrom, a target clearance relay 725 is energized. At the end of a six second time period as measured by a suitable timing motor 730 the "Recover" flag shows. Also, at the end of the "On Course" period, any one of the three flags, "Range High," "Launch," or "Range Low" will appear if the target has been missed or if another target has been acquired; otherwise the "Scan" flag is shown.

If, after the pilot has received the "Range Low" flag, he does not reduce speed as dictated by the "Slow" light 566, but instead approaches closer to the target, a signal proportional to five times the range rate will become equal to a signal proportional to range and the target clearance relay 725 will be energized. This in turn effects switching operations in the vertical gyro unit 600 which causes the pilot to fly the aircraft in such a manner as to clear the target as herein after more fully described. At the end of a six second time period the recover relay 705 is energized and the pilot's flag indicates "Recover" and will continue to indicate "Recover" until a reset button on the pilot's control panel is depressed. When this reset button is depressed, the flag warning signal will show any of the four track signals. If the entire system is put back on the acquisition, search, or beacon modes, the "Scan" flag will be shown.

If at any time a signal proportional to craft velocity, pitch angle, and altitude, i.e., $V_f^2(1-\cos \phi_p) \times$ Altitude reaches a pre-determined level, the altitude relay 735 is energized and the flag signal will show "Recover" and the climb light 465 will light. This means that the craft has reached a dangerously low altitude. The flag signal will continue to register "Recover" until the reset button on the pilot's control panel is depressed. Furthermore, if, after the reset button is depressed, the craft is still at too low an altitude, the "Recover" flag will appear again. But if the craft has once again reached a safe altitude any one of the four track flags will be shown, or if the entire system is put back on acquisition, search, or beacon modes, the "Scan" signal will be shown, the recover relay 705 will be de-energized and the "Climb" light 465 will go out.

If $-5\dot{D}$ ($\dot{D}$=range rate), as above stated, is equal to or greater than the actual range, collision with the target is imminent and it is desirable to have some semi-automatic means of making a sharp change in flight path. This is accomplished by placing flight demands on the crosspointers 540, 550 during the target clearance mode that will cause the pilot to fly away from the target in a tight turn.

When $-5\dot{D}$ becomes greater than the range value, the target clearance relay 725 in the warning signal circuits is energized. This action causes the turn relay 740 to be energized. Also the six second timer 730 is actuated and the clearance relay 725 is locked in. The right-left control relays 745 are also locked in the positions they held at the initiation of target clearance and the roll rate generator 625 is removed from the crosspointer circuit.

Energization of the turn relay 740 opens the shorted input winding of the roll resolver 615 and connects it to a voltage $Va$ proportional to $\pm\cos \theta_p$ which comes from the $\cos \theta_p$ channel isolation amplifier 747 through contacts of right-left control relay 745. The polarity depends on the position of the right-left control relay which is determined by the position of the roll switch 750 in the vertical gyro 600 at target clearance initiation. The function of this relay is described below.

The turn relay 740 also changes the connection of the other input winding of roll resolver 615 from $+\cos \theta_p$ to a signal $Vb$ proportional to ($k \cos \theta_p - \sin \theta_p$) which comes from a summation of $\sin \theta_p$ from isolation amplifier 748 and $\cos \theta_p$ from isolation amplifier 747. Furthermore, the turn relay 740 also changes the input signal to the cross-pointers 540, 550 from the output of lead angle computer 300 to the output of roll resolver 615 through suitable dropping resistors.

It is desired for maximum safety that for initial negative roll angles, the pilot pull the airplane out in a sharp right turn while for initial positive roll angles, the pilot makes a sharp left turn to avoid target collision. The position of a switch 750 operated by a cam on the roll gimbal of the gyro vertical 600 indicates whether the roll angle is positive or negative and actuates the right-left control relays 745 accordingly. It can be shown that for initial negative roll angles, an azimuth cross-pointer signal proportional to $(-\cos (\theta_p-\theta_R))$ and an elevation cross-pointer signal proportional to $(-\sin (\theta_p-\theta_R))$ would cause the pilot to quickly fly in a 90° right turn. For initial positive roll angles, it can be shown that an azimuth cross-pointer signal proportional to $$(+\cos (\theta_p+\theta_R))$$

and an elevation signal proportional to $(-\sin (\theta_p+\theta_R))$ would cause the pilot to quickly fly in a 90° left turn.

When the initial roll angle is negative (at Target Clearance initiation) the action of the roll switch 750, right-left control relays 745 and target clearance relay 725 causes the $Va$ input of the roll resolver 615 to lock is proportional to $-\cos \theta_p$. It can then be shown that the $Vc$ output voltage of the roll resolver 615 is proportional to $(-\cos (\theta_p-\theta_R))+K \cos \theta_p \sin \theta_R$ and the $Vd$ output voltage is proportional to $$(-\sin (\theta_p-\theta_R))+K \cos \theta_p \cos \theta_R$$

These voltages are then fed through suitable voltage dividers to the Azimuth and elevation cross-pointer channels respectively. It is observed that the first term of each expression are identical to those desired to give a 90° right turn. However, if the airplane were in a pure 90° bank, there would be very little lift on the plane and gravity effects would cause trouble. The purpose of the latter terms $$K \cos \theta_p \sin \theta_R \text{ and } K \cos \theta_p \cos \theta_R$$

is to put in signals that cause the plane to end with a 20 degree roll angle bias (final roll angle of 70° instead of 90°) so that the airplane will get sufficient lift. When the initial roll angle is positive, $Va$ is locked in proportional to $+\cos \theta_p$. The $Vc$ output (Az. Signal) of the roll resolver is then proportional to $$+\cos (\theta_p+\theta_R)+K \cos \theta_p \sin \theta_R$$

and the $Vd$ output (El. Signal) is proportional to $$(-\sin (\theta_p+\theta_R))+K \cos \theta_p \cos \theta_R$$

These signals cause the pilot to go into a sharp left turn ending up at a roll angle of $-70°$ with the pilot pulling back on his stick.

After six seconds, the timer relay 730 is energized which in turn energizes the recover relay 705. When the recover relay 705 is energized, the target clearance relay 725 and turn relays 740 are de-energized restoring the roll resolver 615 to normal operation, and the cross-pointer relay 755 is actuated moving the cross-pointers 540, 550 out of the pilot's view. Energizing the recover relay 705 causes the "Recover" signal to appear on warning signal drum 560 in the pilot's indicator 500.

A recovery reset button in the pilot's control panel is provided for de-energizing the entire recovery system.

GLOSSARY OF SYMBOLS

| Symbol | Name | Definition |
|---|---|---|
| $\underline{A}_g$ | | Gravity acceleration vector. |
| $\underline{D}_{ft}$ | Fighter-target range | Distance vector from fighter to target. |
| $(\underline{D}_{ft})_l$ | Launching range | Distance vector from fighter to target when missile is launched. |
| $(\underline{D}_{ft})_p$ | | Distance vector from fighter to target at the time of beam entry. |
| $(D_l)_{max}$ | Maximum launching range | Maximum allowable fighter-target range at launch. |
| $(\underline{D}_{fm})_p$ | | Distance vector from fighter to missile ot the time of beam entry. |
| $\underline{\Delta D}_f$ | Fighter displacement increment | Distance vector from fighter position at launch to fighter position at the time of beam entry. |
| $\underline{\Delta D}_m$ | Missile displacement increment | Distance vector from fighter position at launch to missile position at the time of beam entry. |
| $\underline{\Delta D}_t$ | Target displacement increment | Distance vector from target position at launch to target position at the time of beam entry. |
| $E_m$ | Beam-entry error | Perpendicular distance from missile to radar beam nutation center at the time of beam entry. |
| $\underline{f}$ | Indicated heading unit vector | Unit vector in the direction of the computed fighter heading. |
| $H$ | | Magnitude of a computed vector in the direction of the computer gyro spin axis. |
| $\underline{h}$ | Gyro unit vector | Unit vector in the direction of the computer gyro spin axis. |
| $K$ | Smoothing parameter | Defined by Equation 15. |
| $M$ | Noise magnification ratio | Ratio of sinusoidal $\theta_f$ perturbation amplitudes to corresponding $\theta_s$ amplitudes. |
| $\underline{P}$ | | Target prediction error vector. |
| $R_d$ | Dynamic sensitivity | Ratio of $\sin \lambda$ to $\Omega_h$. |
| $R_s$ | Static sensitivity | Ratio of $\sin \lambda$ to $\Omega_s$. |
| $S_c$ | Computer solution time | Time required for the computer to erase 95 percent of its initial transient error. |
| $S_s$ | System solution time | Time required for fighter control system (fighter plus computer) to erase 95 percent of its initial transient error. |
| $\underline{s}$ | Sight-line unit vector | Unit vector in the direction of the radar antenna nutation axis. |
| $t_p$ | Propulsion time | Time interval between the missile launching and the initiation of missile guidance. |
| $\underline{V}_f$ | | Fighter velocity vector. |
| $\underline{V}_t$ | | Target velocity vector. |
| $\underline{x}, \underline{y}, \underline{z}$ | | Mutually perpendicular unit reference vectors attached to the fighter with $x$ forward along the boresight datum line, $y$ perpendicular to the plane of symmetry and directed outward along the left wing, and $z$ upward. |
| $\beta$ | Relative gravity-drop correction angle | The angle whose tangent is the ratio of the missile gravity drop component normal to the boresight datum line to the fighter-missile range at beam entry. |
| $\gamma$ | Gyro deflection | Angle between $\underline{h}$ and $\underline{f}$. |
| $\delta$ | Gyro lag angle | Angle between $\underline{h}$ and $\underline{s}$. |
| $\epsilon$ | Piloting-error angle | Angle between $\underline{x}$ and $\underline{f}$. |
| $\zeta$ | Zenith angle | Angle between $\underline{Z}$ and $\underline{x}$. |
| $\theta_f$ | Fighter heading angle | Angle measured from an arbitrary space reference line in the lead angle plane to $\underline{f}$. |
| $\theta_s$ | Sight angle | Angle measured from an arbitrary space reference line in the lead angle plane to $\underline{s}$. |
| $\lambda$ | Lead angle | Angle between $\underline{s}$ and $\underline{f}$. |
| $\lambda_l$ | | Value of $\lambda$ at the time of launch. |
| $\tau$ | Fighter approach angle | Angle between $-\underline{s}$ and $\underline{V}_t$. |
| $\tau_l$ | | Value of $\tau$ at the time of launch. |
| $\tau_p$ | | Value of $\tau$ at the time of beam entry. |
| $\phi$ | Fighter bank angle | Angle between the $\underline{x}-\underline{Z}$ plane and the $\underline{x}-\underline{y}$ plane. |
| $\Omega_s$ | Sight line rate | Angular rate of $\underline{s}$ relative to space axes. |
| $\Omega_h$ | Gyro rate | Angular rate of $\underline{h}$ relative to space axes. |
| $\omega$ | | Angular frequency of tracking perturbations. |

What is claimed is:

1. In a control system for an aircraft adapted to launch missiles of the beam-riding type comprising automatic radio tracking means for tracking a selected target and thereby establishing a radio line of sight from said aircraft to said target, means including a first gyroscope for stabilizing said line of sight in space, means including a lead angle computer and a second gyroscope controlled by the output of said computer for establishing a line in space corresponding to a computed aircraft heading, and means controlled by said last-mentioned means for measuring off-heading conditions of the aircraft.

2. In a control system for an aircraft of the character set forth in claim 1 further including means operable upon launching of the missile for reducing the output of said lead angle computer to zero whereby to establish a line in space corresponding to a different aircraft heading after the missile is launched.

3. In a control system for an aircraft of the character set forth in claim 1 further including means operable upon launching the missile for gradually reducing the output of said said lead angle computer toward zero at a predetermined rate whereby to gradually establish a line in space corresponding to a different aircraft heading after the missile is launched.

4. In a control system for an aircraft adapted to launch missiles of the beam-riding type comprising automatic radio tracking means for tracking a target and thereby establishing a radio line of sight from said aircraft to a selected target, means including a first gyroscope for stabilizing said line of sight in space, means including a lead angle computer and a second gyroscope controlled by the output of said computer for establishing a line in space corresponding to a computed craft heading, a pilot's indicator responsive to said lead angle computer means for indicating the off-heading condition of the aircraft.

5. A control system for an aircraft adapted to launch missiles of the beam-riding type, means including automatic radio tracking means for establishing a radio line of sight from said aircraft to a selected target, a pilot's indicator having a reference position representing the craft's fore and aft axis, azimuth and elevation pointers movable with respect to said reference position, and actuating means for moving said pointers, means for supplying signals corresponding to angular position of the radio line of sight relative to the azimuth and elevation axes of said aircraft, means including a lead angle computer for supplying signals corresponding to the angular relation of a prediction line relative to the azimuth and elevation axes of said aircraft, means for respectively combining functions of both of said azimuth and both of said elevation signals for supplying azimuth and elevation control signals respectively proportional to the algebraic sums thereof, and means for supplying said azimuth control signal to said azimuth pointer actuating means and said elevation control signal to said elevation pointer actuating means, whereby said craft will proceed along a flight path bearing a computed lead angle relative to said sight line when the attitude of said aircraft is so controlled as to maintain said azimuth and elevation pointers coincident with said reference position.

6. In a control system for an aircraft of the character set forth in claim 5 further including means operable upon launching the missile for reducing said lead angle computer signals to zero whereby said aircraft will proceed along a flight path having a constant bearing relative to said radio line of sight.

7. In a control system for an aircraft of the character set forth in claim 5 further including means operable upon launching the missile for gradually reducing said lead angle computer signals toward zero at a predetermined rate whereby said craft will approach a flight path having a constant bearing relative to said radio line of sight.

8. A control system for aircraft comprising, automatic radio tracking means for defining a reference axis in space, means for defining a computed axis normally bearing a predetermined angular relation to said reference axis, means responsive to said reference axis defining means and said computed axis defining means for defining a resultant axis normally coincident with the fore and aft axis of said aircraft and bearing a predetermined angular relation to said reference axis and said computed axis when the craft is proceeding along a predetermined flight path, and means responsive to movements of said reference-axis-defining means relative to said aircraft and said computed-axis-defining means relative to said aircraft for commanding attitude changes of said aircraft; whereby to return said computed axis to its predetermined relation with said reference axis when the attitude of said aircraft is controlled in accordance with said commanded attitude changes to thereby reestablish coincidence of said resultant axis and the fore and aft axis of said aircraft.

9. In a control system for an aircraft adapted to launch missiles of the beam-riding type comprising automatic radio tracking means for tracking a selected target and thereby establishing a radio line of sight from said aircraft to said target, a pilot's indicator for indicating deviations between the actual craft heading and a computed craft heading, a gyroscope and means for precessing said gyroscope, a lead angle computer, means for supplying an input to said lead angle computer proportional to the time of flight of said missile from said aircraft to a point along said sight line at a fixed distance from said aircraft, means for controlling said precessing means in accordance with the output of said lead angle computer, and means controlled by said radio tracking means and said gyroscope for supplying control signals to said indicator whereby said aircraft will proceed along a flight path bearing a computed lead angle relative to said sight line when the heading of said aircraft is so controlled as to maintain said indicator deviations substantially zero.

10. In a control system for an aircraft adapted to launch missiles of the beam-riding type comprising automatic radio tracking means for tracking a selected target and thereby establishing a radio line of sight from said aircraft to said target, a pilot's indicator for indicating deviations between the actual craft heading and a computed craft heading, a gyroscope and means for precessing said gyroscope, a lead angle computer, means for supplying an input to said lead angle computer proportional to the time of flight of said missile from said aircraft to a point along said sight line at a fixed distance from said aircraft, means for controlling said precessing means in accordance with the output of said lead angle computer, means controlled by said radio tracking means and said gyroscope for supplying control signals to said indicator whereby said aircraft will proceed along a first flight path bearing a computed lead angle relative to said sight line when the heading of said aircraft is so controlled as to maintain said indicator deviations substantially zero, and means operable upon launching said missile for reducing the output of said lead angle computer to zero, whereby said craft will proceed along a second flight path having a constant bearing relative to said sight line when the heading of the aircraft is so controlled as to maintain said indicator deviations substantially zero.

11. In a control system for aircraft adapted to launch missiles of the beam-riding type comprising automatic radio tracking means for tracking a selected target and thereby establishing a radio line of sight from said aircraft to said target, a first gyroscope coupled with said radio tracking means for determining the angular position of said radio sight line relative to the heading of said aircraft, a lead angle computer, means for supplying an input to said computer proportional to the time of flight of said missile from said aircraft to a point along said radio sight line at a fixed distance from said aircraft and in part by the heading of said aircraft, a second gyroscope and precessing means therefor, means for controlling said precessing means in accordance with the output of said lead angle computer, and an indicator responsive to the position of said first and second gyroscopes for indicating deviations between the actual aircraft heading and the computed aircraft heading determined by the position of said gyroscopes.

12. In a control system for aircraft adapted to launch missiles of the beam-riding type comprising automatic tracking means for tracking a selected target and thereby establishing a radio line of sight from said aircraft to said target, means including a lead angle computer, means for supplying a first signal to said computer proportional to the time of flight of said missile from said aircraft to a predetermined point along said radio line of sight at a fixed distance from said aircraft, means for supplying a second signal to said computer proportional to the heading of said aircraft relative to the axis of said beam, a gyroscope and precessing means therefor, means controlled by the output of said lead angle computer for actuating said precessing means, and an indicator controlled by said gyroscope for indicating deviations between the actual aircraft heading and the computed craft heading, determined by the position of said gyroscope.

13. In an aircraft control system of the character set forth in claim 12 further including means operable upon launching of said missile for reducing said first signal to zero.

14. In an aircraft control system of the character set forth in claim 12 further including means operable upon launching said missile for gradually reducing said first signal toward zero at a predetermined rate.

15. In a radio tracking and guidance system for use with missile launching aircraft wherein the missile carried thereby is of the type which automatically maintains itself in the radio tracking beam after the missile is launched from the aircraft into the beam, means for transmitting a beam of periodic pulses of electromagnetic energy including a parabolic antenna, an antenna feed member, means for relatively rotating said feed member and said parabolic antenna to thereby produce conical scan of the transmitted beam about the antenna axis, means for successively generating a plurality of identification pulses each one thereof being transmitted during a selected segment of each cycle of said conical rotation whereby segments of said conical beam may be identified, gyroscopic means for defining a fixed axis in space relative to the roll attitude of said aircraft, and means connected with said gyroscopic means and said pulse generating means for controlling the time of transmission of said identification pulses in accordance with the roll attitude of said aircraft, whereby the relative position of the segments so identified remain fixed in space.

16. In a radio tracking and guidance system of the character set forth in claim 15 wherein said last means comprises a phase reference generator coupled with said feed member for providing a signal having a phase dependent upon the angular position of said feed member relative to the directivity axis of said parabolic antenna, and a phase shifter having one element thereof connected to receive said generator signal and another element thereof coupled with said gyroscopic means for shifting the phase of the output of said phase reference generator in accordance with the position of said gyroscopic means, and means for supplying the output of said phase shifter to said identification-pulse-generating means.

17. In a control system for an aircraft adapted to launch missiles of the beam-riding type comprising automatic radio tracking means for tracking a selected target and thereby establishing a radio line of sight from said aircraft to said target, signal responsive means for providing a measure of deviations between the actual craft heading and a computed craft heading, a gyroscope for defining an axis in space relative to said aircraft and means for precessing said gyroscope, a lead angle computer, means for supplying an input to said lead angle computer proportional to the time of flight of said missile from said aircraft to a point along said sight line at a fixed distance from said aircraft, means for controlling said precessing means in accordance with the output of said lead angle computer, and means controlled in accordance with the angular relation between the line of sight provided by said radio tracking means and the angular orientation of said gyroscope axis for supplying control signals to said signal responsive means whereby said aircraft will proceed along a flight path bearing a computed lead angle relative to said sight line when the heading of said aircraft is so controlled as to maintain said measure substantially zero.

18. In a control system for an aircraft adapted to launch missiles of the beam-riding type comprising automatic radio tracking means for tracking a selected target and thereby establishing a radio line of sight from said aircraft to said target, signal responsive means for providing a measure of deviations between the actual craft heading and a computed craft heading, a gyroscope and means for precessing said gyroscope, a lead angle computer, means for supplying an input to said lead angle computer proportional to the time of flight of said missile from said aircraft to a point along said sight line at a fixed distance from said aircraft, means for controlling said precessing means in accordance with the output of said lead angle computer, means controlled by said radio tracking means and said gyroscope for supplying control signals to said signal responsive means whereby said aircraft will proceed along a first flight path bearing a computed lead angle relative to said sight line when the heading of said aircraft is so controlled as to maintain said measure substantially zero, and means operable upon launching said missile for reducing the output of said lead angle computer to zero, whereby said craft will proceed along a second flight path having a constant bearing relative to said sight line when the heading of the aircraft is so controlled as to maintain said measure substantially zero.

19. In a control system for aircraft adapted to launch missiles of the beam-riding type comprising automatic radio tracking means for tracking a selected target and thereby establishing a radio line of sight from said aircraft to said target, a first gyroscope coupled with and controlled by said radio tracking means for defining the angular position of said radio sight line relative to the heading of said aircraft, a lead angle computer, means for supplying an input to said computer proportional in part to the time of flight of said missile from said aircraft to a point along said radio sight line at a fixed distance from said aircraft and in part to the heading of said aircraft, a second gyroscope for defining a computed line relative to said aircraft and precessing means therefor, means for controlling said precessing means in accordance with the output of said lead angle computer whereby angularly to position said second gyroscope in accordance with a computed lead angle, and means responsive to the relative angular positions of said first and second gyroscopes for providing a measure of deviations between the actual aircraft heading and the computed aircraft heading.

20. A control system for an aircraft adapted to launch missiles of the beam-riding type comprising automatic radio tracking means for defining a reference axis in space, means for defining a computed axis normally bearing a predetermined angular relation to said reference axis, means responsive to said reference axis defining means and said computed axis defining means for defining a resultant axes normally coincident with the fore and aft axis of said aircraft and bearing a predetermined angular relation to said reference axis and said computed axis when the aircraft is proceeding along a predetermined flight path, said predetermined angular relation being such that said predetermined flight path is a lead-pursuit course, and means responsive to movements of said reference-axis-defining means relative to said aircraft and said computed-axis-defining means relative to said aircraft for commanding attitude changes of said aircraft; whereby to return to said computed axis to its predetermined relation with said reference axis when the attitude of said aircraft is controlled in accordance with said commanded attitude changes to thereby reestablish coincidence of said resultant axis and the fore and aft axis of said aircraft.

21. A control system for aircraft of the character set forth in claim 20 further including means responsive to the launching of a missile for gradually reducing said predetermined angular relation between said reference axis and said computed axis to zero whereby said computed axis is gradually aligned with said reference axis to thereby change said predetermined flight path from a lead-pursuit course to a constant-bearing course.

22. In a radio tracking and guidance system for use with missile launching aircraft wherein the missile carried thereby is of the type which automatically maintains itself in the radio tracking beam after the missile is launched from the aircraft into the beam, means for transmitting a beam of periodic pulses of elecromagnetic energy including a parabolic antenna and an antenna feed member, means for relatively rotating said feed member and said parabolic antenna to thereby produce conical scan of the transmitted beam about the antenna axis, means responsive to reflected pulses from a selected target for providing signals proportional to the azimuth and elevation error between the axis of said antenna and said selected target, first gyroscopic means responsive to said error signals for positioning said antenna relative to the pitch and roll axes of said aircraft, whereby to cause said antenna to track with said target independently of aircraft motions, means for successively generating a plurality of identification pulses each one thereof being transmitted during a selected segment of each cycle of said feed member rotation whereby said segments of said conical beam may be identified, second gyroscopic means controlled in elevation from said first gyroscopic means for defining an axis fixed in space relative to the roll attitude of said aircraft, and means connected with said second gyroscopic means and said pulse generating means for controlling the time of transmission of said identification pulses in accordance with the roll attitude of said aircraft whereby the relative position of the segments so identified remain fixed in space with respect to the aircraft pitch, yaw and roll axes.

References Cited by the Examiner
UNITED STATES PATENTS

| | | | |
|---|---|---|---|
| 2,105,147 | 1/1938 | Inglis | 235—61.5 |
| 2,408,356 | 9/1946 | Willard | 235—61.5 |
| 2,433,843 | 1/1948 | Hammond | 343—7 |
| 2,454,673 | 11/1948 | Sanders | 343—9 X |
| 2,476,301 | 7/1949 | Jenks | 244—14 |
| 2,479,909 | 8/1949 | Darlington | 235—61.5 |
| 2,564,698 | 8/1951 | Knowles | 235—61.5 |
| 2,699,545 | 1/1955 | Havens | 343—13 |

MALCOLM A. MORRISON, *Primary Examiner.*

NORMAN H. EVANS, *Examiner.*